US012226705B2

(12) United States Patent
Chiba et al.

(10) Patent No.: US 12,226,705 B2
(45) Date of Patent: Feb. 18, 2025

(54) METHOD FOR CONTROLLING GAME APPARATUS, GAME SYSTEM, AND RECORDING MEDIUM

(71) Applicant: Konami Digital Entertainment Co., Ltd., Tokyo (JP)

(72) Inventors: Shigeru Chiba, Tokyo (JP); Junki Hirai, Tokyo (JP); Kai Inoue, Tokyo (JP); Akira Sakai, Tokyo (JP); Tsuguo Shinpo, Tokyo (JP); Toshiaki Kanahara, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 203 days.

(21) Appl. No.: 18/071,202

(22) Filed: Nov. 29, 2022

(65) Prior Publication Data

US 2023/0091665 A1    Mar. 23, 2023

Related U.S. Application Data

(63) Continuation of application No. PCT/JP2021/018702, filed on May 18, 2021.

(30) Foreign Application Priority Data

May 29, 2020   (JP) ................................ 2020-093902

(51) Int. Cl.
*A63F 13/87*   (2014.01)
*A63F 13/355*   (2014.01)
(Continued)

(52) U.S. Cl.
CPC ............ *A63F 13/87* (2014.09); *A63F 13/355* (2014.09); *A63F 13/812* (2014.09); *A63F 13/86* (2014.09)

(58) Field of Classification Search
CPC ...... A63F 13/87; A63F 13/355; A63F 13/812; A63F 13/86
See application file for complete search history.

(56) References Cited

U.S. PATENT DOCUMENTS

| 2021/0213360 A1* | 7/2021 | Osman ................ A63F 13/537 |
| 2021/0291061 A1* | 9/2021 | Tulewicz ............... A63F 13/86 |
| 2021/0299580 A1* | 9/2021 | Chow ................. A63F 13/5375 |

FOREIGN PATENT DOCUMENTS

| JP | 2001-137536 A | 5/2001 |
| JP | 2011-182109 A | 9/2011 |

(Continued)

OTHER PUBLICATIONS

International Search Report dated Jul. 6, 2021 from the International Searching Authority in International Application No. PCT/JP2021/018702.

(Continued)

*Primary Examiner* — Reginald A Renwick
(74) *Attorney, Agent, or Firm* — Sughrue Mion, PLLC

(57) ABSTRACT

A program recorded on a computer-readable recording medium causes a processor of a game apparatus to function as a game controller that executes a video game and generates video information indicative of a video of the video game; and an acquirer that acquires message information that is output from a terminal apparatus configured to display a distributed video that is based on the video information, the message information including a message related to at least one of the distributed video or the video game. The game controller incorporates the message included in the message information into the video of the video game, based on progress status information indicative of a progress status of the video game.

14 Claims, 35 Drawing Sheets

(51) Int. Cl.
*A63F 13/812* (2014.01)
*A63F 13/86* (2014.01)

(56) References Cited

FOREIGN PATENT DOCUMENTS

| JP | 2015-171454 A | 10/2015 |
| JP | 2018-134409 A | 8/2018 |
| JP | 2019-37549 A | 3/2019 |
| JP | 2019-054838 A | 4/2019 |
| JP | 2019-141585 A | 8/2019 |
| JP | 2020-032180 A | 3/2020 |
| JP | 7278605 B2 | 5/2023 |

OTHER PUBLICATIONS

Written Opinion dated Jul. 6, 2021 from the International Searching Authority in International Application No. PCT/JP2021/018702.
International Search Report dated Aug. 3, 2021 from the International Searching Authority in International Application No. PCT/JP2021/018703.
Written Opinion dated Aug. 3, 2021 from the International Searching Authority in International Application No. PCT/JP2021/018703.
Office Action dated Aug. 30, 2022 from the Japanese Patent Office in JP Application No. 2020-093901.
Office Action dated Sep. 20, 2022 from the Japanese Patent Office in JP Application No. 2020-093903.
Office Action dated Oct. 4, 2022 from the Japanese Patent Office in JP Application No. 2020-093902.
Office Action dated Dec. 13, 2022 from the Japanese Patent Office in JP Application No. 2020-093901.
Office Action dated Feb. 21, 2023 from the Japanese Patent Office in JP Application No. 2020-093903.
"YouTube launches live streaming from smartphones and new social tipping feature 'Super Chat'", ITmedia News, Feb. 8, 2017 (4 pages total) Accessed via the Internet: https://www.itmedia.co.jp/news/articles/1702/08/news067.html.
Japanese Office Action dated Jul. 2, 2024 in Application No. 2023-074422.
Japanese Office Action dated Jul. 16, 2024 in Application No. 2023-129289.
Korean Office Action dated Aug. 26, 2024 in Application No. 10-2022-7045453.
Korean Office Action dated Aug. 26, 2024 in Application No. 10-2022-7045365.
Japanese Office Action dated Oct. 29, 2024 in Application No. 2023-129289.

\* cited by examiner

FIG. 16

| MESSAGE ID | ACQUIRED MESSAGE INFO ||||||||
| | MESSAGE BODY INFO | USER NAME INFO | MESSAGE ANNEX INFO ||||||
| | | | MESSAGE TRANSMISSION DATE AND TIME INFO | SPECIFIC CHARACTER STRING INFO || USED POINT INFO | REACTION NUMBER INFO |
| | | | | TEAM SPECIFIC CHARACTER STRING INFO | USER SPECIFIC CHARACTER STRING INFO | | |
| m001 | Go on! | Takako | 2020/03/03/1930 | #TEAM T1 | #KONAMI | 9000 | 120 |
| m002 | Don't give up! | Takao | 2020/03/03/1931 | #TEAM T2 | #TANAKA | 105 | 21 |
| m003 | Way to go! | Reiko | 2020/03/03/1931 | #TEAM T1 | Null | Null | 1 |
| ... | ... | ... | ... | ... | ... | ... | ... |

TBL1

FIG. 17

| MESSAGE ID | MESSAGE INCORPORATION INFO | | | | | |
|---|---|---|---|---|---|---|
| | MESSAGE FEATURE INFO | | | | MESSAGE PRIORITY INFO | MESSAGE INCORPORATION COMPLETION INFO |
| | MESSAGE TARGET TEAM APPLICABILITY INFO | MESSAGE TARGET USER APPLICABILITY INFO | USED POINT INFO | POSITIVE-WORD APPLICABILITY INFO | | |
| m001 | 1 | 1 | 1 | 1 | 10 | 1 |
| m002 | 0 | 0 | 1 | 0 | 2 | 0 |
| m003 | 1 | 0 | 0 | 1 | 3 | 0 |
| ... | ... | ... | ... | ... | ... | ... |

TBL2

FIG. 27

TBL11

| APPARATUS MANAGEMENT INFO | | | |
|---|---|---|---|
| TERMINAL ID | USER ID | MEMBER TEAM INFO | USER CORRESPONDENCE CHARACTER STRING INFO |
| g001 | u001 | t001 | #KONAMI |
| g002 | u004 | t002 | #TANAKA |
| g005 | u005 | t001 | #NAKAMURA |
| ⋮ | ⋮ | ⋮ | ⋮ |

FIG. 28

TBL12

| TEAM MANAGEMENT INFO | |
|---|---|
| TEAM ID | TEAM CORRESPONDENCE CHARACTER STRING INFO |
| t001 | #TEAM T1 |
| t002 | #TEAM T2 |

FIG. 29

| MESSAGE ID | MESSAGE INCORPORATION INFO ||||||
|---|---|---|---|---|---|---|
| | MESSAGE FEATURE INFO ||||| MESSAGE PRIORITY INFO | MESSAGE INCORPORATION COMPLETION INFO |
| | MESSAGE CORRESPONDENCE TEAM INFO | MESSAGE CORRESPONDENCE USER INFO | USED POINT INFO | POSITIVE WORD APPLICABILITY INFO | | |
| m001 | t001 | u001 | 1 | 1 | 10 | 1 |
| m002 | t002 | u004 | 1 | 0 | 1 | 0 |
| m003 | t001 | u005 | 0 | 1 | 3 | 0 |
| ... | ... | ... | ... | ... | ... | ... |

TBL13

METHOD FOR CONTROLLING GAME APPARATUS, GAME SYSTEM, AND RECORDING MEDIUM

CROSS REFERENCE TO RELATED APPLICATIONS

This application is a Continuation Application of PCT Application No. PCT/JP2021/018702, filed on May 18, 2021, and is based on and claims priority from Japanese Patent Application No. 2020-093902, filed on May 29, 2020, the entire contents of each of which are incorporated herein by reference.

BACKGROUND OF THE INVENTION

Field of the Invention

The present invention relates to a game apparatus, to a method for controlling the game apparatus, and to a recording medium.

Description of Related Art

A technology has been proposed for a video distribution system that includes a game apparatus that executes a video game and generates video information indicating a video of the video game, and a terminal apparatus at which a distributed video based on the video information can be viewed (see, e.g., Japanese Patent Application Laid-Open Publication No. 2018-134409).

When viewers watch a distributed video of a video game on a terminal apparatus, a video game running in the game apparatus may be of particular interest to the viewers. In such a case, a viewer may post a message related to the video game on a website such as an SNS (social networking service) site, for example. In this case, the viewers of the website will be able to know the level of excitement of the video game in accordance with posted messages related to the video game on the website. However, it is sometimes not possible for users playing the video game in the game apparatus and viewers of the distributed video of the video game to know the level of excitement in the video game.

SUMMARY

The present invention has been made in view of the above circumstances, and one of its objects is to provide a technology that enables at least one of a user who plays the video game in the game apparatus or a viewer of the distributed video of the video game to be informed of the level of excitement of a video game.

In order to solve the above problems, a recording medium according to one aspect of the present invention is a computer readable recording medium having recorded therein a program, the program causing a processor of a game apparatus to function as: a game controller configured to execute a video game and generate video information indicative of a video of the video game; and an acquirer configured to acquire message information that is output from a terminal apparatus configured to display a distributed video that is based on the video information, the message information including a message related to at least one of the distributed video or the video game.

In this aspect, the game controller is configured to, based on progress status information indicative of a progress status of the video game, incorporate the message included in the message information into the video of the video game.

A recording medium according to another aspect of the present invention is a computer readable recording medium having recorded therein a program, the program causing a processor of a game apparatus to function as: a game controller configured to execute a video game and generate video information indicative of a video of the video game; and an acquirer configured to acquire message information that is output from a terminal apparatus configured to display a distributed video that is based on the video information, the message information including a message related to at least one of the distributed video or the video game.

In this aspect, the game controller is configured to decide, based on progress status information indicative of a progress status of the video game, whether or not to incorporate the message included in the message information into a video of the video game.

In addition, a method for controlling a game apparatus according to one aspect of the present invention is a method implemented by a processor of the game apparatus. The method includes executing a video game and generating video information indicative of a video of the video game; and acquiring message information that is output from a terminal apparatus configured to display a distributed video that is based on the video information, the message information including a message related to at least one of the distributed video or the video game. The generation of the video information includes incorporating the message included in the message information into the video of the video game based on progress status information indicative of a progress status of the video game.

A method for controlling a game apparatus according to another aspect of the present invention is a method implemented by a processor of the game apparatus. The method includes: executing a video game and generating video information indicative of a video of the video game; acquiring message information that is output from a terminal apparatus configured to display a distributed video that is based on the video information, the message information including a message related to at least one of the distributed video or the video game; and deciding whether or not to incorporate the message included in the message information into a video of the video game based on progress status information indicative of a progress status of the video game.

Furthermore, a game system according to still another aspect of the present invention is a game system with a game apparatus that executes a video game and generates video information indicative of a video of the video game. The game system includes: one or more memories for storing instructions; and one or more processors communicatively connected to the one or more memories and that execute the instructions to: acquire message information that is output from a terminal apparatus configured to display a distributed video that is based on the video information, the message information including a message related to at least one of the distributed video or the video game; and based on progress status information indicative of a progress status of the video game, incorporate the message included in the message information into the video of the video game.

A game system according to still yet another aspect of the present invention is a game system with a game apparatus that executes a video game and generates video information indicative of a video of the video game, the game system including: one or more memories for storing instructions;_ and one or more processors communicatively connected to the one or more memories and that execute the instructions to: acquire message information that is output from a terminal apparatus configured to display a distributed video that is based on the video information, the message information including a message related to at least one of the distributed video or the video game; and decide, based on progress status information indicative of a progress status of the video game, whether or not to incorporate the message included in the message information into the video of the video game.

BRIEF DESCRIPTION OF DRAWINGS

FIG. 16 shows an example data configuration of a message management table TBL1.

FIG. 17 shows an example data configuration of a message incorporation information table TBL2.

FIG. 27 shows an example data configuration of an apparatus management table TBL11.

FIG. 28 shows an example data configuration of a team management table TBL12.

FIG. 29 shows an example data configuration of a message incorporation information table TBL13.

DESCRIPTION OF THE EMBODIMENTS

In the following, embodiments for carrying out the present invention are described with reference to the drawings. In each drawing, the dimensions and scale of each section differ from actual configurations, as appropriate. The embodiments described below are preferred specific examples of the present invention. Therefore, various technically preferable limitations are included in the embodiments. However, the scope of the present invention is not limited to the embodiments unless otherwise described so as to specifically limit the present invention.

A. EMBODIMENTS

Embodiments of the present invention will be described below.

1. Overview of Video Distribution System

Figure 1:
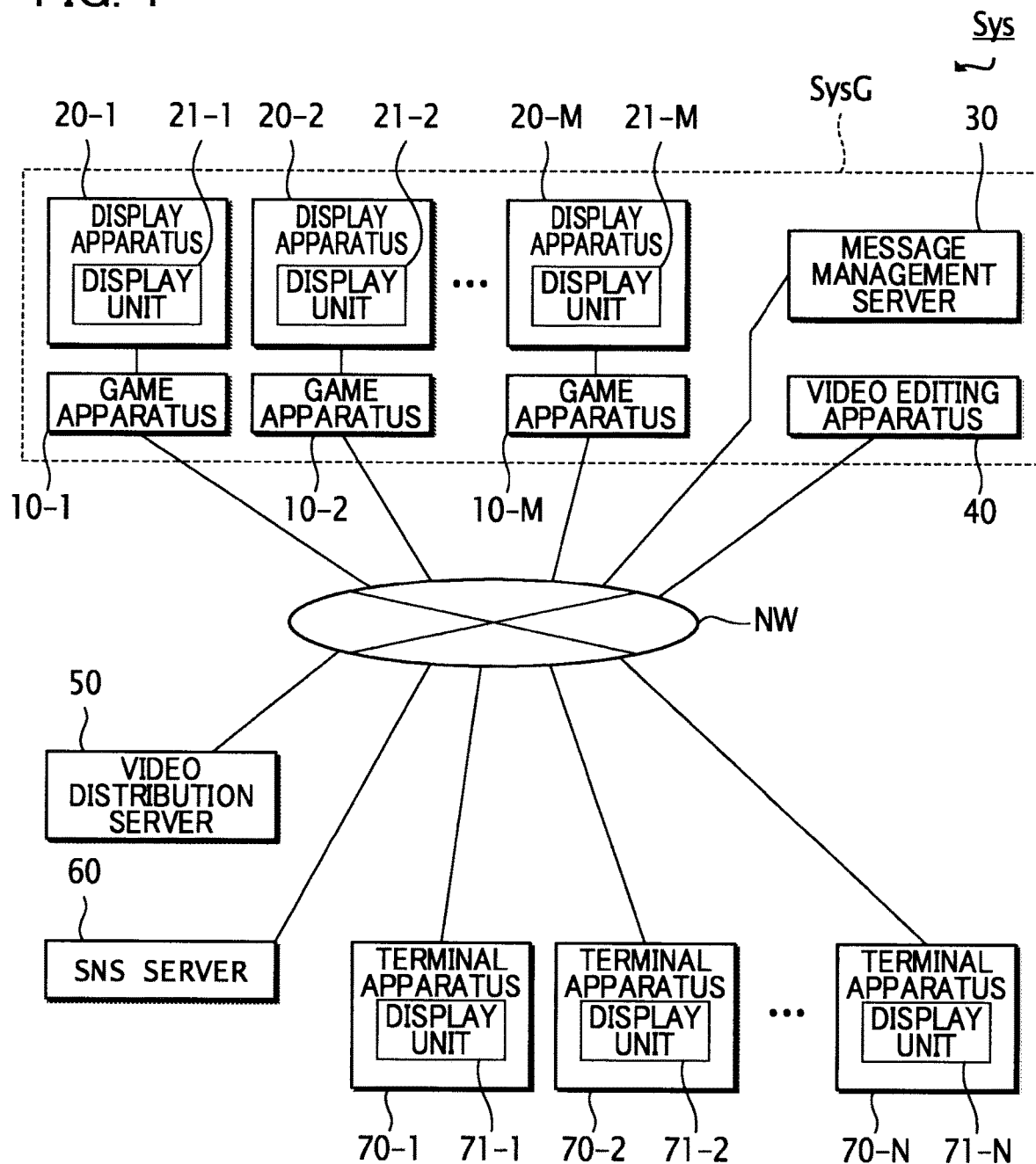
FIG. 1 is an explanatory diagram showing an example overview of a video distribution system Sys according to an embodiment of the present invention.

FIG. 1 is an explanatory diagram for explaining an overview of a video distribution system Sys according to the present embodiment. An overview of the video distribution system Sys will be described below with reference to FIG. 1.

As illustrated in FIG. 1, the video distribution system Sys has a game system SysG including a plurality of game apparatuses 10-1 to 10-M executable of a soccer video game (an example of a "video game"), a plurality of display apparatuses 20-1 to 20-M provided corresponding to the game apparatuses 10-1 to 10-M, a message management server 30 communicable with a game apparatus 10 via a network NW, and a video editing apparatus 40 communicable with a game apparatus 10 via the network NW. Here, the value M is a natural number greater than or equal to 2. In the following, an m-th game apparatus 10 among the game apparatuses 10-1 to 10-M may be referred to as a game apparatus 10-*m*, where the value m is a natural number satisfying 1≤m≤M. In the following, the m-th display apparatus 20 among the display apparatuses 20-1 to 20-M is sometimes referred to as a display apparatus 20-*m*.

In the present embodiment, a case in which a game apparatus 10 is a home video game device is assumed as an example. However, the game apparatus 10-may be any information processing apparatus. For example, the game apparatus 10-may be an arcade game machine installed in a store, amusement facility, or the like, or a mobile device, such as a mobile phone or smartphone, or a stationary information device, such as a personal computer. Although the present embodiment provides an example of a case in which the game apparatus 10 is communicable with the video editing apparatus 40 via the network NW, the present invention is not limited thereto. The game apparatus 10 may be communicable with the video editing apparatus 40 via a cable such as, for example, a High-Definition Multimedia Interface (HDMI (registered trademark)).

As illustrated in FIG. 1, the video distribution system Sys has a video distribution server 50 communicable with the game system SysG through the network NW, an SNS server 60 communicable with the game system SysG through the network NW, and a plurality of terminal apparatuses 70-1 to 70-N communicable with the video distribution server 50 and the SNS server 60 through the network NW, where the value N is a natural number greater than or equal to 2. In the following, an n-th terminal apparatus 70 among the terminal apparatuses 70-1 to 70-N may be referred to as a terminal apparatus 70-*n*, where the value n is a natural number satisfying 1≤n≤N.

As the terminal apparatus 70, any information processing device that can be connected to the network NW, such as a smartphone, mobile phone, or personal computer, can be adopted.

In the present embodiment, the game apparatus 10-*m* can cause a display unit 21-*m* provided in a display apparatus 20-*m* that corresponds to the game apparatus 10-*m* to display a video of a soccer video game that is being played in the game apparatus 10-*m*. In the following, the video of the soccer video game displayed by the game apparatus 10-*m* on the display unit 21-*m* is called a game video for display DH-m. In the present embodiment, the game video for display DH-m may be a still image to be displayed GH-m updated every unit period (e.g., a period of $\frac{1}{60}^{th}$ of a second). Here, the still image to be displayed GH-m is a still image displayed on the display unit 21-*m* in each unit period.

In the present embodiment, among the game apparatuses 10-1 to 10-M, one game apparatus 10, for example, the game apparatus 10-1, can communicate with another game apparatus 10, for example, a game apparatus 10-2, through the network NW. Specifically, the game apparatus 10-1 transmits information about a soccer video game running on the game apparatus 10-1 to the game apparatus 10-2. The game apparatus 10-2 also transmits information about a soccer video game being played on the game apparatus 10-2 to the game apparatus 10-1. Consequently, it is possible to have multiple game apparatuses 10-1 to 10-M share information about the soccer video game running on each game apparatus 10-*m*. It is then possible for a user U-1 of the game apparatus 10-1 and a user U-2 of the game apparatus 10-2 to form a team in a soccer video game and cooperate with each other to progress the soccer video game or to play against each other in a soccer video game (a match of the soccer video game).

In the following, it is assumed, as an example, that the value M is a natural number greater than or equal to 6. In the following, as an example, in a soccer video game, it is assumed that the user U-1 of the game apparatus 10-1, the user U-2 of the game apparatus 10-2, and a user U-3 of the game apparatus 10-3 form a team T1 and cooperate with each other to progress the soccer video game. In the following, as an example, in the soccer video game, it is assumed that a user U-4 of the game apparatus 10-4, a user U-5 of the game apparatus 10-5, and a user U-6 of the game apparatus 10-6 form a team T2 and cooperate with each other to progress the soccer video game. Furthermore, in the following, as an example, it is assumed that the teams T1 and T2 play each other in the soccer video game. That is, in the present embodiment, a case is assumed in which a soccer video game is executed in the game apparatus 10-*m*.

Figure 2:
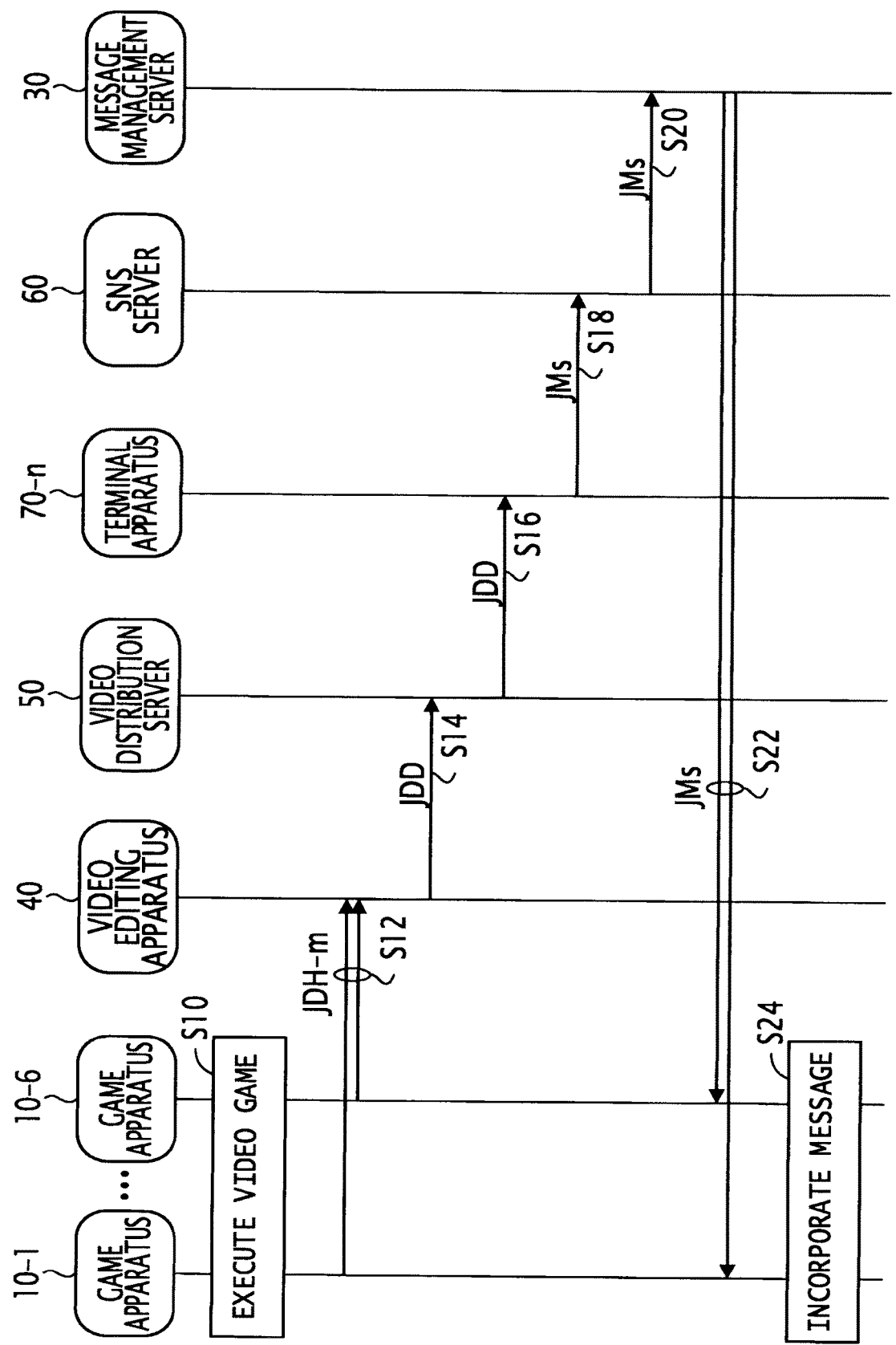
FIG. 2 is a sequence chart showing an example operation of the video distribution system Sys.

FIG. 2 is a sequence chart for explaining an overview of the operation of the video distribution system Sys according to the present embodiment.

As shown in FIG. 2, in the present embodiment, when the game apparatuses 10-1 to 10-6 are executing the soccer video game (S10), among the game apparatuses 10-1 to 10-6, the game apparatus 10-*m* supplies the video editing apparatus 40 with game-video-for-display information JDH-m indicating a game video for display DH-m of the soccer video game being executed at the game apparatus 10-*m* (S12). Here, the game-video-for-display information JDH-m may be information that indicates in real time a still image to be displayed GH-m that is updated for each unit period, information that indicates a series of still images to be displayed GH-m that correspond one-to-one with a series of unit periods, or information to which audio of the soccer video game has been added.

Next, based on one or more pieces of game-video-for-display information JDH-m supplied from one, some, or all of the game apparatuses 10-1 to 10-6, the video editing apparatus 40 generates a game video for distribution DD, which is a video of a soccer video game being executed in the game apparatuses 10-1 to 10-6, and supplies the video distribution server 50 with game-video-for-distribution information JDD, which indicates the generated game video for distribution DD (S14).

Here, the game video for distribution DD may be a video generated based on multiple pieces of game-video-for-display information JDH-m supplied from some or all of the game apparatuses 10-1 to 10-6, or a video generated based on a single piece of game-video-for-display JDH-m supplied from a single game apparatus 10-*m* among the game apparatuses 10-1 to 10-6. In the present embodiment, the game video for distribution DD may be a still image for distribution GD that is updated every unit period. Here, the still image for distribution GD may be an image including a still image identical to the display still image GH-m indicated by the game-video-for-display information JDH-m, or an image including a still image obtained by changing the resolution of the display still image GH-m indicated by the game-video-for-display information JDH-m. In addition, the game-video-for-distribution information JDD may be information that indicates, in real time, a still image for distribution GD that is updated every unit period, information that indicates a series of still images for distribution GD that correspond one-to-one with a series of unit periods, or information to which audio of a soccer video game has been added.

Next, the video distribution server 50 supplies the game-video-for-distribution information JDD supplied from the video editing apparatus 40 to the terminal apparatuses 70-1 to 70-N(S16). As shown in FIG. 1, the terminal apparatus 70-*n* is equipped with a display 71-*n*. In response to supply of the distribution game-video-for-distribution information JDD from video distribution server 50, the terminal apparatus 70-*n* causes the display 71-*n* to display the game video for distribution DD indicated by the game-video-for-distribution information JDD.

Then, in response to transmission of message information JMs including a message Ms from the user of the terminal apparatus 70-*n* to the SNS server 60 (S18), the message management server 30 acquires the message information JMs from the SNS server 60 (S20).

The message management server 30 then supplies the acquired message information JMs to the game apparatuses 10-1 to 10-6 (S22).

The game apparatus 10-*m* then incorporates the message Ms included in the message information JMs supplied at step S22, into the game video for display DH under certain conditions (S24).

2. Overview of Videos Generated in the Video Distribution System

A variety of types of videos generated in the video distribution system Sys will be described below with reference to FIGS. 3 to 11.

Figure 3:
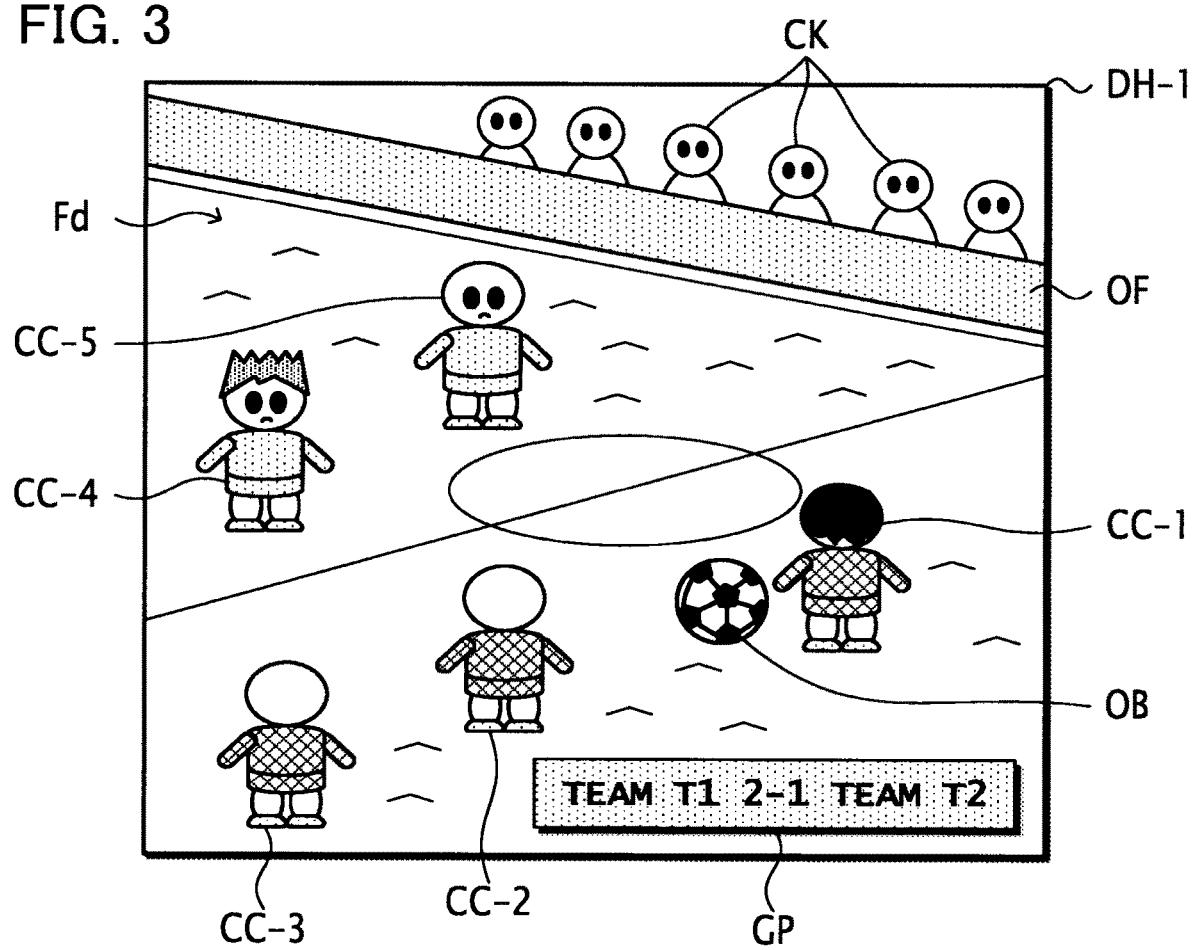
FIG. 3 is an explanatory diagram showing an example overview of a game video for display DH-1.
Figure 4:
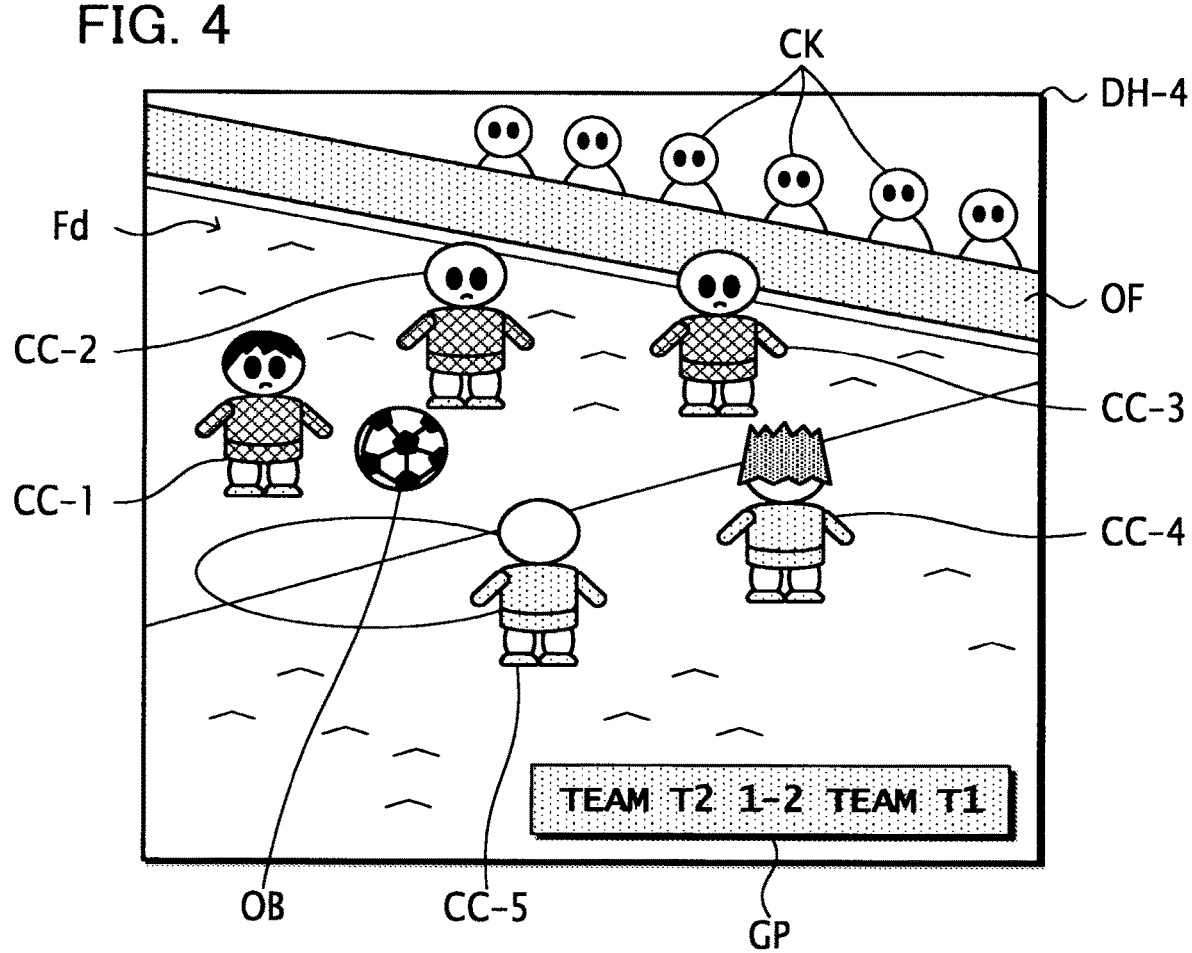
FIG. 4 is an explanatory diagram showing an example overview of a game video for display DH-4.

FIG. 3 is an explanatory diagram for explaining an example overview of a game video for display DH-1 generated by the game apparatus 10-1, and FIG. 4 is an explanatory diagram for explaining an example overview of a game video for display DH-4 generated by the game apparatus 10-4.

As shown in FIGS. 3 and 4, in the present embodiment, the game video for display DH-m is a video indicating how a soccer video game progresses in a virtual space Fd, such as a virtual soccer field. Specifically, in the present embodiment, the game video for display DH-m shows, for example, in the virtual space Fd, how a player character CC-m, which is operated by the user U-m, kicks a ball object OB. In the present embodiment, the game video for display DH-m shows, for example, spectator characters CK watching a soccer video game behind a fence object OF in the virtual space Fd. Furthermore, in the present embodiment, the game video for display DH-m includes, for example, a score image GP indicating the scores in a soccer video game.

The game video for display DH-1 in FIG. 3 shows how a soccer video game progresses in the virtual space Fd from a viewpoint that allows for easy operation by the user U-1 of the player character CC-1, which is the object of operation of the user U-1. Similarly, the game video for display DH-4 shown in FIG. 4 shows how the soccer video game progresses in the virtual space Fd from a viewpoint that allows for easy operation by the user U-4 of the player character CC-4, which is the object of operation by the user U-4.

Figure 5:
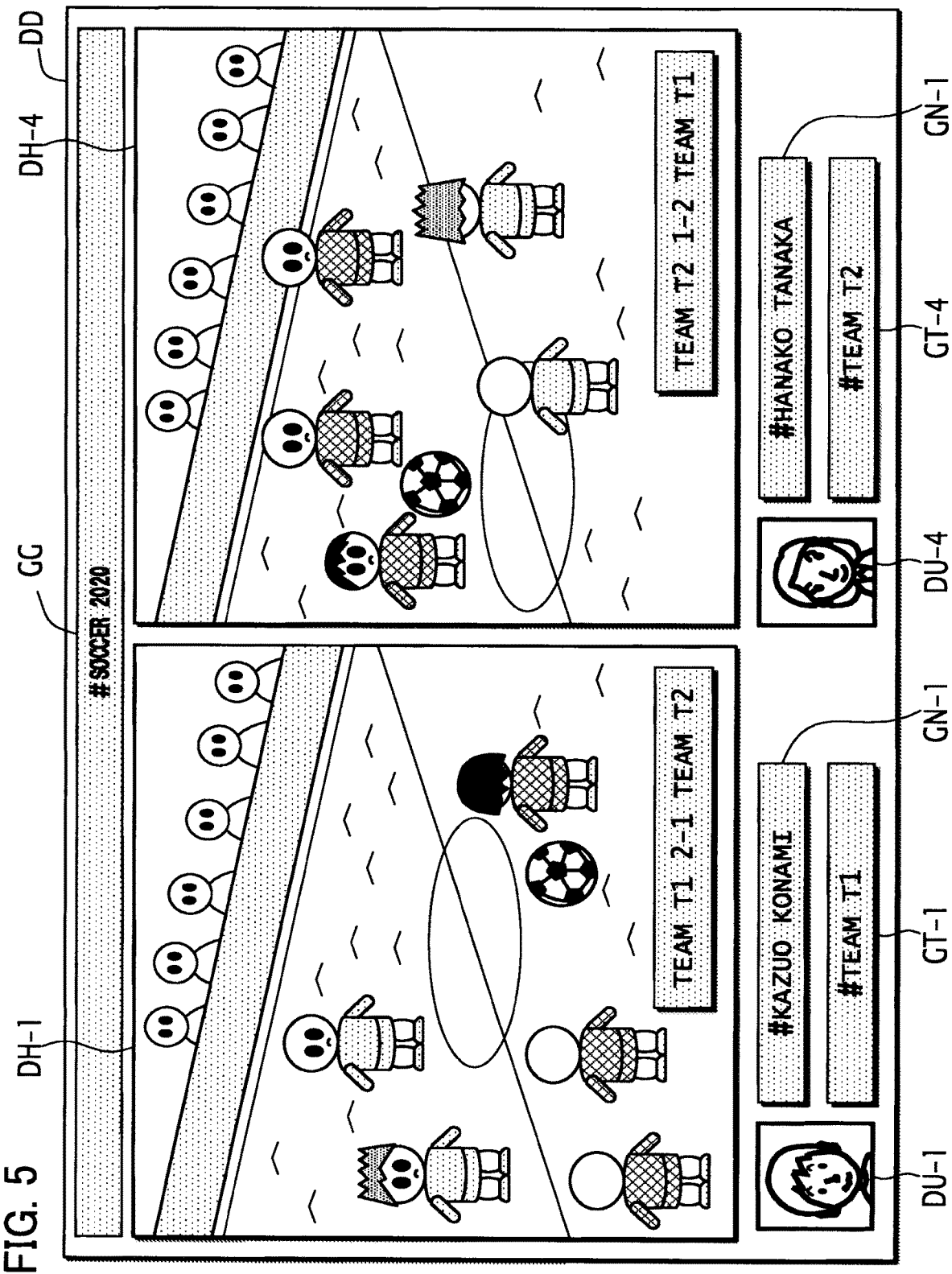
FIG. 5 is an explanatory diagram showing an example overview of a game video for distribution DD.

FIG. 5 is an explanatory diagram for explaining an example overview of a game video for distribution DD generated by the video editing apparatus 40.

In the present embodiment, it is assumed, as an example, that the video editing apparatus 40 generates the game video for distribution DD based on the game video for display DH-m corresponding to the user U-m belonging to the team T1 among the users U-1 to U-6 and the game video for display DH-m corresponding to the user U-m belonging to the team T2 among the users U-1 to U-6. FIG. 5 illustrates a case in which the video editing apparatus 40 generates the game video for distribution DD as a video including the game video for display DH-1 shown in FIG. 3 and the game video for display DH-4 shown in FIG. 4.

In the present embodiment, the game video for distribution DD includes a game specific character string designation image GG indicating a video game that is being executed at the game apparatus 10-*m*, i.e., a soccer game specific character string which is a character string specifying a soccer video game. In addition, the game video for distribution DD includes: a team specific character string designation image GT-m indicating a team specific character string which is a character string specifying a team to which the user U-m belongs; a user specific character string designation image GN-m indicating a user specific character string which is a character string identifying the user U-m; and a user imaging video DU-m which is a video obtained by imaging the user U-m.

Here, the soccer game specific character string is a character string (for example, hashtags) to be added to a message Ms when the user of the terminal apparatus 70-*n* posts the message Ms related to the soccer video game in the SNS server 60. The team specific character string is a character string (for example, hashtags) to be added to a message Ms when the user of the terminal apparatus 70-*n* posts in the SNS server 60 the message Ms related to the team to which the user U-m who is playing the soccer video game belongs. In addition, the user specific character string is a character string (for example, hashtags) to be added to a message Ms when the user of the terminal apparatus 70-*n* posts in the SNS server 60 the message Ms related to the user U-m playing the soccer video game. In the following, a soccer game specific character string, a team specific character string, and a user specific character string may sometimes be collectively referred to as a specific character string.

In an example shown in FIG. 5, in addition to the game video for display DH-1 and the game video for display DH-4, the game video for distribution DD includes: a game specific character string designation image GG; a user imaging video DU-1, a user specific character string designation image GN-1 and a team specific character string designation image GT-1 that correspond to the user U-1, and a user imaging video DU-4, a user specific character string designation image GN-4, and a team specific character string designation image GT-4 that correspond to the user U-4.

Figure 6:
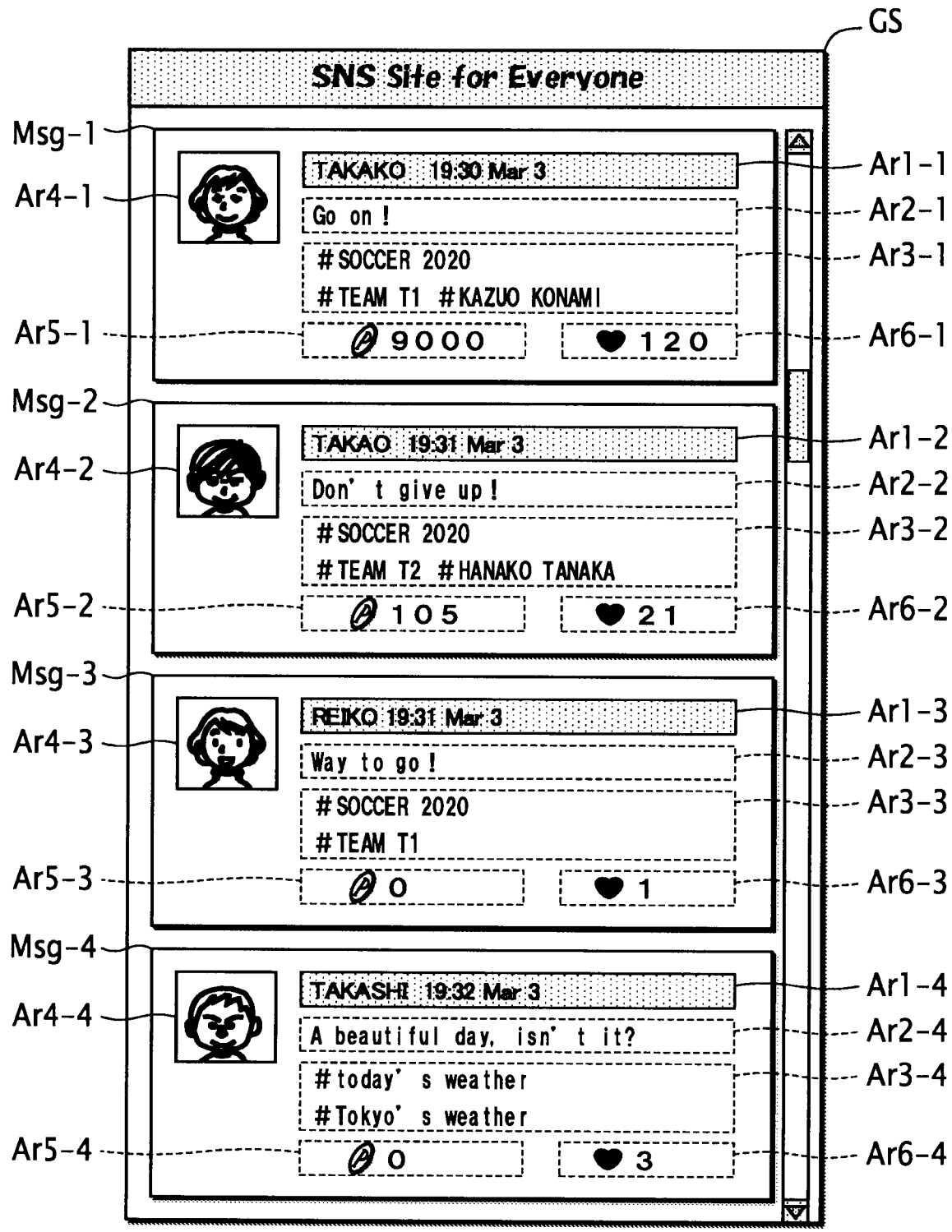
FIG. 6 is an explanatory diagram showing an example overview of an SNS site GS.

FIG. 6 is an explanatory diagram for explaining an example overview of an SNS site GS provided by the SNS server 60.

As illustrated in FIG. 6, the SNS site GS has multiple message display areas Msg (Msg-1, Msg-2, Msg-3, . . . ) corresponding one-to-one with multiple pieces of message information JMs transmitted from the user of the terminal apparatus 70-*n*. Each message display area Msg has a user name display area Ar1, a message body display area Ar2, a specific character string display area Ar3, a profile image display area Ar4, a used point display area Ar5, and a positive reaction number display area Ar6.

The user name display area Ar1 displays, for example, the name of the user of the terminal apparatus 70-*n* having transmitted message information JMs to the SNS server 60, and the date and time when the message information JMs was transmitted from the terminal apparatus 70-$n$. In the message body display area Ar2, there is displayed a message Ms included in the message information JMs transmitted from the terminal 70-$n$ to the SNS server 60. In the specific character string display area Ar3, there are displayed specific character strings included in the message information JMs transmitted from the terminal 70-$n$ to the SNS server 60. In the profile image display area Ar4, there is displayed a profile image of the user of the terminal apparatus 70-$n$ having transmitted the message information JMs to the SNS server 60.

It is to be noted that in the present embodiment, the user of the terminal apparatus 70-$n$ can use points when transmitting to the SNS server 60 message information JMs including a message Ms related to one or both of the soccer video game and the game video for distribution DD. Here, the "points" may be values in a soccer video game, such as virtual money usable in a soccer video game, or values in the real world, such as money usable in the real world. Also, "the use of points" may mean, for example, that the user of the terminal apparatus 70-$n$ offers points to the user U-m of the game apparatus 10-$m$, or that the user of the terminal apparatus 70-$n$ offers points to the organizer of a soccer video game, or that the user of the terminal apparatus 70-$n$ exchanges points owned by the user of the terminal apparatus 70-$n$ for goods or services provided by the sponsor of a soccer video game.

In the present embodiment, the terminal apparatus 70-$n$ transmits message information JMs including used point information JPT to the SNS server 60 when the user of the terminal apparatus 70-$n$ has used points. Here, the used point information JPT indicates points Pt representing the quantity of points used when points are used by the user of the terminal apparatus 70-$n$. In the present embodiment, as will be described in detail later, it is assumed that the message information JMs includes user name information, and message transmission date and time information, in addition to message body information indicating a message Ms, specific character string information indicating a specific character string, and used point information JPT. As shown as an example in FIG. 6, the SNS server 60 displays the points Pt indicated by the used point information JPT included in the message information JMs transmitted from the terminal 70-$n$ to the SNS server 60 in the used point display area Ar5.

Also, in the present embodiment, the user of the terminal apparatus 70-$n$ can make a positive reaction to messages Ms displayed in the SNS site GS. The SNS server 60 counts the number of positive reactions each message Ms has received and stores the count value as the number of positive reactions Pf. Then, as illustrated in FIG. 6, the SNS server 60 displays the number of positive reactions Pf stored by the SNS server 60 in the positive reaction number display area Ar6.

As mentioned above, the message management server 30 supplies the message information JMs acquired from the SNS server 60 to the game apparatus 10-$m$. In addition, the message management server 30 acquires reaction number information JPF from the SNS server 60 and supplies the acquired reaction number information JPF to the game apparatus 10-$m$. Here, the reaction number information JPF indicates the number of positive reactions Pf that the message Ms has received. As described above, the game apparatus 10-$m$ is able to incorporate a message Ms included in the message information JMs supplied from the message management server 30, into the game video for display DH.

In the present embodiment, when the game apparatus 10-$m$ executes a soccer video game, the game progression period TG from the start of the soccer video game to the end of the soccer video game is divided into one or more in-play periods TG1 and one or more out-of-play periods TG2. In the following, the in-play period TG1 and the out-of-play period TG2 may be collectively referred to as game period TGq. That is, the game progression period TG is divided into multiple game periods TGq.

In the present embodiment, the in-play period TG1 may be a period during which the state of the player character CC-m or the ball object OB can be changed in the virtual space Fd based on the operation of the game apparatus 10-$m$ carried out by the user U-m of the game apparatus 10-$m$, for example. Specifically, the in-play period TG1 may be, during gameplay of a soccer video game, a general term for the period from the start (kickoff) of a match of the soccer video game to the end of the first half of the match (excluding a game suspension period), and the period from the start of the second half of the match to the end of the second half of the match (excluding a game suspension period). Here, the game suspension period may be a period during which the progress of a match of the soccer video game is temporarily suspended in response to a goal or a foul play, etc., in the soccer video game. Alternatively, the game suspension period may be a period from a point in time when the user U-m of the game apparatus 10-$m$, by operating the game apparatus 10-$m$ suspends the progress of a match of the soccer video game until the user U-m lifts the suspension. The game suspension period may be a period obtained by removing a period during which the user U-m of the game apparatus 10-$m$ is operating the game apparatus 10-$m$, from a period during which the progression of a match of the soccer video game is temporarily suspended in response to a goal or a foul play in the soccer video game. Alternatively, the game suspension period may be a period obtained by removing a period during which the user U-m of the game apparatus 10-$m$ is operating the game apparatus 10-$m$, from a period from a point in time when the match of the soccer video game is temporarily suspended by the user U-m of the game apparatus 10-$m$ by operating the game apparatus 10-$m$ until the temporary suspension is lifted by the user U-m by operating the game apparatus 10-$m$.

The out-of-play period TG2 may be, for example, a period during which the user U-m of the game apparatus 10-$m$ is unable to change the state of the player character CC-m and the ball object OB in the virtual space Fd. Specifically, the out-of-play period TG2 may be, during gameplay of a soccer video game, a general term for, for example, the period before the start of the match (before kickoff), the period from the end of the first half to the start of the second half of the match (half time), the period after the end of the second half of the match, and a game suspension period.

The "state of the player character CC-m" may be, for example, a position, a posture, a moving speed, or a moving direction of the player character CC-m in the virtual space Fd, may be a possibility that there exists the player character CC-m in the soccer video game, or may be one, some, or all of these. The "state of the ball object OB" may be, for example, a position, a moving speed, or a moving direction of the ball object OB in the virtual space Fd.

It is to be noted that the in-play period TG1 may be, for example, a period in which the final outcome of a soccer video game is likely to change at the end of the match of the soccer video game, when compared with the out-of-play period TG2. For example, the in-play period TG1 may be a period in which the progress of a soccer video game in the in-play period TG1 may affect the final outcome of the match of the soccer video game. For example, the out-ofplay period TG2 may be a period in which the progress of a soccer video game in the out-of-play period TG2 has no possibility of affecting the final outcome of a match of the soccer video game. In addition, the in-play period TG1 may be, for example, a period during which a result determination parameter may change. In the present embodiment, the result determination parameter may be a parameter for determining the final outcome of a match of the soccer video game. Specifically, the result determination parameter may be the scores of the teams T1 and T2 in a match of the soccer video game. In the present embodiment, a "soccer video game" is shown as an example of a "video game." However, in a case in which the "video game" is a video game such as a "fighting video game" or a "shooting video game", in which a first character that is the object of operation of the user U-m of the game apparatus 10 engages in battle versus a second character, the result determination parameter may be a parameter indicating a possibility that there exist the first character and the second character in the video game, such as hit points of the first character and the second character.

The game apparatus 10-m may also cause the soccer video game to progress in an in-play progression mode in the in-play period TG1 and to progress in an out-of-play progression mode in the out-of-play period TG2. Here, the in-play progression mode may be a progression mode in which the state of the player character CC-m or the ball object OB can be changed in the virtual space Fd based on the operation of the game apparatus 10-m carried out by the user U-m of the game apparatus 10-m, for example. The out-of-play progression mode may be, for example, a progression mode in which the user U-m of the game apparatus 10-m is not allowed to change the state of the player character CC-m and the ball object OB in the virtual space Fd.

It is to be noted that the in-play progression mode may be, for example, a progression mode in which the final outcome of a match of the soccer video game is likely to change at the end of the soccer video game, as compared with the out-of-play progression mode. For example, the in-play progression mode may be a progression mode in which the progression of the soccer video game by the in-play progression mode may affect the final outcome of a match of the soccer video game. For example, the out-of-play progression mode may be a progression mode in which the progression of the soccer video game by the out-of-play progression mode is not likely to affect the final outcome of a match of the soccer video game.

Figure 7:
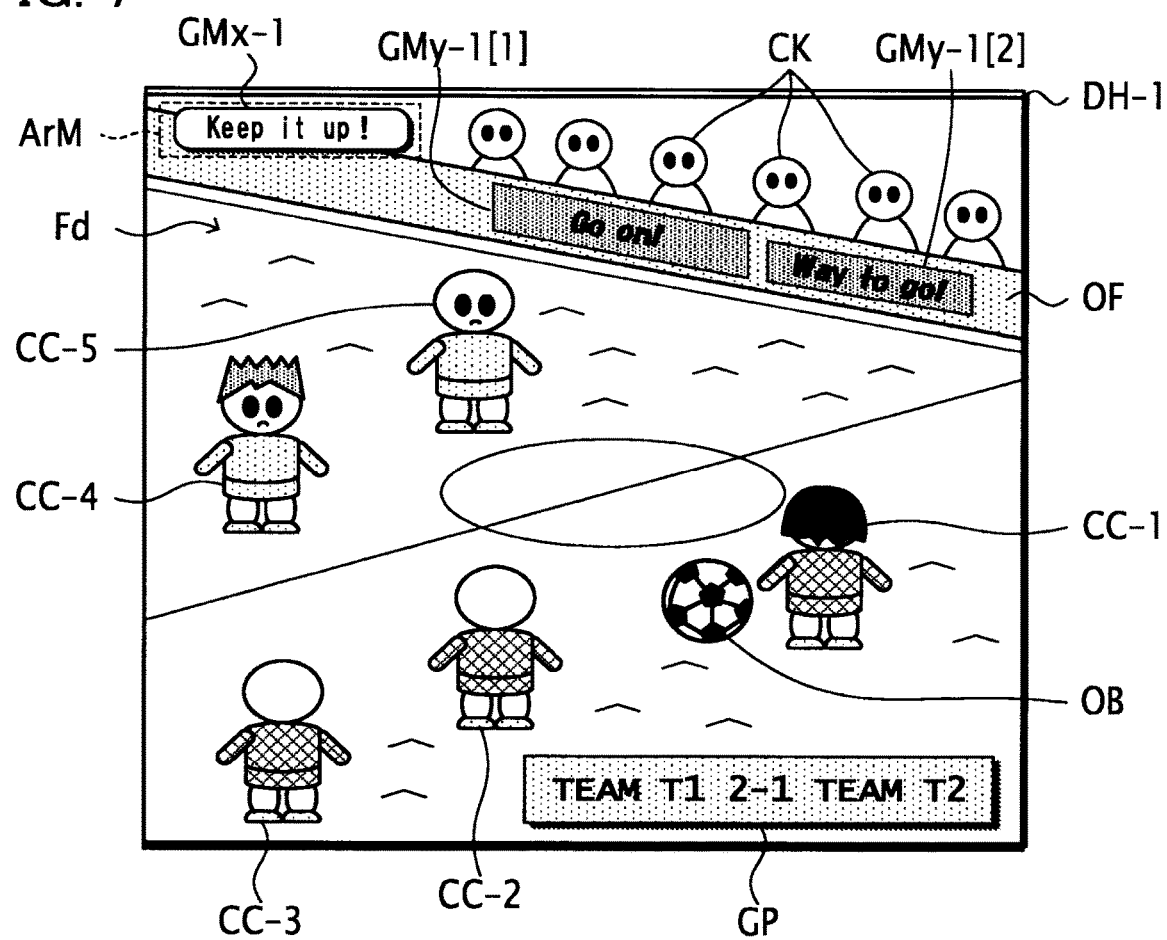
FIG. 7 is an explanatory diagram showing an example overview of the game video for display DH-1.
Figure 8:
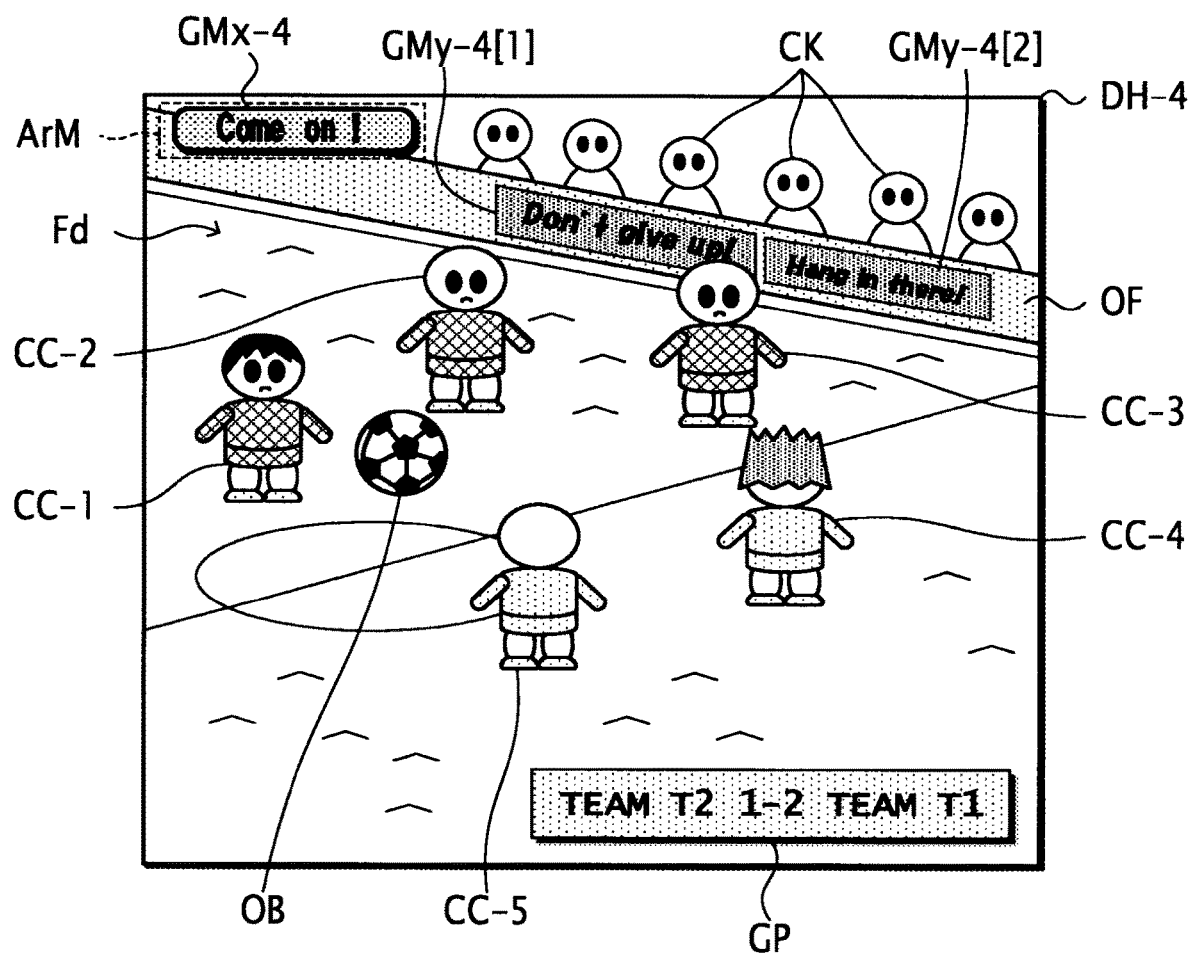
FIG. 8 is an explanatory diagram showing an example overview of the game video for display DH-4.

FIGS. 7 and 8 each are explanatory diagrams for explaining an example overview of the game video for display DH-m into which a message Ms has been incorporated, the game video for display DH-m being displayed when the game apparatus 10-m is executing a soccer video game in the in-play progression mode during the in-play period TG1. FIG. 7 is an explanatory diagram for explaining an example overview of the game video for display DH-1 generated by the game apparatus 10-1, and FIG. 8 is an explanatory diagram for explaining an example overview of the game video for display DH-4 generated by the game apparatus 10-4.

As shown in FIGS. 7 and 8, in the present embodiment, the game apparatus 10-m incorporates messages Ms as superimposed display images GMx-m or as in-virtual space display images GMy-m into the game video for display DH-m in the in-play progression mode. In the following, the superimposed display image GMx-m and the in-virtual space display image GMy-m may be collectively referred to as message display image GM-m. As illustrated in FIGS. 7 and 8, one or more message display images GM-m corresponding to one or more messages Ms are displayed in the present embodiment.

Here, the superimposed display image GMx-m is an image superimposed on an image representing the virtual space Fd represented in the game video for display DH-m. In the present embodiment, the game apparatus 10-m displays the superimposed display image GMx-m in a limited area ArM, in progressing the soccer mode in the in-play progression mode during the in-play period TG1. The limited area ArM is an area located at the edge of display unit 21-m of the display unit 21-m displaying the game video for display DH m.

The in-virtual space display image GMy-m is an image displayed in an object residing in the virtual space Fd represented in the game video for display DH-m. In the present embodiment, the game apparatus 10-m displays the in-virtual space display image GMy-m on the surface of the fence object OF residing in the virtual space Fd, in progressing the soccer video game in the in-play progression mode during the in-play period TG1.

In the present embodiment, the message display images GM-m are classified into colored display images GMxC and non-colored display images GMxB. Here, the colored display image GMxC is an image in which the background of the character string of a message Ms is colored in the message display image GM-m. The non-colored display image GMxB is an image in which the background of the character string of a message Ms is not colored in the message display image GM-m. Here, "an image in which the background of the character string is not colored" may be, for example, an image in which the background of the character string of a message Ms is white, or an image in which the background of the character string of a message Ms is colorless, transparent, or translucent. That is, in the present embodiment, the colored display image GMxC is more visible than the non-colored display image GMxB.

In the present embodiment, the message display images GM-m are classified into large display images GMxL and small display images GMxS. Here, the large display image GMxL is an image in which the size of each character that constitutes a message Ms in the message display image GM-m is larger than that of the small display image GMxS. That is, the small display image GMxS is an image in which the size of each character that constitutes a message Ms in the message display image GM-m is smaller than that of the large display image GMxL. That is, in the present embodiment, the large display image GMxL is more visible than the small display image GMxS.

In the present embodiment, the message display images GM-m are classified as display images GMxP with audio and display images GMxN without audio. A display image GMxP with audio is, among the message display images GM-m, an image in which audio representing the message Ms by the message display image GM-m is played when the message display image GM-m is displayed in the game video for display DH-m. A display image GMxN without audio is, among the message display images GM-m, an image in which audio representing the message Ms by the message display image GM-m is not played when the message display image GM-m is displayed in the game video for display DH-m. Thus, in the present embodiment, the probability of the display image GMxP with audio being recognized is greater than the probability of the display image GMxN without audio being recognized.

As shown in FIGS. 7 and 8, a message display image GM displayed in a game video for display DH may differ from a message display image GM displayed in another game video for display DH in the present embodiment. For example, in FIGS. 7 and 8, a superimposed display image GMx-1, an in-virtual space display image GMy-1[1], and an in-virtual space display image GMy-1[2] are displayed in a game video for display DH-1, and a superimposed display image GMx-4, an in-virtual space display image GMy-4[1], and an in-virtual space display image GMy-4 [2] are displayed in a game video for display DH-4.

Figure 9:
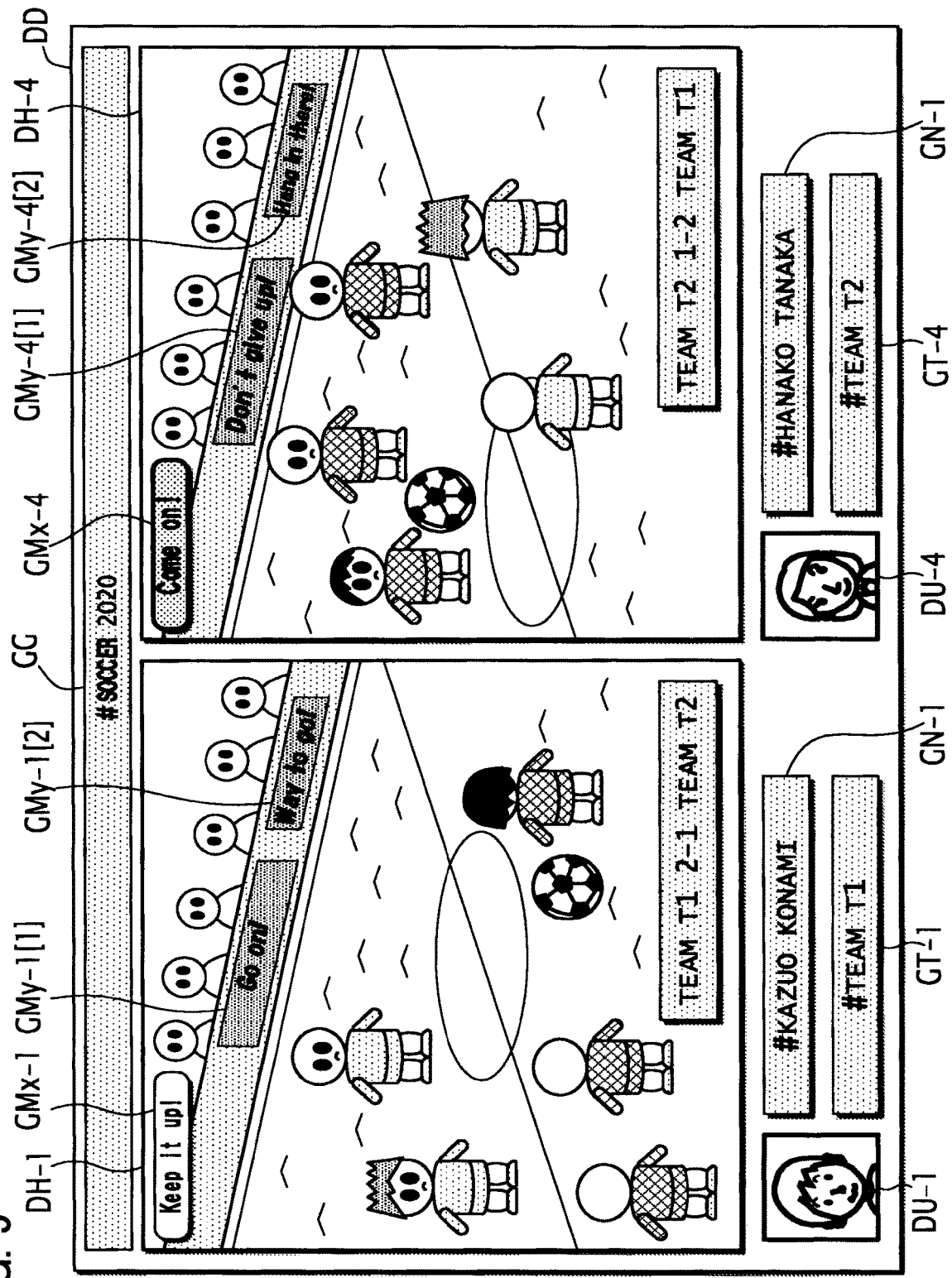
FIG. 9 is an explanatory diagram showing an example overview of the game video for distribution DD.

FIG. 9 is an explanatory diagram for explaining an example overview of the game video for distribution DD generated by the video editing apparatus 40 after messages Ms are incorporated into the game video for display DH-m.

As illustrated in FIG. 9, even after the messages Ms are incorporated into the game video for display DH-1 and the game video for display DH-4, the video editing apparatus 40 generates the game video for distribution DD including the game video for display DH-1 shown in FIG. 7 and the game video for display DH-4 shown in FIG. 8.

Figure 10:
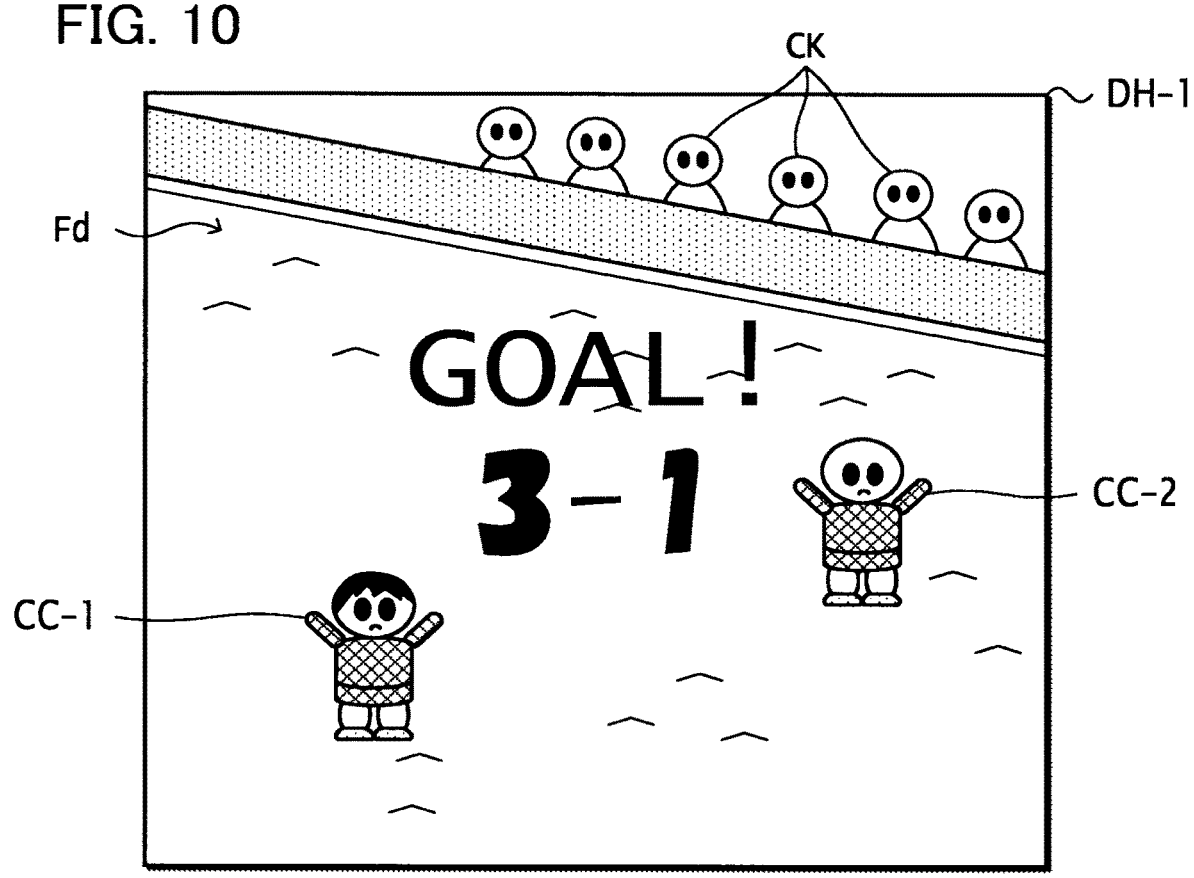
FIG. 10 is an explanatory diagram showing an example overview of the game video for display DH-1 in the out-of-play period TG2.
Figure 11:
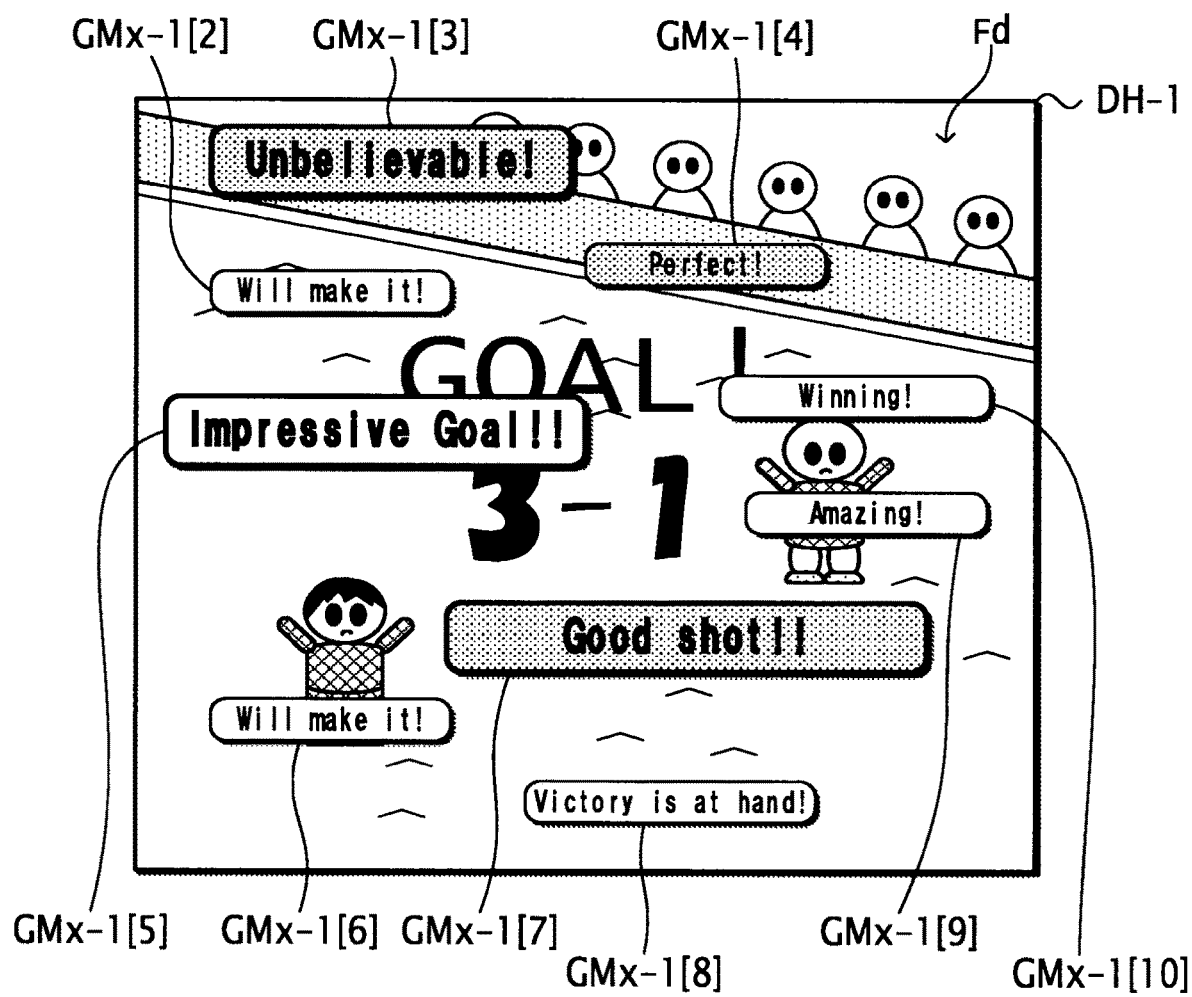
FIG. 11 is an explanatory diagram showing an example overview of the game video for display DH-1 in the out-of-play period TG2.

FIGS. 10 and 11 each are an explanatory diagram for explaining an example of the overview of the game video for display DH-m displayed when the game apparatus 10-m is executing a soccer video game in the out-of-play progression mode during the out-of-play period TG2. FIG. 10 is an explanatory diagram for explaining an example of a game video for display DH-1 generated by the game apparatus 10-1, of the out-of-play period TG2, during a period before the messages Ms are incorporated. FIG. 11 is an explanatory diagram for explaining an example of the game video for display DH-1 generated by the game apparatus 10-1 after the message Ms is incorporated in the out-of-play period TG2.

As shown in FIG. 10, in the present embodiment, in the out-of-play period TG2, the player character CC-m moves independently of the operation of the game apparatus 10-m by the user U-m. For example, FIG. 10 shows an example in which the player character CC-m performs an action that expresses joy immediately after scoring a goal in a soccer video game. However, this action expressing joy of the player character CC-m is a predetermined action that does not depend on the operation of the game apparatus 10-m by the user U-m.

As illustrated in FIG. 11, in the out-of-play period TG2, after the messages Ms are incorporated, superimposed display images GMx-m are displayed in the game video for display DH-m. In the example shown in FIG. 11, in the game video for display DH-1, the game apparatus 10-m displays a superimposed display image GMx-1[3] and a superimposed display image GMx-1[7] that are colored display images GMxC, as well as large display images GMxL; a superimposed display image GMx-1[4] that is a colored display image GMxC as well as a small display image GMxS; a superimposed display image GMx-1[5] that is a non-colored display image GMxB as well as a large display image GMxL; and a superimposed display image GMx-1[2], a superimposed display image GMx-1[6], and a superimposed display image GMx-1[8], a superimposed display image GMx-1[9], and a superimposed display image GMx-1[10] that are non-colored display images GMxB as well as small display images GMxS.

In the example shown in FIG. 11, one, some, or all of the superimposed display images GMx-1[2] to GMx-1[10] displayed in the game video for display DH-1 may be display images GMxP with audio. In this case, in the example shown in FIG. 11, among the superimposed display images GMx-1[2] to GMx-1[10] displayed in the game video for display DH-1, superimposed display images GMx-m other than the one or more display images GMxP with audio corresponds to display image GMxN without audio.

In the present embodiment, the superimposed display image GMx-m is displayed in the game video for display DH-m during the in-play period TG1, but the present invention is not limited thereto. The game apparatus 10-m does not have to display the superimposed display image GMx-m in the game video for display DH-m during the in-play period TG1.

In the present embodiment, the in-virtual space display image GMy-m is not displayed in the game video for display DH-m during the out-of-play period TG2, but the present invention is not limited thereto. The game apparatus 10-m may display the in-virtual space display image GMy-m together with the superimposed display image GMx-m in the game video for display DH-m even in the out-of-play period TG2.

3. Functions of Game Apparatus and Message Management Server

In the following, the functions of the game apparatus 10 and the message management server 30 are described with reference to FIGS. 12 through 15.

Figure 12:
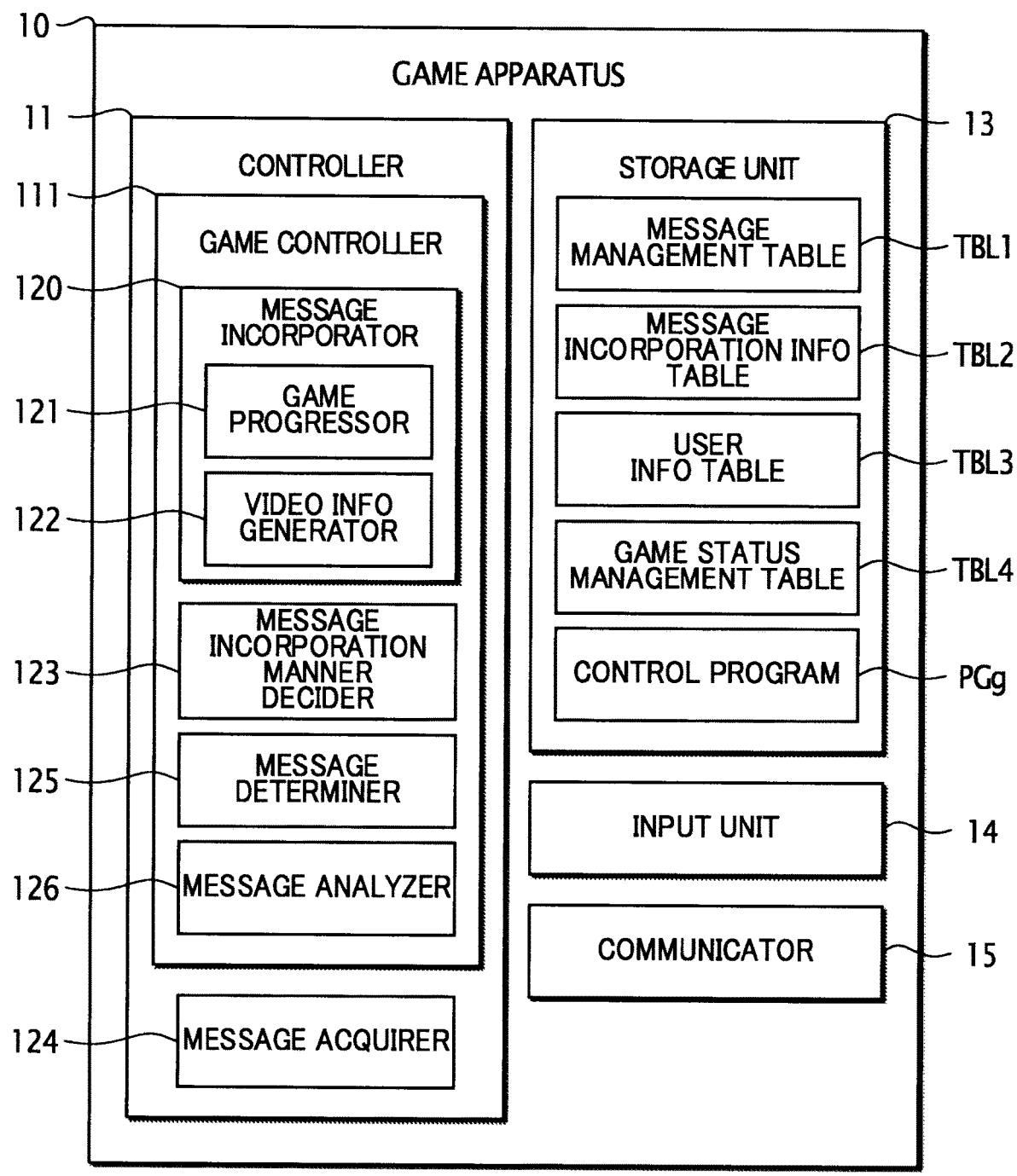
FIG. 12 is a block diagram showing an example configuration of a game apparatus 10.

FIG. 12 is a functional block diagram showing an example configuration of the game apparatus 10.

As illustrated in FIG. 12, the game apparatus 10 includes a controller 11 for controlling each element of the game apparatus 10, a storage unit 13 for storing various types of information, an input unit 14 for receiving operations by a user U of the game apparatus 10, and a communicator 15 for executing communications between external devices outside the game apparatus 10.

As illustrated in FIG. 12, the controller 11 includes a game controller 111 and a message acquirer 124. The game controller 111 includes a message incorporator 120, a message incorporation manner decider 123, a message determiner 125, and a message analyzer 126.

The message acquirer 124 acquires message information JMs and reaction number information JPF supplied from the message management server 30. The message determiner 125 determines whether or not to incorporate a message Ms included in the message information JMs supplied from the message management server 30 into the game video for display DH. The message analyzer 126 analyzes one or both of the message information JMs and the reaction number information JPF supplied from the message management server 30 and generates analysis information Jk indicating the results of such analysis.

The message incorporation manner decider 123 determines how to incorporate the message Ms included in the message information JMs supplied by the message management server 30 into the game video for display DH. The message incorporator 120 includes a game progressor 121 and a video information generator 122. The game progressor 121 causes a soccer video game to progress. The video information generator 122 generates game-video-for display information JDH indicating a game video for display DH.

As illustrated in FIG. 12, the storage unit 13 has stored therein a message management table TBL1, a message incorporation information table TBL2, a user information table TBL3, a game status management table TBL4, and a control program PGg for controlling each element of the game apparatus 10.

Figure 13:
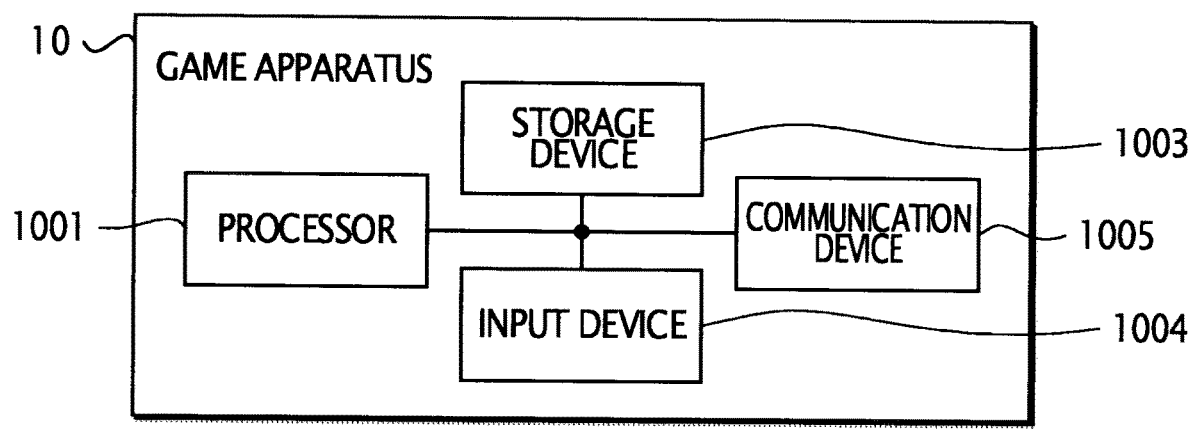
FIG. 13 is a block diagram showing an example hardware configuration of the game apparatus 10.

FIG. 13 is a configuration diagram showing an example hardware configuration of the game apparatus 10.

As shown in FIG. 13, the game apparatus 10 includes a processor 1001 for controlling each element of the game apparatus 10, a storage device 1003 for storing various types of information, a input device 1004 for receiving operations by the user U of game apparatus 10, and a communication device 1005 for communicating with external devices outside the game apparatus 10. The storage device 1003 is, for example, a computer-readable recording medium. The storage device 1003 is a non-transitory storage medium that comprises, for example, one or both of a volatile memory, such as a random access memory (RAM), that functions as a work area of the processor 1001 and a non-volatile memory, such as an electrically erasable programmable read-only memory (EEPROM), that stores various types of information, such as the control program PGg, thus serving as the storage unit 13. In the present embodiment, the storage device 1003 is given as an example of a "recording medium" in which the control program PGg is recorded. However, the present invention is not limited thereto. The "recording medium" in which the control program PGg is recorded may be a storage device provided in an external device external to the game apparatus 10. For example, the "recording medium" in which the control program PGg is recorded may be a storage device that is external to the game apparatus 10, is provided in a distribution server that distributes the control program PGg, and has recorded therein the control program PGg. The processor 1001 may comprise, for example, one or more central processing units (CPUs). By the executing control program PGg stored in the storage device 1003 and operating in accordance with the control program PGg, the processor 1001 serves as the controller 11. It is of note that the processor 1001 may be constituted of hardware, such as a Graphics Processing Unit (GPU), a Digital Signal Processor (DSP), or a Field Programmable Gate Array (FPGA) in addition to, or instead of, the one or more CPUs. In this case, part or all of the controller 11 realized by the processor 1001 may be realized by hardware such as a DSP. Furthermore, the processor 1001 may be constituted of one, some, or all of (i) the one or more CPUs and (ii) the one or more hardware elements. For example, in a case in which the processor 1001 is constituted of multiple CPUs, one, some, or all of the functions of the controller 11 may be realized by having one, some, or all of, the one or more CPUs work in cooperation and in accordance with the control program PGg. In addition, the input device 1004 is, for example, a control button, and serves as an input unit 14 that receives an operation input of the user U of the game apparatus 10. The input device 1004 may comprise one or more devices, and may include one, some, or all of a control button, touch panel, keyboard, joystick, and pointing device (e.g., a mouse). The communication device 1005 is a hardware for communicating with external devices external to the game apparatus 10 via either a wired network or a wireless network, or both, and serves as the communicator 15.

Figure 14:
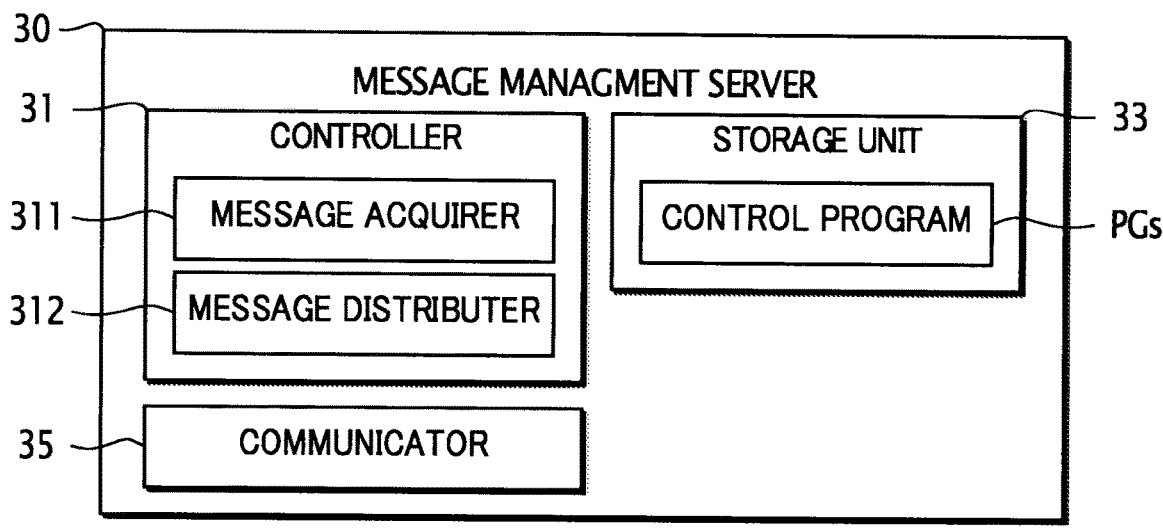
FIG. 14 is a block diagram showing an example configuration of a message management server 30.

FIG. 14 is a functional block diagram showing an example configuration of the message management server 30.

As illustrated in FIG. 14, the message management server 30 includes a controller 31 for controlling each element of the message management server 30, a storage unit 33 for storing various types of information, and a communicator 35 for performing communication with external devices outside of the message management server 30.

As illustrated in FIG. 14, the controller 31 includes a message acquirer 311 and a message distributer 312. The message acquirer 311 acquires message information JMs from the SNS server 60. The message distributer 312 distributes message information JMs and reaction number information JPF to the game apparatus 10-m.

As illustrated in FIG. 14, the storage unit 33 has stored therein a control program PGs for controlling each element of the message management server 30.

Figure 15:
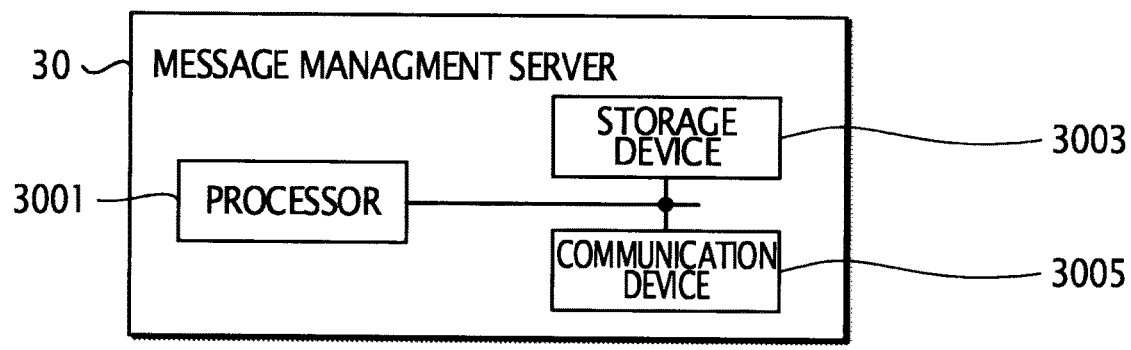
FIG. 15 is a block diagram showing an example hardware configuration of the message management server 30.

FIG. 15 is a configuration diagram showing an example hardware configuration of the message management server 30.

As illustrated in FIG. 15, the message management server 30 includes a processor 3001 for controlling each element of the message management server 30, a storage device 3003 for storing various types of information, and a communication device 3005 for communicating with external devices outside of the message management server 30. The storage device 3003 is, for example, a computer-readable recording medium. The storage device 3003 is a non-transitory storage medium that includes, for example, one or both of a volatile memory, such as a RAM, that functions as a work area of the processor 3001 and a non-volatile memory, such as an EEPROM, that stores various types of information, such as the control program PGs, thus serving as the storage unit 33. The processor 3001 is constituted of, for example, one or more CPUs. By executing the control program PGs stored in the storage device 3003 and operating in accordance with the control program PGs, the processor 3001 functions as the controller 31. It is to be noted that the processor 3001 may be constituted of hardware such as a GPU, DSP, or FPGA in addition to, or in place of, the one or more CPUs. In this case, part or all of the controller 31 realized by processor 3001 may be realized by hardware, such as a DSP. In addition, the communication device 3005 is hardware for communicating with external devices external to the message management server 30 via either a wired network or a wireless network, or both, thus serving as the communicator 35.

4. Data Stored in the Game Apparatus

The data stored in the game apparatus 10 will be described below with reference to FIGS. 16 and 17.

FIG. 16 is an explanatory diagram showing an example data configuration of the message management table TBL1.

As illustrated in FIG. 16, the message management table TBL1 has, of one or more pieces of message information JMs supplied from the message management server 30 to the game apparatus 10, one or more records corresponding one-to-one with one or more pieces of message information JMs including a soccer game specific character string corresponding to a soccer video game running in the game apparatus 10. In the following, among the pieces of message information JMs, a piece of message information JMs that includes a soccer game specific character string corresponding to the soccer video game running in the game apparatus 10 will be referred to as "game message information."

Each record of the message management table TBL1 includes a message ID and an acquired message information. Here, the message ID is information for identifying each piece of game message information among one or more pieces of game message information supplied from the message management server 30 to the game apparatus 10.

The acquired message information includes message body information and message annex information. The message body information indicates a message Ms included in the game message information supplied from the message management server 30 to the game apparatus 10.

The message annex information includes user name information, message transmission date and time information, specific character string information, used point information JPT, and reaction number information JPF. The user name information indicates a user name of a terminal apparatus 70 that has transmitted the game message information. The message transmission date and time information indicates the date and time when the game message information was transmitted from the terminal apparatus 70.

In addition, the specific character string information indicates a specific character string included in the game message information transmitted from the terminal apparatus 70. In the present embodiment, the specific character string information includes team-specific character string information and user-specific character string information. The team-specific character string information indicates a team-specific character string included in the game message information transmitted from the terminal apparatus 70. The user-specific character string information indicates a user-specific character string included in the game message information transmitted from the terminal apparatus 70.

As described above, the used point information JPT indicates the points Pt used in the terminal apparatus 70 when the game message information was output from the terminal apparatus 70. In addition, as mentioned above, the reaction number information JPF indicates the number of positive reactions Pf for the game message information.

FIG. 17 is an explanatory diagram showing example data configuration of a message incorporation information table TBL2.

As illustrated in FIG. 17, the message incorporation information table TBL2 has one or more records corresponding one-to-one with one or more pieces of game message information supplied from the message management server 30 to the game apparatus 10. Each record of the message incorporation information table TBL2 contains a message ID and message incorporation information.

The message incorporation information includes message feature information, message priority information, and message incorporation completion information.

The message feature information includes message target team applicability information, message target user applicability information, used point information, and positive word applicability information.

The message target team applicability information indicates whether the game message information transmitted from the terminal apparatus 70 includes a team-specific character string corresponding to a team to which the user U of the game apparatus 10 belongs in the soccer video game. In the present embodiment, as an example, as shown in FIG. 17, the message target team applicability information indicates "1" when the team-specific character string included in the game message information transmitted from the terminal apparatus 70 corresponds to the team to which the user U of the game apparatus 10 belongs, and "0" when the team-specific character string included in the game message information transmitted from the terminal apparatus 70 does not correspond to the team to which the user U of the game apparatus 10 belongs, and also "0" when the game message information transmitted from the terminal apparatus 70 does not include any team specific character string.

The message target user applicability information indicates whether the game message information transmitted from the terminal apparatus 70 includes a user-specific character string applicable to the user U of the game apparatus 10. In the present embodiment, as an example, as shown in FIG. 17, the message target user applicability information indicates "1" when a user specific character string included in the game message information transmitted from the terminal apparatus 70 corresponds to the user U of game apparatus 10, and "0" when the user specific character string included in the game message information transmitted from the terminal apparatus 70 does not correspond to the user U of game apparatus 10, and also "0" when the game message information transmitted from the terminal apparatus 70 does not include any user specific character string.

The used point information indicates whether or not the points Pt indicated by the used point information JPT included in the game message information transmitted from the terminal apparatus 70 is greater than 0. That is, the used point information indicates whether or not points were used in association with transmission of the game message information from the terminal apparatus 70 when the game message information was transmitted from the terminal apparatus 70. In the present embodiment, as an example, the used point information indicates "1" when the game message information was transmitted from the terminal apparatus 70 and the points were used in association with the transmission of the game message information from the terminal apparatus 70, and "0" when the game message information was transmitted from the terminal apparatus 70 but the points were not used in association with the transmission of the game message information from the terminal apparatus 70, as shown in FIG. 17.

In addition, the positive word applicability information indicates whether or not the message Ms included in the game message information transmitted from the terminal apparatus 70 has a positive meaning. In the present embodiment, as an example, as shown in FIG. 17, positive word applicability information indicates "1" when the message Ms included in the game message information transmitted from the terminal apparatus 70 has a positive meaning, and indicates "0" when the message Ms included in the game message information transmitted from the terminal apparatus 70 does not have a positive meaning.

The message priority information indicates a priority Φ in incorporating the message Ms into the game video for display DH, the message Ms being included in the game message information transmitted from the terminal apparatus 70. In the present embodiment, as an example, when the priority Φ corresponding to the game message information is high, the game message information is preferentially incorporated into the game video for display DH compared with a case in which the priority Φ is low.

The message incorporation completion information indicates that the incorporation, into the game video for display DH, of the message Ms included in the game message information transmitted from the terminal apparatus 70 has been completed, or that it has been determined that the message Ms is not to be incorporated into the game video for display DH, or that the processing for incorporating the message Ms into the game video for display DH has not been completed. In the present embodiment, as an example, as shown in FIG. 17, the message incorporation completion information indicates "1" when the incorporation, into the game video for display DH, of the message Ms included in the game message information transmitted from the terminal apparatus 70 has been completed, and when it has been determined that the message Ms is not to be incorporated into the game video for display DH, and "0" when the processing for incorporating, into the game video for display DH, of the message Ms included in the game message information transmitted from the terminal apparatus 70 has not been completed.

Although not shown, the user information table TBL3 stores a soccer game specific character string corresponding to the soccer video game executed by the user U of the game apparatus 10, a team specific character string corresponding to the team to which the user U of game apparatus 10 belongs in the soccer video game, and a user specific character string corresponding to the user U of game apparatus 10.

Although not shown, the game status management table TBL4 has stored therein the conditions of all the player characters CC-m and the conditions of various objects, such as a ball object OB, in the soccer video game executed by the user U of the game apparatus 10.

The game status management table TBL4 has also stored therein progress status information that indicates the progress of a soccer video game. Here, the progress status information includes probability information that indicates the probability of affecting the final outcome of a match of the soccer video game at respective points in time while the soccer video game is in progress. The probability information is information that includes one or both of period-type information and mode-type information. The period-type information indicates in which of an in-play period TG1 or an out-of-play period TG2 the soccer video game is in progress. For example, in a case in which the period type information indicates that a soccer video game is in progress in the in-play period TG1, it is more likely to affect the final outcome of a match of the soccer video game than a case in which it indicates that a soccer video game is in progress in the out-of-play period TG2. The mode type information indicates which of an in-play progression mode or an out-of-play progression mode the soccer video game is in. For example, in a case in which the mode type information indicates that a soccer video game is in progress by the in-play progression mode, it is more likely to affect the final outcome of a match of the soccer video game than a case in which a soccer video game is in progress in the out-of-play progression mode.

5. Operation of Game Apparatus

The operation of the game apparatus 10 will be described below with reference to FIGS. 18 to 23.

5.1. Message Acquisition Processing

Upon supply of message information JMs from the message management server 30, the game apparatus 10 performs message acquisition processing, which is processing for acquiring the message information JMs.

Figure 18:
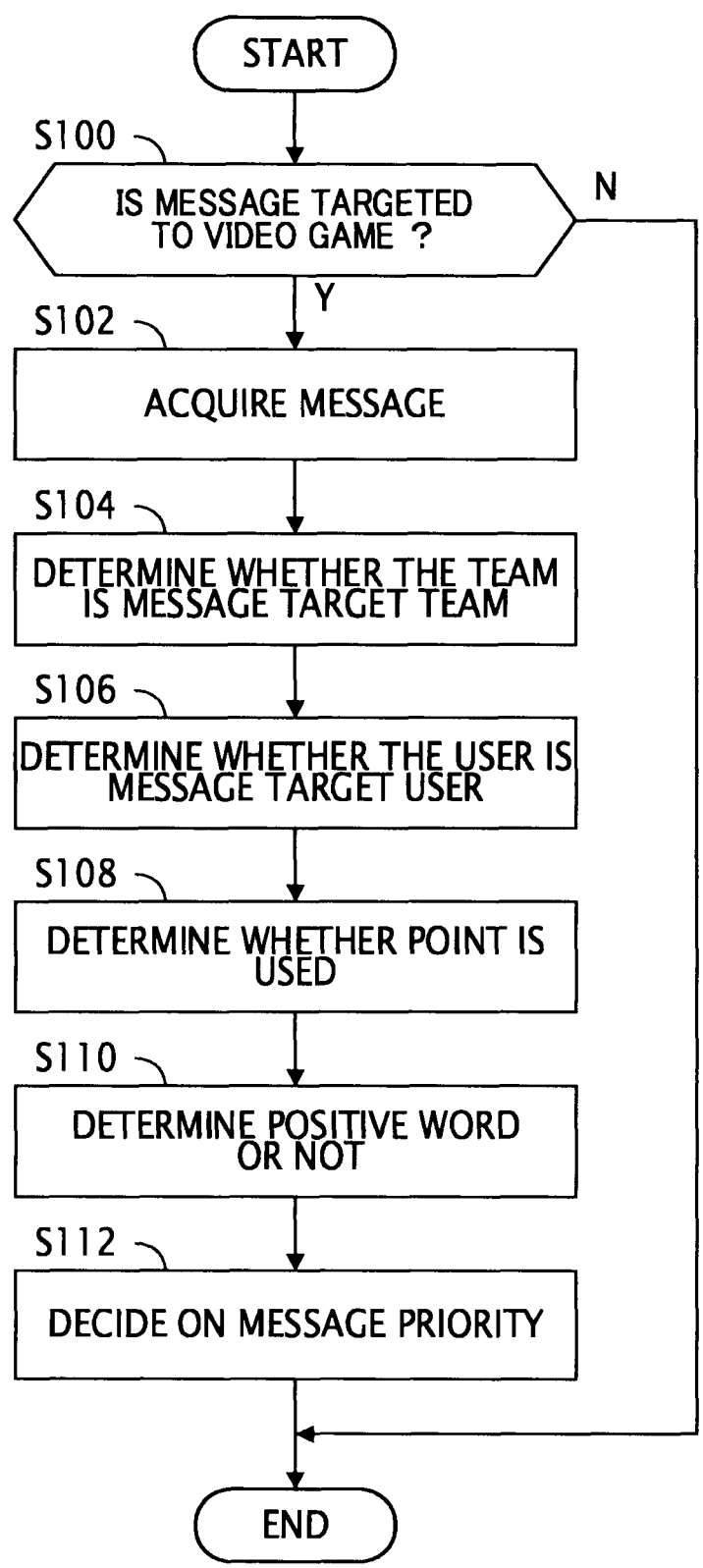
FIG. 18 is a flowchart showing an example operation of the game apparatus 10 when performing message acquisition processing.

FIG. 18 is a flowchart showing an example operation of the game apparatus 10 in a case in which the game apparatus 10 performs the message acquisition processing.

As shown in FIG. 18, when the message information JMs is supplied from the message management server 30 to the game apparatus 10, the message determiner 125 determines whether the supplied message information JMs includes a soccer game specific character string corresponding to the soccer video game being executed in the game apparatus 10 (S100).

When a result of the determination at step S100 is negative, the message determiner 125 discards the message information JMs subject to the determination at step S100, and ends the message acquisition processing shown in FIG. 18.

If a result of the determination at step S100 is affirmative, the message acquirer 124 acquires the message information JMs subject to the determination at step S100 as game message information (S102).

Specifically, at step S102, the message acquirer 124 adds a record to the message management table TBL1, assigns a new message ID to the added record, and stores the message information JMs subject to the determination at step S100 in the added record. At step S102, the message acquirer 124 also adds a record to the message incorporation information table TBL2 and stores the same message ID as the message ID assigned in the message management table TBL1, for the added record. Although not shown, in response to supply of reaction number information JPF from the message management server 30 to the game apparatus 10, the message acquirer 124 stores the reaction number information JPF in the message management table TBL1.

As shown in FIG. 18, the message determiner 125 determines whether the game message information acquired by the message acquirer 124 at step S102 includes a team specific character string that corresponds to a team to which the user U of the game apparatus 10 belongs (S104).

Specifically, at step S104, the message determiner 125 determines whether the character string indicated by the team-specific character string information stored by the message acquirer 124 in the message management table TBL1 at step S102 is the same character string as the team-specific character string stored in the user information table TBL3. If a result of the determination is affirmative, the message determiner 125 sets the value "1" to indicate that the team-specific character string included in the game message information corresponds to the team to which the user U of the game apparatus 10 belongs, in the message target team applicability information of the message incorporation information table TBL2. On the other hand, if a result of the determination is negative, the message determiner 125 sets the value "0" to indicate that the team-specific character string included in the game message information does not belong to the team to which the user U of the game apparatus 10 belongs, in the message target team applicability information of the message incorporation information table TBL2.

As shown in FIG. 18, the message determiner 125 determines whether or not a user-specific character string corresponding to the user U of the game apparatus 10 is included in the game message information acquired by the message acquirer 124 at step S102 (S106).

Specifically, at step S106, the message determiner 125 determines whether a character string indicated by the user specific character string information stored by the message acquirer 124 in the message management table TBL1 at step S102 is the same character string as the user-specific character string stored in the user information table TBL3. If a result of the determination is affirmative, the message determiner 125 sets the value "1" to indicate that the user-specific character string included in the game message information corresponds to the user U of the game apparatus 10, in the message target user applicability information of the message incorporation information table TBL2. On the other hand, if a result of the determination is negative, the message determiner 125 sets the value "0" to indicate that the user-specific character string included in the game message information does not correspond to the user U of the game apparatus 10, in the message target user applicability information of the message incorporation information table TBL2.

As illustrated in FIG. 18, the message determiner 125 determines whether the used point information JPT included in the game message information acquired by the message acquirer 124 at step S102 indicates a value greater than 0 (S108). Then, if a result of the determination is affirmative, the message determiner 125 sets the value "1" in the used point information of the message incorporation information table TBL2, indicating that the points were used in association with the transmission of the game message information from the terminal apparatus 70. On the other hand, if a result of the determination is negative, the message determiner 125 sets the value "0" in the used point information of the message incorporation information table TBL2, indicating that no points were used in association with the transmission of the game message information from the terminal apparatus 70.

As illustrated in FIG. 18, the message determiner 125 determines whether the message Ms included in the game message information acquired by the message acquirer 124 at step S102 has a positive meaning (S110). Then, if a result of the determination is affirmative, the message determiner 125 sets the value "1" to indicate that the message Ms included in the game message information has a positive meaning, in the positive word applicability information in the message incorporation information table TBL2. On the other hand, if a result of the determination is negative, the message determiner 125 sets the value "0" to indicate that the message Ms included in the game message information has no positive meaning, in the positive word applicability information in the message incorporation information table TBL2.

As shown in FIG. 18, the message determiner 125 decides on priority Φ based on the message target team applicability information generated at step S104, the message target user applicability information generated at step S106, the used point information generated at step S108, and the positive word applicability information generated at step S110, and stores message priority information indicating the decided priority Φ in the message incorporation information table TBL2 (S112). The message acquisition processing is then ended.

Specifically, at step S112, the message determiner 125 decides on the priority Φ such that, in a case in which the message target team applicability information indicates "1," the priority Φ is greater than that in a case in which it indicates "0." Furthermore, at step S112, the message determiner 125 decides on the priority Φ such that, in a case in which the message target user applicability information indicates "1," the priority Φ is greater than that in a case in which it indicates "0." In addition, at step S112, the message determiner 125 decides on the priority Φ such that, in a case in which the used point information indicates "1," the priority Φ is greater than that in a case in which the used point information indicates "0." In addition, at step S112, the message determiner 125 decides on the priority Φ such that, in a case in which the positive word applicability information indicates "1," the priority Φ is greater than that in a case in which it indicates "0."

5.2. Message Analysis Processing

In the present embodiment, the game apparatus 10 performs message analysis processing, which is a processing for analyzing multiple pieces of game message information acquired from the message management server 30, for example, in every analysis period. The analysis period (an example of a "tally period") may be, for example, a period from when the game apparatus 10 acquires a piece of reaction number information JPF from the message management server 30 to when the game apparatus 10 acquires the subsequent piece of reaction number information JPF from the message management server 30, or it may be a period having a predetermined length of time. The analysis period may be, for example, a period determined based on the current time.

Figure 19:
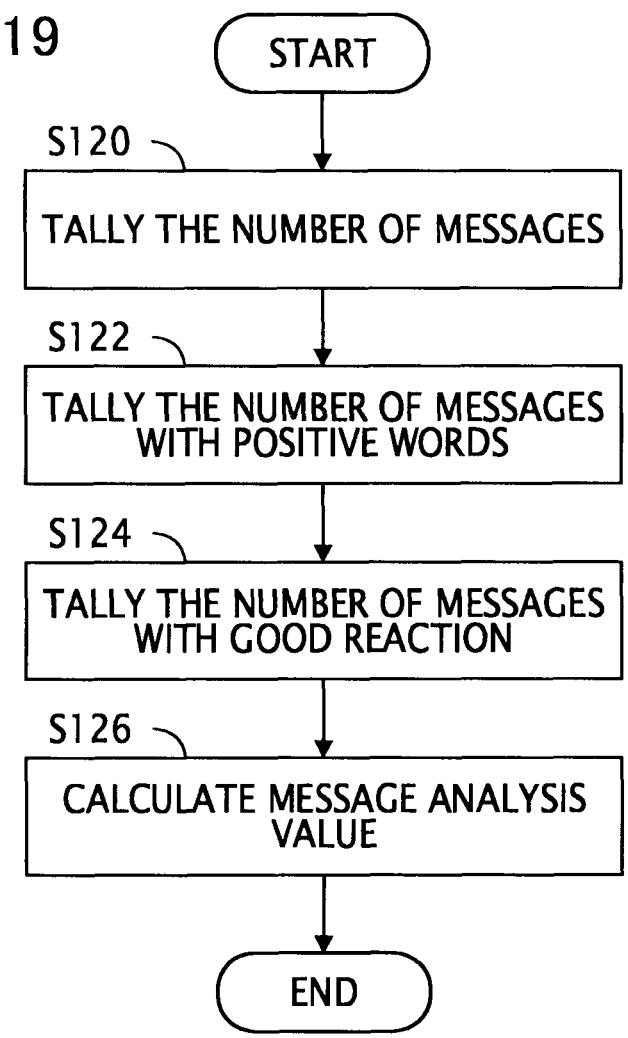
FIG. 19 is a flowchart showing an example operation of the game apparatus 10 when performing message analysis processing.

FIG. 19 is a flowchart showing an example operation of the game apparatus 10 in a case in which the game apparatus 10 performs the message analysis processing.

As shown in FIG. 19, at the end of each analysis period, the message analyzer 126 tallies the number of one or more pieces of game message information supplied from the message management server 30 to the game apparatus 10 during the analysis period. The message analyzer 126 then generates message tally information indicating a message total value θs, which is a result of the tally (S120). In the present embodiment, as an example, it is assumed that the message total value θs satisfies "0≤θs."

It is to be noted that, in the present embodiment, the message analyzer 126 may generate the message tally information such that, in a case in which the number of the pieces of game message information supplied to the game apparatus 10 during the analysis period is large, the message total value θs is greater than that in a case in which the number is small. Specifically, it is assumed in the present embodiment that, as an example, the message tally information indicates the number of pieces of game message information during the analysis period. However, the present invention is not limited thereto. The message tally information may be, for example, the average or median number of intervals at which a series of the game message information is acquired during the analysis period by the game apparatus 10. In this case, for example, the message total value θs may be calculated as an inverse of the average or median number of the intervals of the series of the game message information acquired during the analysis period by the game apparatus 10. The message tally information may also indicate, for example, a value obtained by dividing the number of pieces of game message information during the analysis period, by the time length of the analysis period.

At the end of each analysis period, the message analyzer 126 tallies the number of pieces of game message information in which the positive word applicability information indicates "1" among one or more pieces of game message information supplied from the message management server 30 to the game apparatus 10 during the analysis period, and generates message content information indicating a message positive word value θk as a result of the tally (S122). In the present embodiment, as an example, it is assumed that the message positive word value θk satisfies "0≤θk."

It is to be noted that in the present embodiment, the message analyzer 126 may generate message content information such that, in a case in which the number of pieces of the game message information for which the corresponding positive word applicability information indicates "1" is large, with the pieces of such game message information being supplied during the analysis period, the message positive word value θk becomes greater compared with that in a case in which the number of pieces of such game message information is small. Specifically, in the present embodiment, a case is assumed, as an example, in which the message content information indicates the number of pieces of game message information for which the corresponding positive word applicability information indicates "1," with the pieces of such game message information being supplied during the analysis period. However, the present invention is not limited thereto. The message content information may be, for example, the ratio of the number of pieces of game message information for which the positive word applicability information supplied during the analysis period indicates "1," relative to the number of pieces of game message information supplied during the analysis period. The message content information may be, for example, the number of words with positive meaning included in one or more pieces of game message information supplied to the game apparatus 10 during the analysis period. In addition, the message content information may indicate, for example, a value obtained by dividing the number of pieces of game message information for which the corresponding positive word applicability information indicates "1," the pieces of such game message information being supplied during the analysis period, by the time length of the analysis period.

At the end of each analysis period, the message analyzer 126 generates message evaluation information indicating a message evaluation value $\theta h$ based on one or more pieces of reaction number information JPF corresponding to the one or more pieces of game message information supplied from the message management server 30 to the game apparatus 10 in the analysis period (S124). In the present embodiment, as an example, it is assumed that the message evaluation value $\theta h$ satisfies "$0 \leq \theta h$."

Specifically, at step S124, the message analyzer 126 may generate message evaluation information by calculating, as the message evaluation value $\theta h$, the sum of one or more values of the number of positive reactions Pf indicated by one or more pieces of reaction number information JPF corresponding to one or more pieces of game message information supplied to the game apparatus 10. Alternatively, at step S124, the message analyzer 126 may generate message evaluation information by calculating, as the message evaluation value $\theta h$, the ratio of the number of pieces of game message information for which the number of positive reactions Pf is equal to or greater than a predetermined value, relative to the number of the pieces of game message information supplied to the game apparatus 10. Alternatively, at step S124, the message analyzer 126 may generate message evaluation information by calculating, as the message evaluation value $\theta h$, a value obtained by dividing the total value of one or more values of the number of positive reactions Pf indicated by one or more pieces of reaction number information JPF corresponding to one or more pieces of game message information supplied to the game apparatus 10, by the time length of the analysis period. It is to be noted that in the present embodiment, the message analyzer 126 may generate message evaluation information such that, in a case in which the total value of the values of the number of positive reactions Pf corresponding to the game message information supplied during the analysis period is large, the message evaluation value $\theta h$ is greater than that in a case in which the total value is small.

Then, the message analyzer 126 generates message analysis information indicating a message analysis value $\theta m$ based on the message tally information generated at step S120, the message content information generated at step S122, and the message evaluation information generated at step S124 (S126). In the present embodiment, as an example, it is assumed that the message analysis value $\theta m$ satisfies "$0 \leq \theta m$."

Specifically, the message analyzer 126 generates message analysis information such that, in a case in which the message total value $\theta s$ indicated by the message tally information is large, the message analysis value $\theta m$ is greater compared with a case in which the message total value $\theta s$ is small. Furthermore, the message analyzer 126 generates message analysis information such that in a case in which the message positive word value $\theta k$ represented by the message content information is large, the message analysis value $\theta m$ is greater compared with a case in which the message positive word value $\theta k$ is small. Furthermore, the message analyzer 126 generates message analysis information such that in a case in which the message evaluation value $\theta h$ indicated by the message evaluation information is large, the message analysis value $\theta m$ is greater, compared with a case in which the message evaluation value $\theta h$ is small. For example, the message analyzer 126 may generate the message analysis value $\theta m$ by adding the message total value $\theta s$, the message positive word value $\theta k$, and the message evaluation value $\theta h$.

It is to be noted that, in the present embodiment, the analysis information Jk described above is, for example, information that includes the message tally information, the message content information, the message evaluation information, and the message analysis information. However, the present invention is not limited thereto. The analysis information Jk may be information including at least one of the message tally information, the message content information, the message evaluation information, or the message analysis information.

5.3. Message Incorporation Processing

In the present embodiment, the game apparatus 10 performs message incorporation processing, which is processing for incorporating messages Ms into the game video for display DH, for example, over the game progression period TG.

Figure 20:
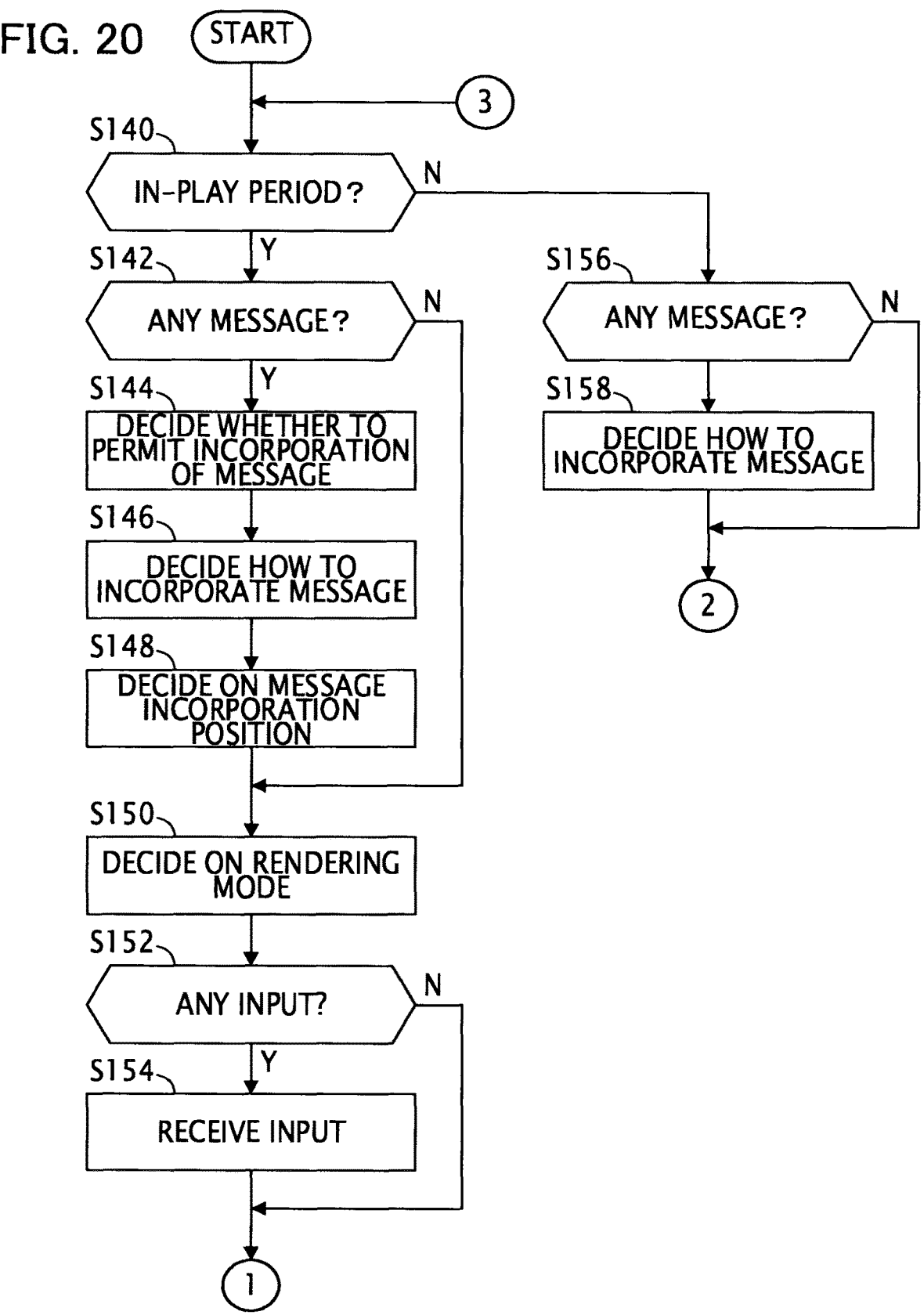
FIG. 20 is a flowchart showing an example operation of the game apparatus 10 when performing message incorporation processing.
Figure 21:
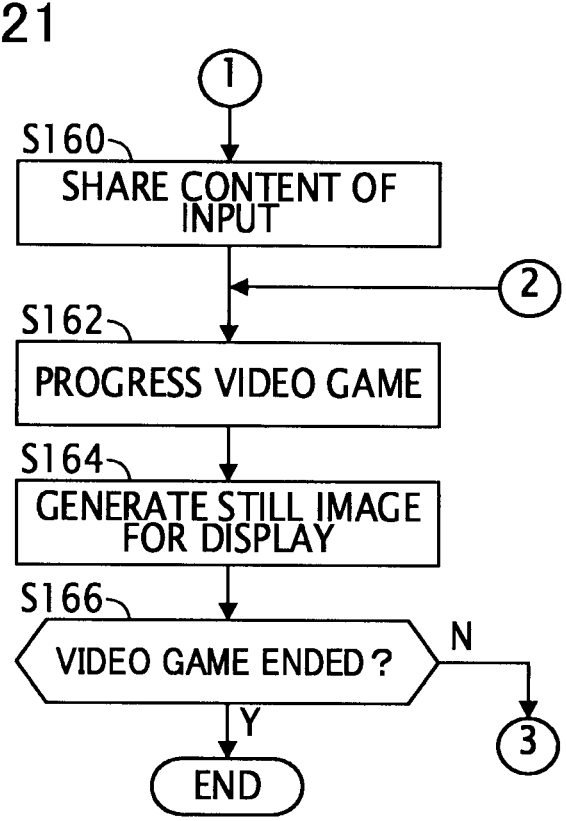
FIG. 21 is a flowchart showing an example operation of the game apparatus 10 when performing message incorporation processing.

FIGS. 20 and 21 are flowcharts showing an example operation of the game apparatus 10 in a case in which the game apparatus 10 performs the message incorporation processing.

As shown in FIG. 20, in the message incorporation processing, the message incorporation manner decider 123 first determines, based on the progress status information, whether a soccer video game is progressing in the in-play period TG1 (S140). It is to be noted that the message incorporation manner decider 123 may determine at step S140 whether the soccer video game is being progressed by the in-play progression mode.

If a result of the determination at step S140 is affirmative, i.e., the soccer video game is progressing in the in-play period TG1, the message incorporation manner decider 123 determines whether there is game message information in which the message incorporation completion information indicates "0" (S142). In the following, the game message information in which the message incorporation completion information shows "0" may be sometimes referred to as "unprocessed game message information."

When the result of the determination at step S142 is negative, the message incorporation manner decider 123 advances the processing to step S150.

If the result of the determination at step S142 is affirmative, the message incorporation manner decider 123 determines whether or not to incorporate the message Ms indicated by the unprocessed game message information into the game video for display DH (S144). Specifically, if it is determined at step S142 that there are multiple pieces of unprocessed game message information, the message incorporation manner decider 123 selects at step S144, as the game message information to be incorporated, a number of pieces of unprocessed game message information not more than the number that can be incorporated, from the higher priority $\Phi$ indicated by message priority information corresponding to each piece of unprocessed game message information among the multiple pieces of unprocessed game message information. Here, the number that can be incorporated is the number of messages Ms that can be incorporated into the game video for display DH. At step S144, the message incorporation manner decider 123 decides to incorporate the messages Ms indicated by the game message information to be incorporated, into the game video for display DH. On the other hand, at step S144, the message incorporation manner decider 123 decides that, among the multiple pieces of unprocessed game message information, one or more messages Ms indicated by one or more pieces of unprocessed game message information irrelevant to the game message information to be incorporated, if any, are not to be incorporated into the game video for display DH.

Next, the controller 11 performs message incorporation manner decision processing (S146). The message incorporation manner decision processing will be described later in FIG. 22. In the following, the "message incorporation manner decision processing" may be sometimes referred to as "message incorporation method decision processing."

Next, the message incorporation manner decider 123 determines a position at which a message Ms is to be incorporated in the game video for display DH, the message Ms being indicated by the game message information to be incorporated (S148). Specifically, the message incorporation manner decider 123 determines whether the message Ms indicated by the game message information to be incorporated should be displayed as the superimposed display image GMx in the limited area ArM of the game video for display DH or as the in-virtual space display image GMy in the fence object OF of the virtual space Fd. At step S148, the message incorporation manner decider 123 may determine a display position, in the game video for display DH, of the superimposed display image GMx representing the message Ms indicated by the game message information to be incorporated. Furthermore, the message incorporation manner decider 123 may determine, at step S148, a display position, in the virtual space Fd, of the in-virtual space display image GMy representing the message Ms indicated by the game message information to be incorporated.

Next, the controller 11 performs rendering mode determination processing (S150). The rendering mode determination processing will be described later in FIG. 23.

Next, the game progressor 121 determines whether the input unit 14 has been operated by the user U of the game apparatus 10 (S152). When a result of the determination at step S152 is negative, the game progressor 121 advances the processing to step S160.

When a result of the determination at step S152 is affirmative, the game progressor 121 receives an input to the input unit 14 carried out by the user U of the game apparatus 10 (S154), and the processing proceeds to step S160.

On the other hand, when a result of the determination at step S140 is negative, that is, when the soccer video game is progressing in the out-of-play period TG2, the message incorporation manner decider 123 determines whether there is game message information in which the message incorporation completion information indicates "0" (S156).

When the result of the determination at step S156 is negative, the message incorporation manner decider 123 advances the processing to step S162. On the other hand, when the result of the determination at step S156 is affirmative, the controller 11 performs the message incorporation manner decision processing (S158) and advances the processing to step S162.

As illustrated in FIG. 21, the game progressor 121 shares that which is input by the users U-1 to U-6 among the game apparatuses 10-1 to 10-6 (S160).

The game progressor 121 then causes the soccer video game to progress (S162). Specifically, at step S162, the game progressor 121 changes the states of the player characters CC-1 to CC-6 and the ball object OB based on the inputs carried out by the users U-1 to U-6 of the game apparatuses 10-1 to 10-6. In the following, information that indicates the states of the player characters CC-1 to CC-6 and the ball object OB in the virtual space Fd may be sometimes referred to as "virtual space information." In addition, at step S162, the game progressor 121 incorporates the in-virtual space display image GMy into the virtual space Fd by changing a display manner, such as the pattern, color, etc., of the fence object OF, such that the in-virtual space display image GMy is displayed on the fence object OF. It is to be noted that the game progressor 121 may impart visual effects to the game video for display DH at step S162 based on the processing result of the rendering mode determination processing at step S150.

At step S164, the video information generator 122 then generates a still image for display GH based on the virtual space information. Specifically, at step S164, the video information generator 122 generates a virtual space image obtained by capturing the virtual space Fd by a virtual camera in the virtual space Fd. Next, the video information generator 122 generates a still image for display GH in which the superimposed display image GMx is incorporated, by superimposing the superimposed display image GMx on the virtual space image. It is to be noted that the video information generator 122 may impart auditory effects to the game video for display DH at step S164 based on the processing result of the rendering mode determination processing at step S150.

Next, the game progressor 121 determines whether the soccer video game is over (S166). When the result of the determination at step S166 is negative, the game progressor 121 advances the processing to step S140. On the other hand, if the result of the determination at step S166 is affirmative, the game progressor 121 ends the message incorporation processing.

5.4. Message Incorporation Manner Decision Processing

Figure 22:
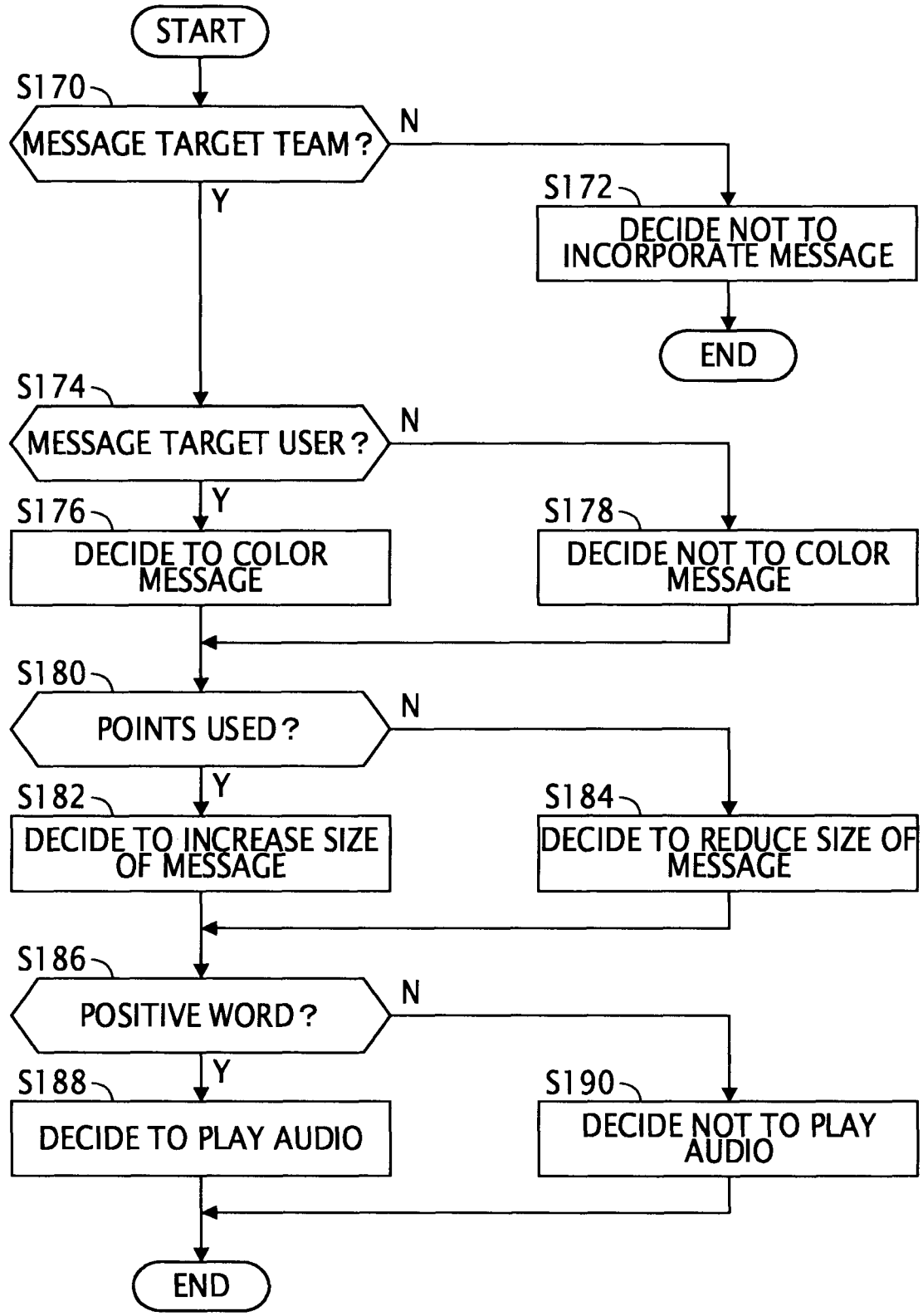
FIG. 22 is a flowchart showing an example operation of the game apparatus 10 when performing message incorporation manner decision processing.

FIG. 22 is a flowchart showing an example operation of the game apparatus 10 in a case in which the game apparatus 10 performs the message incorporation manner decision processing.

As shown in FIG. 22, in the message incorporation manner decision processing, the message determiner 125 determines whether a team-specific character string included in the game message information to be incorporated indicates the team to which the user U of the game apparatus 10 belongs (S170). Specifically, at step S170, the message determiner 125 determines whether or not the message the target team applicability information stored in the message incorporation information table TBL2 indicates that the team specific character string included in the game message information to be incorporated is the team to which the user U of the game apparatus 10 belongs. The message determiner 125 may substitute the processing at step S104 for the processing at step S170.

When a result of the determination at step S170 is negative, the message incorporation manner decider 123 decides not to incorporate into the game video for display DH the game message information to be incorporated, for which the determination was made at step S170 (S172), and ends the message incorporation manner decision processing.

When a result of the determination at step S170 is affirmative, the message determiner 125 determines whether a user-specific character string included in the game message information to be incorporated indicates the user U of the game apparatus 10 (S174). Specifically, at step S174, the message determiner 125 determines whether the message target user applicability information stored in the message incorporation information table TBL2 indicates that the user specific character string included in the game message information to be incorporated is a user U of the game apparatus 10. The message determiner 125 may substitute the processing at step S106 for the processing at step S174.

If a result of the determination at step S174 is affirmative, the message incorporation manner decider 123 decides to incorporate the message Ms indicated by the game message information to be incorporated into the game video for display DH as the colored display image GMxC (S176).

When a result of the determination at step S174 is negative, the message incorporation manner decider 123 decides to incorporate the message Ms indicated by the game message information to be incorporated into the game video for display DH as the non-colored display image GMxB (S178).

In a case in which the game message information to be incorporated has been transmitted from the terminal apparatus 70, the message determiner 125 determines whether or not the points have been used in association with the transmission of the game message information from the terminal apparatus 70 (S180). Specifically, at step S180, the message determiner 125 determines whether or not the used point information stored in the message incorporation information table TBL2 indicates that the used point information JPT included in the game message information to be incorporated indicates a value greater than "0." The message determiner 125 may substitute the processing at step S108 for the processing at step S180.

If the result of the determination at step S180 is affirmative, the message incorporation manner decider 123 decides to incorporate the message Ms indicated by the game message information to be incorporated into the game video for display DH as the large display image GMxL (S182).

When the result of the determination at step S180 is negative, the message incorporation manner decider 123 decides to incorporate the message Ms indicated by the game message information to be incorporated into the game video for display DH as the small display image GMxS (S184).

Furthermore, the message determiner 125 determines whether the game message information to be incorporated has a positive meaning (S186). Specifically, at step S186, the message determiner 125 determines whether or not the positive word applicability information stored in the message incorporation information table TBL2 indicates that the message Ms included in the game message information to be incorporated has a positive meaning. The message determiner 125 may substitute the processing at step S110 for the processing at step S186.

When the result of the determination at step S186 is affirmative, the message incorporation manner decider 123 decides to incorporate the message Ms indicated by the game message information to be incorporated, into the game video for display DH as the display image GMxP with audio (S188), and ends the message incorporation manner decision processing.

When the result of the determination at step S186 is negative, the message incorporation manner decider 123 decides to incorporate message Ms indicated by the game message information to be incorporated into the game video for display DH as the display image GMxN without audio (S190), and ends the message incorporation manner decision processing.

5.5. Rendering Mode Determination Processing

Figure 23:
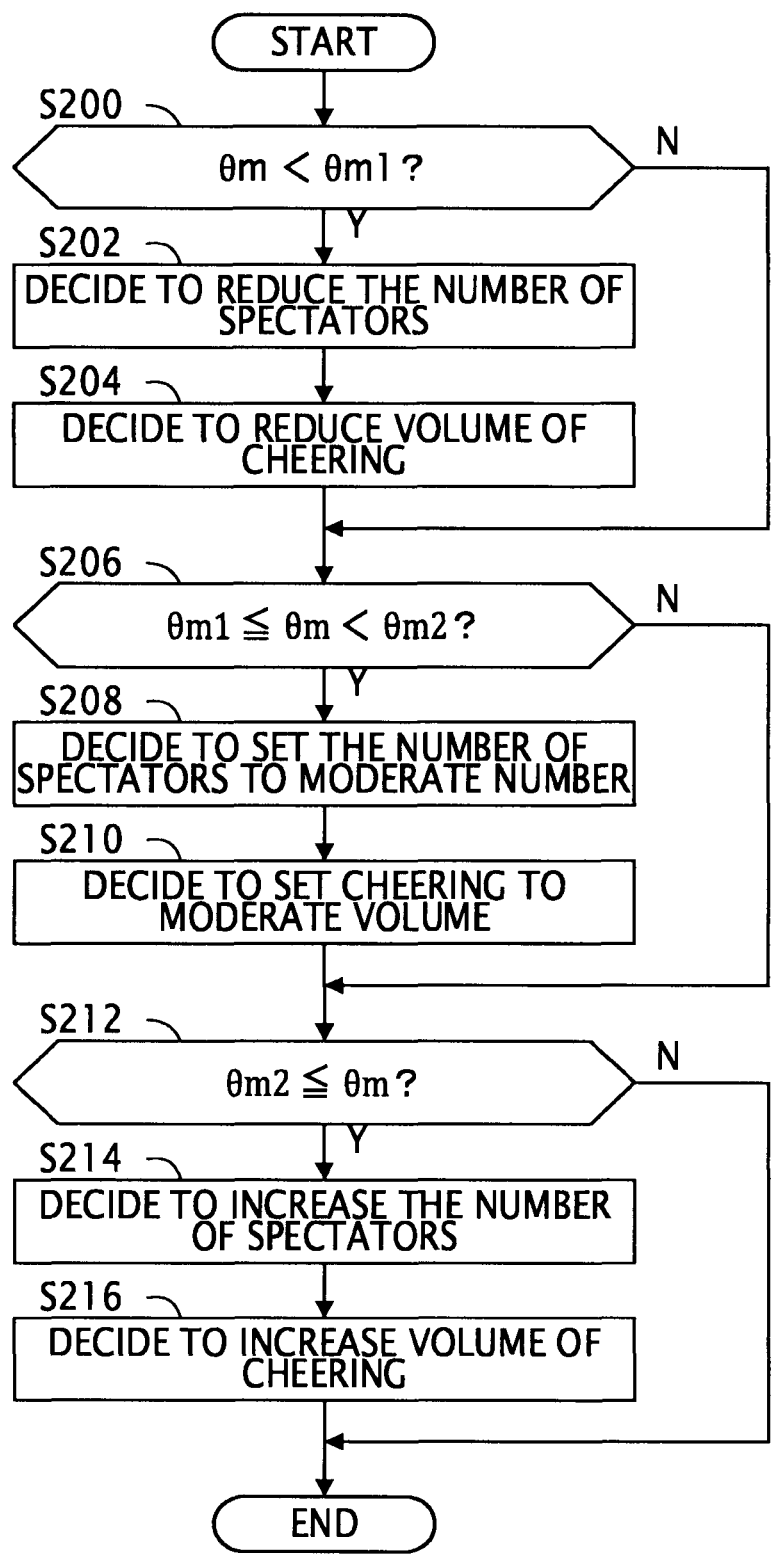
FIG. 23 is a flowchart showing an example operation of the game apparatus 10 when performing rendering mode determination processing.

FIG. 23 is a flowchart showing an example operation of the game apparatus 10 when the game apparatus 10 performs the rendering mode determination processing.

As shown in FIG. 23, in the rendering mode determination processing, the message incorporation manner decider 123 determines whether or not the message analysis value $\theta m$ satisfies "$0 \leq \theta m \leq \theta m1$" (S200), where the value $\theta m1$ is a real number satisfying "$0 < \theta m1$." It is to be noted that the message incorporation manner decider 123 may determine at step S200 whether or not the message total value $\theta s$ satisfies "$0 \leq \theta s < \theta s1$," where the value $\theta s1$ is a real number satisfying "$0 \leq \theta s1$." Furthermore, the message incorporation manner decider 123 may also determine whether or not the message positive word value $\theta k$ satisfies "$0 \leq \theta k \leq \theta k1$" at step S200, where the value $\theta k1$ is a real number satisfying "$0 \leq \theta k1$." The message incorporation manner decider 123 may also determine at step S200 whether or not the message evaluation value $\theta h$ satisfies "$0 \leq \theta h < \theta h1$," where the value $\theta h1$ is a real number satisfying "$0 \leq \theta h1$."

When a result of the determination at step S200 is negative, the message incorporation manner decider 123 advances the processing to step S206.

When a result of the determination at step S200 is affirmative, the message incorporation manner decider 123 sets the number of spectator characters CK in the virtual space Fd to a reference amount $\alpha 1$ (S202), where the value $\alpha 1$ is a natural number satisfying "$0 < \alpha 1$." In the present embodiment, causing spectator characters CK to appear in the virtual space Fd displayed in the game video for display DH and increasing or decreasing the number of the spectator characters CK in the virtual space Fd are examples of "imparting visual effects to the game video for display DH."

Then, the message incorporation manner decider 123 sets the volume of cheering by the spectator character CK in the virtual space Fd to a reference volume $\beta 1$ (S204), and advances the processing to step S206, where the volume $\beta 1$ is a real number satisfying "$0 < \beta 1$." In the present embodiment, the message incorporation manner decider 123 may set the content of cheering by spectator characters CK as a first audio content item at step S204. Here, the "content of cheering by the spectator characters CK" may be a concept that includes one, some, or all of the tone of a sound or voice representing cheering by the spectator characters CK, the content of the words indicated by a voice representing cheering by the spectator character CK, and the level of the pitch of a sound or voice representing cheering by the spectator characters CK. It is to be noted that, in the present embodiment, playing back the sound or voice indicating cheering by the spectator characters CK in the game video for display DH and increasing or decreasing the volume of cheering by the spectator characters CK are examples of "imparting auditory effects to the game video for display DH."

Next, the message incorporation manner decider 123 determines whether the message analysis value $\theta m$ satisfies "$\theta m1 \leq \theta m < \theta m2$" (S206), where the value $\theta m2$ is a real number that satisfies "$\theta m1 < \theta m2$." It is to be noted that the message incorporation manner decider 123 may determine at step S206 whether or not message total value $\theta s$ satisfies "$\theta s1 \leq \theta s < \theta s2$," where the value $\theta s2$ is a real number satisfying "$\theta s1 < \theta s2$." Furthermore, the message incorporation manner decider 123 may also determine at step S206 whether the message positive word value $\theta k$ satisfies "$\theta k1 \leq \theta k < \theta k2$," where the value $\theta k2$ is a real number satisfying "$\theta k1 < \theta k2$." Furthermore, the message incorporation manner decider 123 may also determine at step S206 whether or not the message evaluation value $\theta h$ satisfies "$\theta h1 \leq \theta h < \theta h2$," where the value $\theta h2$ is a real number satisfying "$\theta h1 < \theta h2$."

When a result of the determination at step S206 is negative, the message incorporation manner decider 123 advances the processing to step S212.

When a result of the determination at step S206 is affirmative, the message incorporation manner decider 123 sets the number of spectator characters CK in the virtual space Fd to α2 (S208), where the value α2 is a natural number that satisfies "α1<α2." Then, the message incorporation manner decider 123 sets the volume of cheering by the spectator character CK in the virtual space Fd to the volume β2 (S210) and advances the processing to step S212, where the volume β2 is a real number satisfying "β1<β2." It is to be noted, in the present embodiment, the message incorporation manner decider 123 may set the content of cheering by the spectator characters CK as a second audio content item at step S210. Here, the second audio content item may be the content of the cheers with greater probability of cheers by the spectator character CK being recognized, compared with the first audio content item.

Next, the message incorporation manner decider 123 determines whether the message analysis value θm satisfies "θm2≤θm" (S212). It is to be noted that the message incorporation manner decider 123 may determine at step S212 whether or not the message total value θs satisfies "θs2≤θs." The message incorporation manner decider 123 may also determine whether or not the message positive word value θk satisfies "θk2≤θk" at step S212. Furthermore, the message incorporation manner decider 123 may determine whether or not the message evaluation value θh satisfies "θh2≤θh" at step S212.

When the result of the determination at step S212 is negative, the message incorporation manner decider 123 ends the rendering mode determination processing.

When the result of the determination at step S212 is affirmative, the message incorporation manner decider 123 sets the number of spectator characters CK in the virtual space Fd to α3 (S214), where the value α3 is a natural number that satisfies "α2<α3." Then, the message incorporation manner decider 123 sets the volume of cheering performed by the spectator character CK in the virtual space Fd to a volume β3 (S216) to end the rendering mode determination processing, where the volume β3 is a real number satisfying "β2<β3." In the present embodiment, the message incorporation manner decider 123 may set the content of cheering by the spectator characters CK as a third audio content at step S216. Here, the third audio content may be the content of cheers that increases the probability of cheers being recognized by the spectator character CK compared with the second audio content.

6. Summary of Embodiment

As explained above, in the present embodiment, the controller 11 incorporates a message Ms included in the message information JMs into the game video for display DH. Then, in the present embodiment, the video editing apparatus 40 generates a game video for distribution DD based on the game video for display DH in which the message Ms has been incorporated. For this reason, according to the present embodiment, the user U of the game apparatus 10 and the user of the terminal apparatus 70 can easily grasp the degree of excitement of the soccer video game compared with a form in which messages Ms are not incorporated into the game video for display DH.

In the present embodiment, the message determiner 125 determines whether the message information JMs includes a soccer-game-specific character string, and the message incorporator 120 incorporates a message Ms included in the message information JMs into the game video for display DH based on a result of the determination. Therefore, according to the present embodiment, a message Ms unrelated to the soccer video game being played in the game apparatus 10 can be prevented from being incorporated into the game video for display DH for the soccer video game being played in the game apparatus 10. As a result, the user U of the game apparatus 10 and the user of the terminal apparatus 70 can accurately grasp the degree of excitement of the soccer video game compared with a form in which a message Ms unrelated to the soccer video game being played in the game apparatus 10 is incorporated into the game video for display DH for the soccer video game being played in the game apparatus 10.

Also, in the present embodiment, the game controller 111 incorporates a message Ms included in message information JMs into the game video for display DH based on the progress status information. Thus, according to the present embodiment, compared with, for example, a form in which messages Ms are incorporated into the game video for display DH without considering the progress status information, it is possible to reduce a probability that the user U of the game apparatus 10 will be hindered from operating the game apparatus 10, when such operation is required depending on the progress of a soccer video game. In addition, according to the present embodiment, compared with a form in which messages Ms are incorporated into the game video for display DH without considering the progress status information, it is possible to reduce the probability of the user of the terminal apparatus 70 being hindered from watching the game video for distribution DD. That is, according to the present embodiment, it is possible to reduce disadvantages to the user U of the game apparatus 10 and the user of the terminal apparatus 70 caused by incorporating messages Ms into the game video for display DH, compared with a form in which messages Ms are incorporated into the game video for display DH without considering the progress status information.

Also, in the present embodiment, the game controller 111 imparts visual and auditory effects to the game video for display DH in accordance with the analysis information Jk obtained by analyzing multiple pieces of message information JMs supplied to the game apparatus 10. Therefore, according to the present embodiment, compared with a form in which no visual or auditory effects are imparted to the game video for display DH, the user U of the game apparatus 10 and the user of the terminal apparatus 70 can easily grasp the degree of excitement in the soccer video game.

It is to be noted that, in the present embodiment, the display game video information JDH generated in the game apparatus 10 is an example of "video information," that the game video for distribution DD is an example of a "distributed video," and that the message acquirer 124 is an example of an "acquirer." In the present embodiment, the game progression period TG is an example of a "progression period," the in-play period TG1 is an example of a "first progression period," the out-of-play period TG2 is an example of a "second progression period," the in-play progression mode is an example of a "first progression mode," and the out-of-play progression mode is an example of a "second progression mode." In addition, that there is a possibility of affecting a final outcome of a match of the soccer video game is an example of "there is a probability of a change in a final outcome of a video game at a certain level or above." Also, in the present embodiment, the game progressor 121 is an example of a "progressor," and the video information generator 122 is an example of a "generator."

B. MODIFICATIONS

Each of the above forms may be variously modified. Specific modifications are exemplified below. Two or more aspects, freely selected from the following examples, may be combined as appropriate to the extent they do not conflict with each other. For elements for which actions and functions are the same as those of the embodiment in the modifications shown below, detailed descriptions of each element are omitted as appropriate by using the same reference signs as those used in the above description.
Modification 1

In the above described embodiment, the game apparatus 10 decides whether or not to incorporate messages Ms indicated by the message information JMs into the game video for display DH, but the present invention is not limited thereto. For example, the message management server 30 may decide whether or not to incorporate messages Ms indicated by the message information JMs into the game video for display DH.

A video distribution system Sys-A according to the present modification will be described below with reference to FIGS. 24 to 34.
Configuration of Video Distribution System FIG. 24 is an explanatory diagram for explaining an overview of the video distribution system Sys-A according to the present modification.

Figure 24:
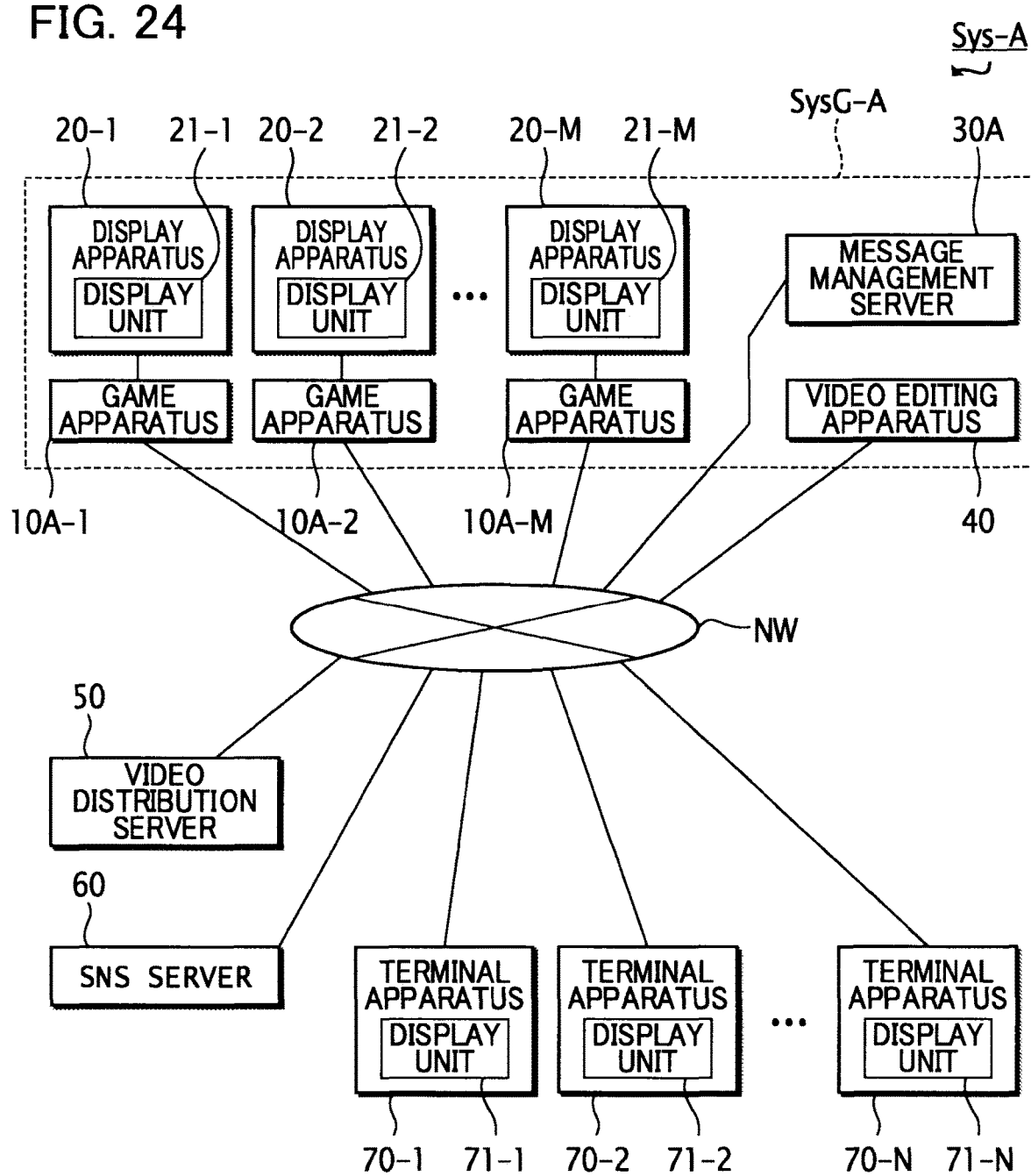
FIG. 24 is an illustration showing an example overview of a video distribution system Sys-A according to Modification 1.

As illustrated in FIG. 24, the video distribution system Sys-A differs from the video distribution system Sys according to the embodiment in that a game system SysG-A is provided in place of the game system SysG. The game system SysG-A differs from the game system SysG according to the embodiment in that game apparatus 10A-1 to 10A-M are provided in place of the game apparatuses 10-1 to 10-M and in that a message management server 30A is provided in place of the message management server 30.
Configuration of Message Management Server FIG. 25 is a functional block diagram showing an example configuration of the message management server 30A according to the present modification.

Figure 25:
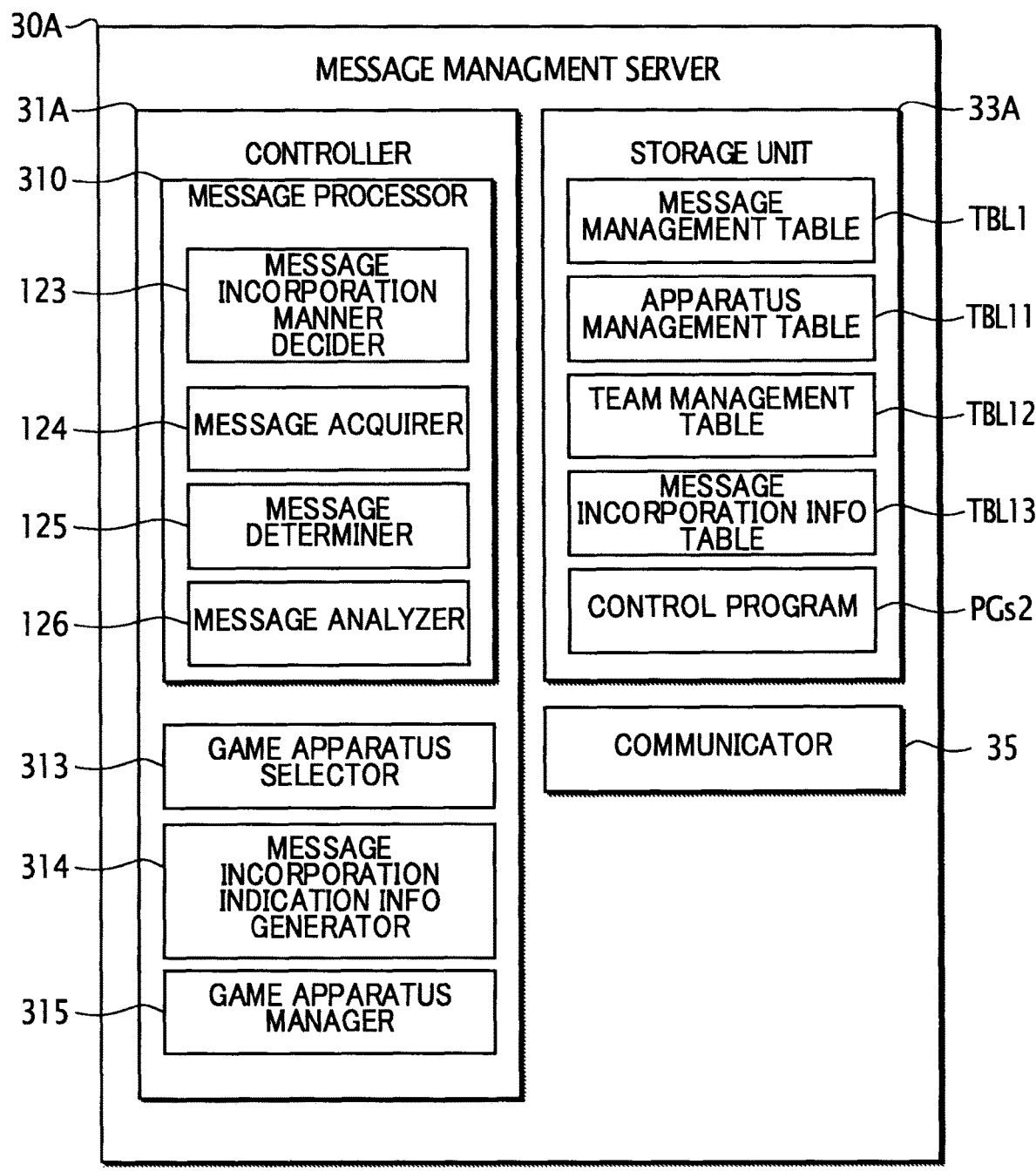
FIG. 25 is a block diagram showing an example configuration of the message management server 30A.

As shown in FIG. 25, the message management server 30A differs from the message management server 30 according to the embodiment in that a controller 31A is provided in place of the controller 31, and a storage unit 33A is provided in place of the storage unit 33.

As shown in FIG. 25, the controller 31A includes a message processor 310, a game apparatus selector 313, a message incorporation indication information generator 314, and a game apparatus manager 315. The message processor 310 is provided with the above described message incorporation manner decider 123, message acquirer 124, message determiner 125, and message analyzer 126. The game apparatus selector 313 selects, from among the game apparatuses 10A-1 to 10A-M, a game apparatus 10A for which a message Ms indicated by message information JMs is to be incorporated. The message incorporation indication information generator 314 generates message incorporation indication information JS (an example of "indication information"), which instructs the game apparatus 10A to incorporate the message Ms indicated by the message information JMs. The game apparatus manager 315 manages the game apparatus 10A corresponding to the user U participating in the gameplay of a soccer video game.

As illustrated in FIG. 25, the storage unit 33A has stored therein, in addition to the message management table TBL1 described above, an apparatus management table TBL11, a team management table TBL12, a message incorporation information table TBL13, and a control program PGs2 for controlling each element of the message management server 30A. It is to be noted that in the present modification, the above described storage device 3003 serves as the storage unit 33A. Also, in the present modification, the above described processor 3001 executes the control program PGs2 stored in the storage device 3003 and operates in accordance with the control program PGs2, thereby serving as the controller 31A.
Configuration of Game Apparatus FIG. 26 is a functional block diagram showing an example configuration of the game apparatus 10A according to the present modification.

Figure 26:
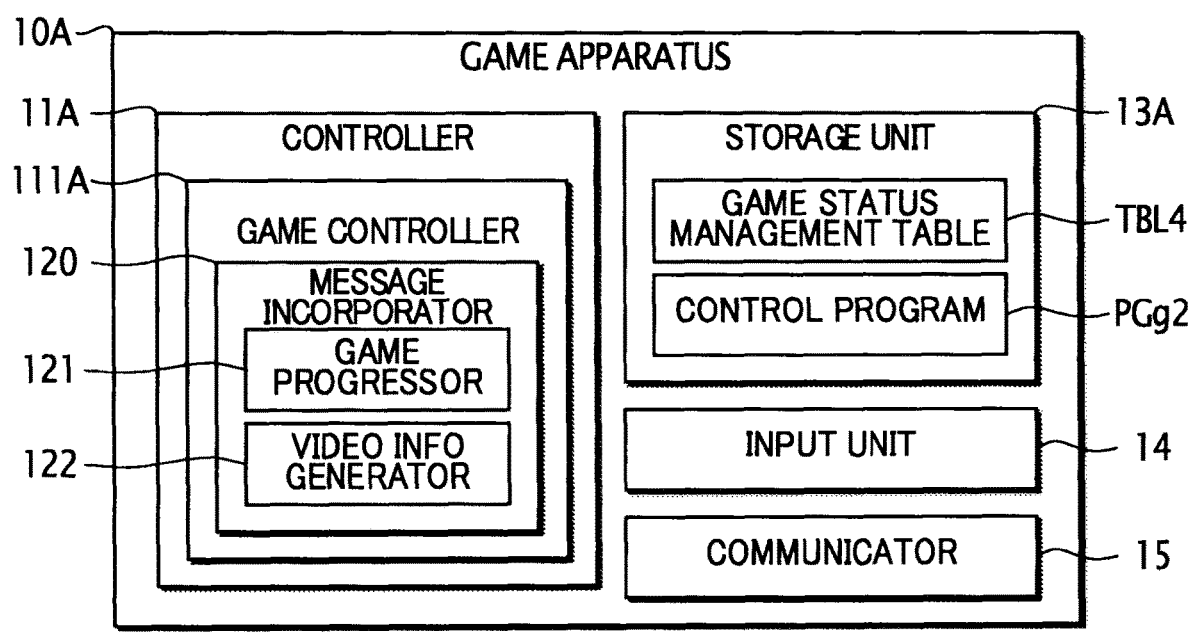
FIG. 26 is a block diagram showing an example configuration of a game apparatus 10A.

As shown in FIG. 26, the game apparatus 10A differs from the game apparatus 10 according to the embodiment in that the controller 11A is provided in place of the controller 11, and storage unit 13A is provided in place of the storage unit 13.

As shown in FIG. 26, the controller 11A differs from the controller 11 according to the embodiment in that in place of the game controller 111, a game controller 111A is provided, and in that the message acquirer 124 is not provided. The game controller 111A differs from the game controller 111 according to the embodiment in that the message incorporation manner decider 123 is not provided, in that the message determiner 125 is not provided, and in that the message analyzer 126 is not provided.

As illustrated in FIG. 26, the storage unit 13A has stored therein the game status management table TBL4 and the control program PGg2 for controlling each element of the game apparatus 10A. It is to be noted that in the present modification, the above described storage device 1003 serves as the storage unit 13A. Also, in the present modification, the above described processor 1001 executes the control program PGg2 stored in the storage device 1003 and operates in accordance with the control program PGg2, thereby serving as the storage unit 13A.
Data Stored in Message Management Server FIG. 27 is an explanatory diagram showing an example of a data configuration of the apparatus management table TBL11.

As illustrated in FIG. 27, the apparatus management table TBL11 has multiple records corresponding to, one-to-one with, from among the game apparatus 10A-1 to 10A-M, multiple game apparatuses 10As of multiple users U participating in the gameplay of a soccer video game. Each record of the apparatus management table TBL11 stores apparatus management information. Here, the apparatus management information is information including a terminal ID, a user ID, member team information, and user correspondence string information.

The terminal ID is information for identifying each game apparatus 10A among the multiple game apparatuses 10A corresponding to the multiple users U participating in the gameplay of the soccer video game. The user ID is information for identifying each user U among the multiple users U participating in the soccer video game. The member team information indicates a team ID of a team to which the user U participating in the gameplay of the soccer video game belongs. Here, the team ID is information for identifying each team among the multiple teams participating in the gameplay of the soccer video game. In addition, the user correspondence string information indicates a user specific character string corresponding to each user U.

FIG. 28 is an illustration of an example data configuration for the team management table TBL12.

As illustrated in FIG. 28, the team management table TBL12 has multiple records corresponding one-to-one with multiple teams participating in the gameplay of a soccer video game. Each record in the team management table TBL12 has stored therein team management information. The team management information is information including a team ID and team correspondence string information. The team correspondence string information indicates a team specific character string corresponding to each team.

FIG. 29 is an explanatory diagram showing an example data configuration of the message incorporation information table TBL13.

As illustrated in FIG. 29, the message incorporation information table TBL13 has one or more records corresponding one-to-one with one or more pieces of game message information acquired by the message management server 30A from the SNS server 60. Each record of the message incorporation information table TBL13 includes a message ID and message incorporation information including message feature information, message priority information, and message incorporation completion information.

The message incorporation information according to the present modification differs from the message incorporation information according to the embodiment in that the message feature information includes message correspondence team information in place of the message target team applicability information, and message correspondence user information in place of the message target user applicability information. Here, the message correspondence team information indicates a team ID of a team that corresponds to a team specific character string included in the game message information transmitted from the terminal apparatus 70. The message correspondence user information indicates a user ID of a user U who corresponds to a user specific character string included in the game message information transmitted from the terminal apparatus 70.

Operation of Message Management Server

The operation of the message management server 30A will be described below with reference to FIGS. 30 to 34.

Match Information Generation Processing

Figure 30:
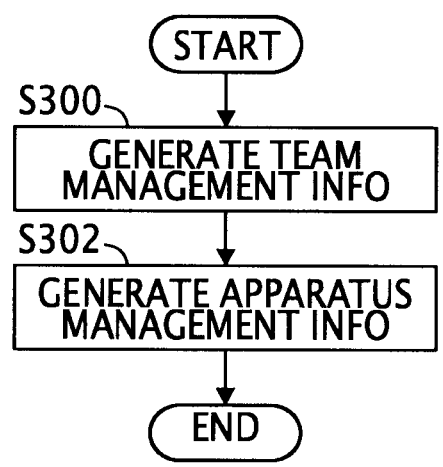
FIG. 30 is a flowchart showing an example operation of a message management server 30A when performing match information generation processing.

FIG. 30 is a flowchart showing an example operation of the message management server 30A in a case in which the message management server 30A performs match information generation processing. In the present modification, when gameplay of a soccer video game is started, the message management server 30A performs the match information generation processing.

As shown in FIG. 30, in the match information generation processing, the game apparatus manager 315 first generates team management information for all the teams participating in the gameplay of the soccer video game, and stores the generated team management information in the team management table TBL12 (S300). In the match information generation processing, the game apparatus manager 315 generates the apparatus management information for multiple game apparatuses 10As corresponding to all the users U participating in the gameplay of the soccer video game, stores the generated apparatus management information in the apparatus management table TBL11 (S302), and ends the match information generation processing.

Message Acquisition Processing

Figure 31:
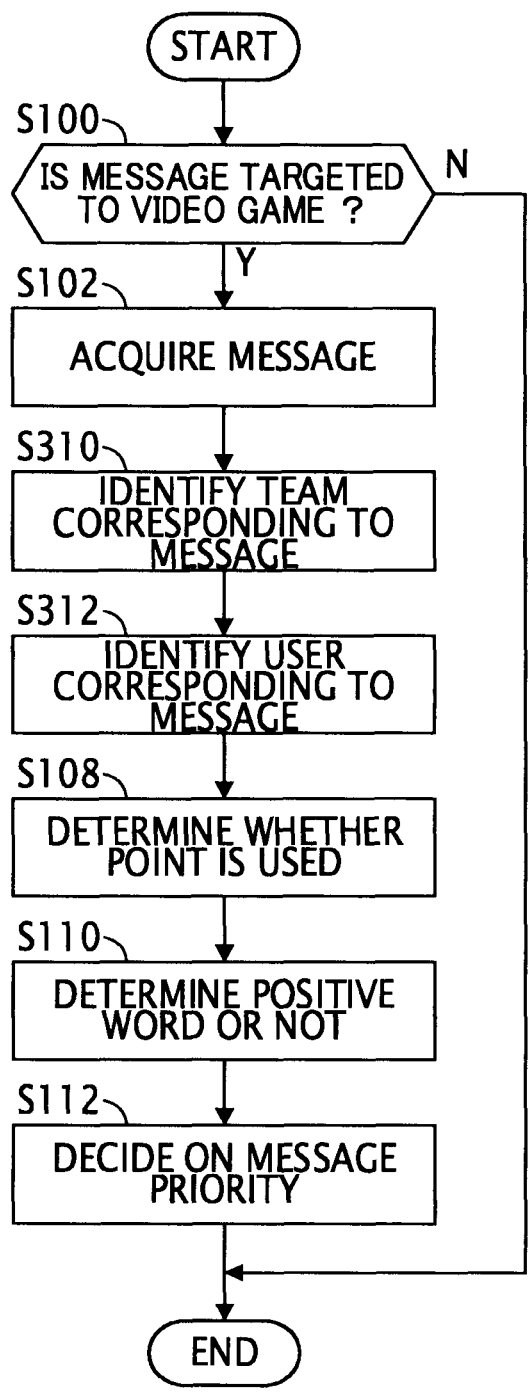
FIG. 31 is a flowchart showing an example operation of the message management server 30A when performing message acquisition processing.

FIG. 31 is a flowchart showing an example operation of the message management server 30A in a case in which the message management server 30A performs message acquisition processing.

In the present modification, the message management server 30A performs the message acquisition processing in a case in which the message information JMs is supplied from the terminal apparatus 70 to the SNS server 60. It is to be noted that the message acquisition processing in the present modification differs from the message acquisition processing according to the embodiment shown in FIG. 18 in that steps S310 and S312 are executed in place of steps S104 and S106. In the following description, the same processing as that in the embodiment will be omitted as appropriate, by using the reference signs used in the embodiment.

As illustrated in FIG. 31, the message determiner 125 performs the processing of step S100 described above. In the present modification, when the message information JMs is supplied from the terminal apparatus 70 to the SNS server 60, the message determiner 125 performs the processing of step S100. The message acquirer 124 also performs the processing of step S102 described above. In the present modification, at step S102, the message acquirer 124 adds a record to the message incorporation information table TBL13 and stores a message ID identical to the message ID assigned in the message management table TBL1 for the added record.

The message determiner 125 then identifies a team that corresponds to a team specific character string included in the game message information acquired by the message acquirer 124 at step S102 (S310). Specifically, at step S310, the message determiner 125 identifies a team ID that corresponds to the team specific character string included in the game message information by referring to the team management table TBL12, and sets the team ID to the message correspondence team information in the message incorporation information table TBL13.

The message determiner 125 also identifies a user U who corresponds to a user specific character string included in the game message information acquired by the message acquirer 124 at step S102 (S312). Specifically, at step S312, the message determiner 125 identifies a user ID that corresponds to the user specific character string included in the game message information by referring to the apparatus management table TBL11, and sets the user ID to the message correspondence user information of the message incorporation information table TBL13.

Then, the message determiner 125 performs the processing of steps S108 to S112 to end the message acquisition processing.

Message Analysis Processing

Furthermore, in the present modification, the message management server 30A performs the message analysis processing, which is processing for analyzing multiple pieces of game message information acquired from the SNS server 60, for each analysis period. It is to be noted that, since the message analysis processing in the present modification is the same as the message analysis processing according to the embodiment shown in FIG. 19, explanation thereof is omitted.

Message Incorporation Indication Information Generation Processing

Figure 32:
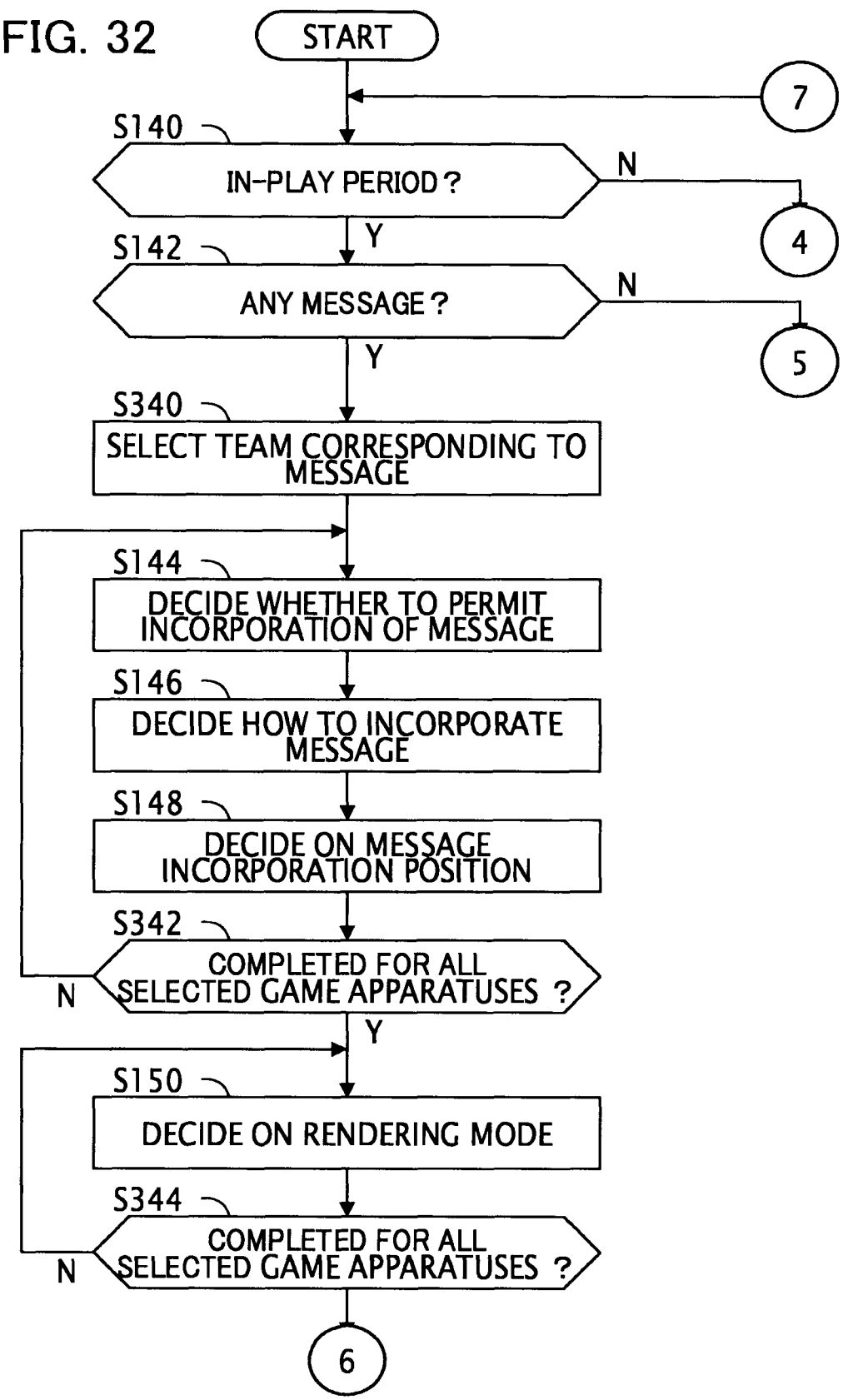
FIG. 32 is a flowchart showing an example operation of the message management server 30A when performing message incorporation indication information generation processing.
Figure 33:
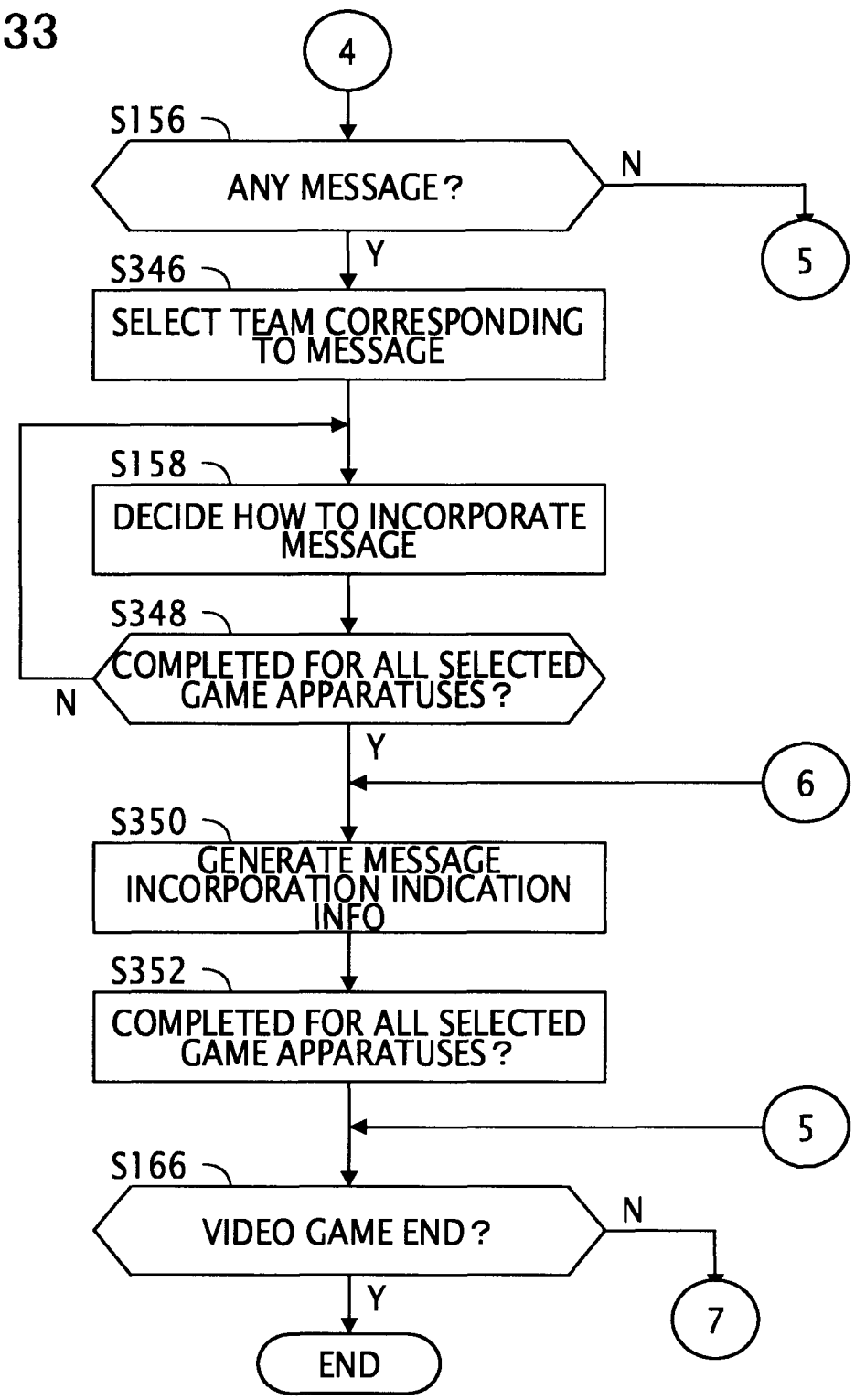
FIG. 33 is a flowchart showing an example operation of the message management server 30A when performing message incorporation indication information generation processing.

FIGS. 32 and 33 are flowcharts showing an example operation of the message management server 30A when the message management server 30A performs message incorporation indication information generation processing.

In the present modification, the message management server 30A performs the message incorporation indication information generation processing over the game progression period TG. It is to be noted that the message incorporation indication information generation processing in the present modification is different from the message incorporation processing according to the embodiment shown in FIGS. 20 and 21 in that steps S340 to S352 are performed, and that steps S152, S154, and S160 to S164 are not performed.

As shown in FIG. 32, in the message incorporation indication information generation processing according to the present modification, the message incorporation manner decider 123 performs the processing of steps S140 and S142 described above. When a result of the determination at step S142 is affirmative, the game apparatus selector 313 selects a team that corresponds to the team specific character string indicated by the unprocessed game message information by referring to the team management table TBL12 (S340). Hereafter, game apparatuses 10A that correspond to users U belonging to the team corresponding to the team specific character string indicated by the unprocessed game message information will be referred to as selection target game apparatuses. Next, the controller 31A performs the processing of steps S144 to S148 described above for each and every selection target game apparatus. Then, the game apparatus selector 313 determines whether the processing of steps S144 to S148 has been executed for all the selection target game apparatuses (S342). When a result of the determination at step S342 is negative, the game apparatus selector 313 advances the processing to step S144. When a result of the determination at step S342 is affirmative, the controller 31A performs the processing of step S150 described above for all the selected target game apparatuses. Then, the game apparatus selector 313 determines whether the processing of step S150 has been executed for all the selection target game apparatuses (S344). When a result of the determination at step S344 is negative, the game apparatus selector 313 advances the processing to step S150.

As shown in FIG. 33, when a result of the determination at step S140 is negative, the message incorporation manner decider 123 performs the processing of step S156 described above. When a result of the determination at step S156 is affirmative, the game apparatus selector 313 selects a team that corresponds to the team specific character string indicated by the unprocessed game message information by referring to the team management table TBL12 (S346). Next, the controller 31A performs the processing of step S158 described above for all the selected target game apparatuses. Then, the game apparatus selector 313 determines whether the processing of step S158 has been executed for all the selection target game apparatuses (S348). When a result of the determination at step S348 is negative, the game apparatus selector 313 advances the processing to step S158.

When a result of the determination at step S344 is affirmative, and when a result of the determination at step S348 is affirmative, the message incorporation indication information generator 314 generates message incorporation indication information JS and rendering mode indication information JJ in connection with each of all the selected target game apparatuses (S350).

Here, the message incorporation indication information JS is information including coloring/non-coloring indication information JS1, display size indication information JS2, and audio presence/absence indication information JS3. Among them, the coloring/non-coloring indication information JS1 is information for instructing the game apparatus 10A whether to incorporate, into the game video for display DH, the message Ms indicated by the message information JMs as a colored display image GMxC or as a non-colored display image GMxB. The display size indication information JS2 is information for instructing the game apparatus 10A whether to incorporate, into the game video for display DH, the message Ms indicated by the message information JMs as a large display image GMxL or as a small display image GMxS. The audio presence/absence indication information JS3 is information for instructing the game apparatus 10A whether to incorporate, into the game video for display DH, the message Ms indicated by the message information JMs as a display image GMxP with audio or as a display image GMxN without audio.

Furthermore, the rendering mode indication information JJ is information including spectator character number indication information JJ1, and cheering volume indication information JJ2. The spectator character number indication information JJ1 is information for indicating to the game apparatus 10A the number of spectator characters CK that appear in the virtual space Fd displayed in the game video for display DH. Also, the cheering volume indication information JJ2 is information for indicating to the game apparatus 10A the volume of cheering by the spectator character CK in the virtual space Fd displayed in the game video for display DH.

Next, the message incorporation indication information generator 314 supplies the message incorporation indication information JS and the rendering mode indication information JJ generated at step S350 to each selection target game apparatus (S352). The selection target game apparatus incorporates a message display image GM-m into the game video for display DH based on the message incorporation indication information JS. The message display image GM-m is for representing the message Ms indicated by the message information JMs. Furthermore, the selection target game apparatus causes the spectator characters CK to appear in the virtual space Fd based on the rendering mode indication information JJ, and incorporates, into the game video for display DH, cheering by the spectator characters CK.

Then, the controller 31A determines whether or not the soccer video game is ended (S166), and when a result of the determination is negative, the processing advances to step S140, and when a result of the determination is affirmative, the message incorporation indication information generation processing shown in FIG. 32 and FIG. 33 is ended.

Message Incorporation Manner Decision Processing

In the present modification, the message management server 30A performs message incorporation manner decision processing in the message incorporation indication information generation processing.

Figure 34:
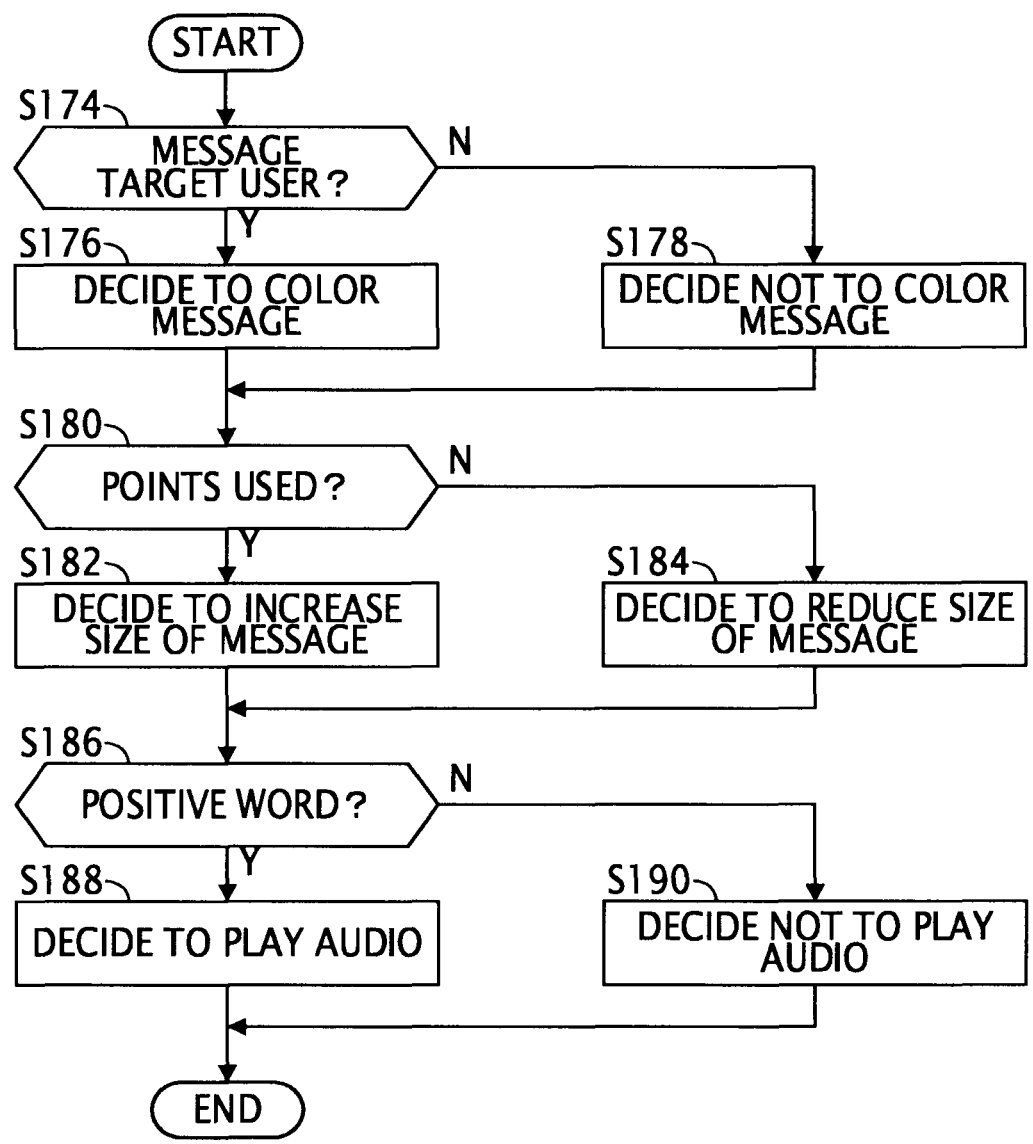
FIG. 34 is a flowchart showing an example operation of the message management server 30A when performing message incorporation manner decision processing.

FIG. 34 is a flowchart showing an example operation of the message management server 30A in a case in which the message management server 30A performs the message incorporation manner decision processing. As shown in FIG. 34, the message incorporation manner decision processing in the present modification differs from the message incorporation manner decision processing according to the embodiment shown in FIG. 22 in that steps S170 and S172 are not included.

Rendering Mode Determination Processing

Also, in the present modification, the message management server 30A performs the rendering mode determination processing in the message incorporation indication information generation processing. It is to be noted that, since the rendering mode determination processing in the present modification is the same as the rendering mode determination processing according to the embodiment shown in FIG. 23, explanation thereof is omitted.

Summary of Modification 1

As described above, according to the present modification, the message incorporation indication information generator 314 supplies the message incorporation indication information JS to the selected target game apparatus. Therefore, according to the present modification, it is possible to incorporate a message Ms indicated by message information JMs into the game video for display DH of the soccer video game being executed in the selected target game apparatus. As a result, according to the present modification, the user U of the game apparatus 10A and the user of the terminal apparatus 70 can easily grasp the degree of the excitement of the soccer video game being executed in the selected target game apparatus, compared with a form in which messages Ms are not incorporated into the game video for display DH of the soccer video game being executed in the selected target game apparatus.

Furthermore, according to the present modification, messages Ms irrelevant to the selected target game apparatus can be prevented from being incorporated into the game video for display DH of the soccer video game being executed in the selected target game apparatus. Therefore, according to the present modification, compared with a form in which messages Ms irrelevant to the selected target game apparatus are incorporated into the game video for display DH of the soccer video game being executed in the selected target game apparatus, it is possible for the user U of the game apparatus 10A and the user of the terminal apparatus 70 to accurately grasp the degree of the excitement of the soccer video game being executed in the selected target game apparatus.

Modification 2

In the above described embodiment and modification 1, the game system SysG and the game system SysG-A include the video editing apparatus 40, but the present invention is not limited thereto. The game system SysG and the game system SysG-A need not be provided with the video editing apparatus 40. For example, if the game system SysG does not have a video editing apparatus 40, the game apparatus 10 may generate game-video-for-distribution information JDD based on the game-video-for-display information JDH generated by the game apparatus 10 and supply the generated game-video-for-distribution information JDD to the video distribution server 50. Also, for example, if the game system SysG does not have a video editing apparatus 40, the game apparatus 10 may supply the game-video-for-display information JDH generated by the game apparatus 10 to the video distribution server 50 as the game-video-for-distribution information JDD.

Modification 3

In the above described embodiment and modifications 1 and 2, the terminal apparatus 70 transmits message information JMs to the SNS server 60, but the present invention is not limited thereto. For example, the terminal apparatus 70 may transmit the message information JMs to the game system SysG (or to the game system SysG-A). Specifically, the terminal apparatus 70 may transmit the message information JMs to the message management server 30 (or to the message management server 30A) or to the game apparatus 10 (or to the game apparatus 10A). Also, for example, the terminal apparatus 70 may transmit the message information JMs to the video distribution server 50. In this case, the video distribution server 50 may transmit the message information JMs supplied from the terminal apparatus 70 to the game system SysG (or to the game system SysG-A).

Figure 35:
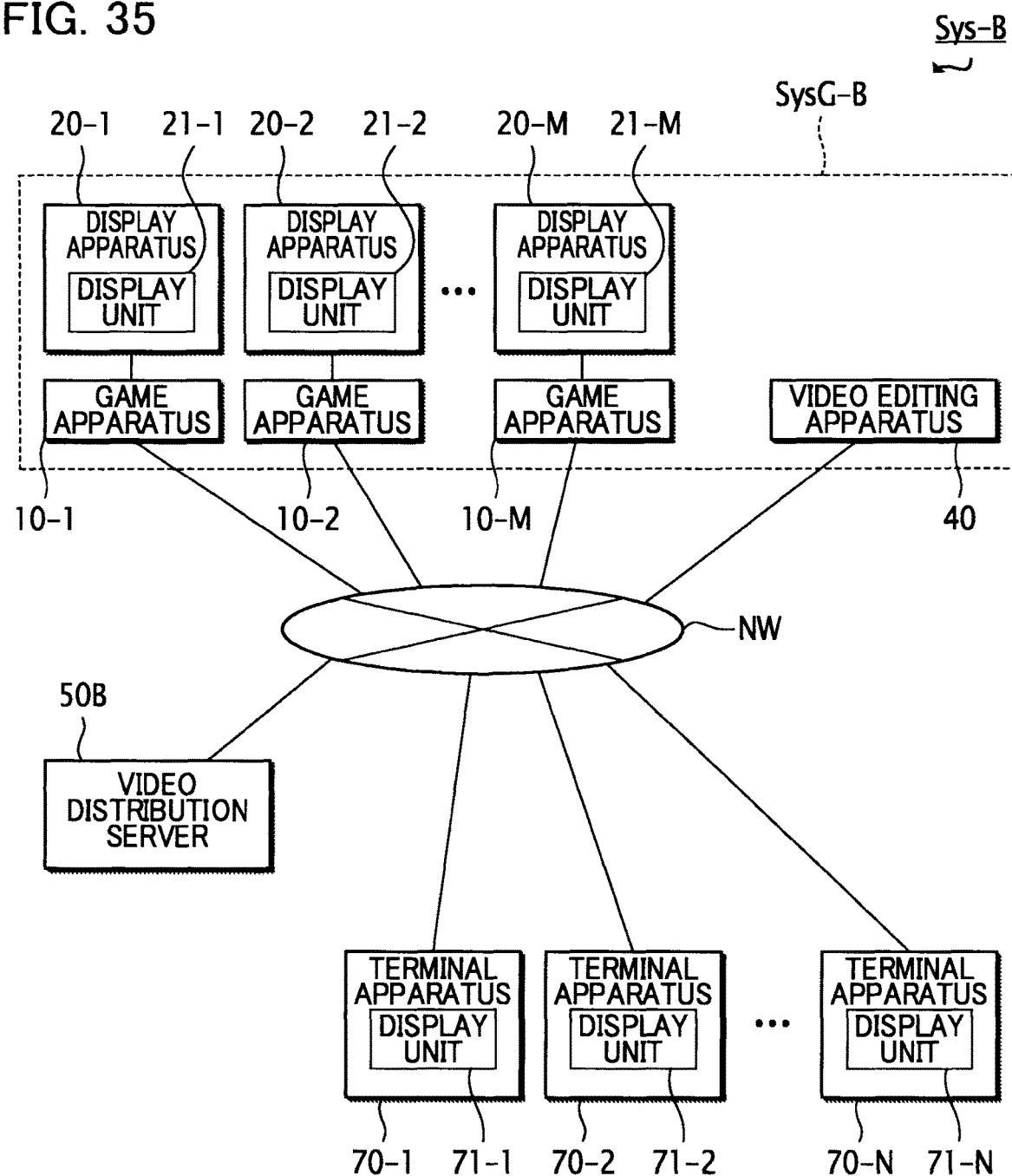
FIG. 35 shows an example overview of a video distribution system Sys-B according to Modification 3.

FIG. 35 is an explanatory diagram for explaining an overview of a video distribution system Sys-B according to the present modification.

As shown in FIG. 35, the video distribution system Sys-B differs from the video distribution system Sys according to the embodiment shown in FIG. 1 in that a game system SysG-B is provided in place of the game system SysG, that a video distribution server 50B is provided in place of the video distribution server 50, and that the SNS server 60 is not provided. The game system SysG-B differs from the game system SysG according to the embodiment in that it does not have a message management server 30.

Figure 36:
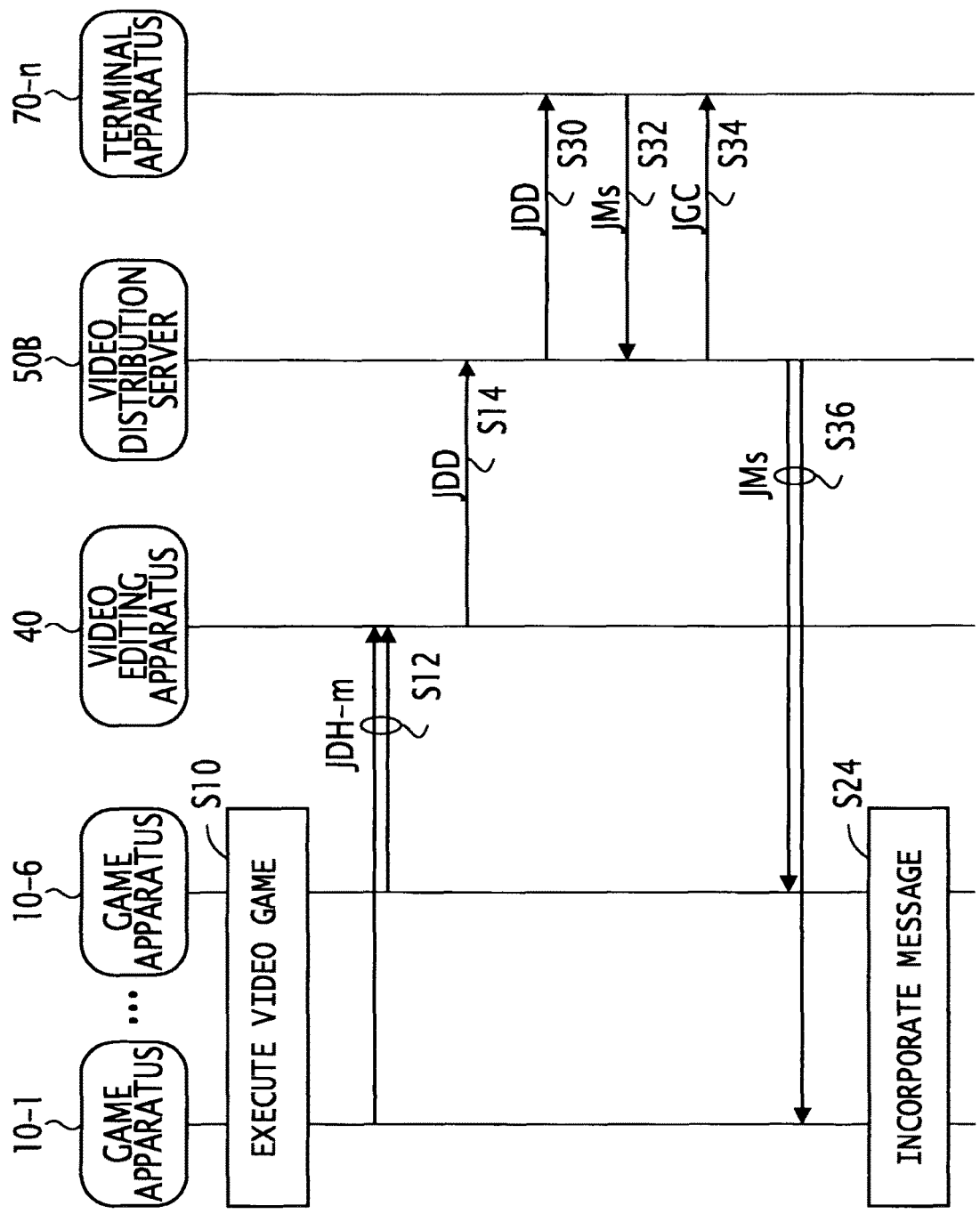
FIG. 36 is a sequence chart showing an example overview of the operation of the video distribution system Sys-B.

FIG. 36 is a sequence chart for explaining one example of an overview of the operation of the video distribution system Sys-B according to the present modification.

As illustrated in FIG. 36, the video distribution system Sys-B performs the processing of steps S10 to S14 described above, similarly to the video distribution system Sys (see FIG. 2). When the game-video-for-distribution information JDD indicating the game video for distribution DD is supplied from the video editing apparatus 40, the video distribution server 50B supplies the game-video-for-distribution information JDD to the terminal apparatuses 70-1 to 70-N in the same manner as that in step S16 (S30).

The terminal apparatus 70-n then transmits message information JMs, including a message Ms, to the video distribution server 50B (S32). In the present modification, the video distribution server 50B recognizes that the message Ms included in the message information JMs transmitted from the terminal apparatus 70-n is a message Ms related to the game video for distribution DD indicated by the game-video-for-distribution information JDD supplied from the video distribution server 50B, or a message Ms related to the soccer video game being executed in the game apparatus 10-m. Therefore, in the present modification, even when the user of the terminal apparatus 70-n posts a message Ms related to a soccer video game to the video distribution server 50B, it is not necessary for the user to add a soccer game specific character string to the message Ms.

Then, when the message information JMs is supplied from the terminal apparatus 70-n, the video distribution server 50B supplies to the terminal apparatuses 70-1 to 70-N message list image information JGC indicating a message list image GC (S34). The message list image GC is an image that displays the same content as that of the SNS site GS. However, the messages Ms displayed on the SNS site GS include messages Ms that are not related to a soccer video game, whereas the message list image GC shows only messages Ms that are related to the soccer video game.

It is to be noted that when the game-video-for-distribution information JDD and the message list image information JGC are supplied from the video distribution server 50B, the terminal apparatus 70-n causes the display 71-n to display a video distribution screen DY.

Figure 37:
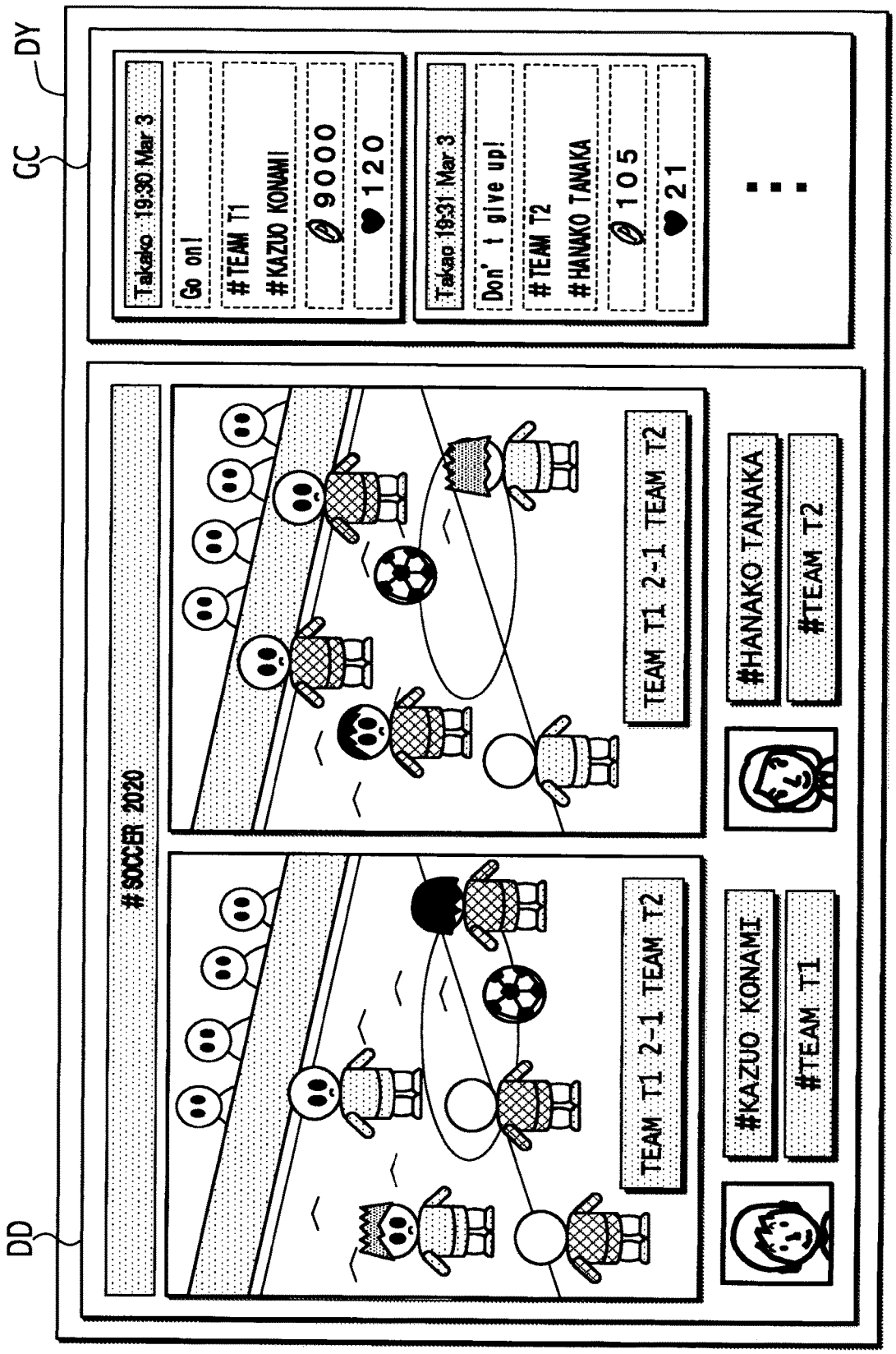
FIG. 37 shows an example overview of a video distribution screen DY.

FIG. 37 is an explanatory diagram for explaining an example overview of the video distribution screen DY.

As shown in FIG. 37, the video distribution screen DY is a screen including a game video for distribution DD indicated by the game-video-for-distribution information JDD and a message list image GC indicated by the message list image information JGC. However, the present modification is not limited thereto. In the present modification, it is only necessary that the video distribution screen DY includes the game video for distribution DD at least, and the video distribution screen DY does not have to include the message list image GC.

As illustrated in FIG. 36, the video distribution server 50B supplies message information JMs supplied from the terminal apparatus 70-n to the game apparatuses 10-1 to 10-6 (S36). The video distribution server 50B may supply the message information JMs to the game apparatuses 10-1 to 10-6 via the video editing apparatus 40. Then, the game apparatus 10-m performs the processing of step S24 described above, in substantially the same manner as the video distribution system Sys does.

Also in the present modification, the game apparatus 10-m can perform the message acquisition processing, message analysis processing, message incorporation processing, message incorporation manner decision processing, and rendering mode determination processing in substantially the same manner as in the above described embodiment. However, in the present modification, as described above, a message Ms included in the message information JMs transmitted from the terminal apparatus 70-n is a message Ms related to the game video for distribution DD indicated by the game-video-for-distribution information JDD, or a message Ms related to the soccer video game being executed in the game apparatus 10-m. Therefore, the message acquisition processing according to the present modification differs from the message acquisition processing according to the embodiment illustrated in FIG. 18 in that the game apparatus 10-m according to the present modification does not perform the processing of step S100 in the message acquisition processing.

Modification 4

In the above described embodiment and modifications 1 to 3, the message incorporation manner decider 123 determines the manner in which a message Ms is incorporated without considering the period type information or the mode type information, but the present invention is not limited thereto. The message incorporation manner decider 123 may determine the manner of incorporation of a message Ms based on the period type information or the mode type information. For example, the message incorporation manner decider 123 may incorporate a message Ms into the game video for display DH as a non-colored display image GMxB if the period type information indicates the in-play period TG1, irrespective of the message target user applicability information, the used point information, and the positive word applicability information corresponding to the message Ms. On the other hand, the message incorporation manner decider 123 may incorporate a message Ms into the game video for display DH in the form of a display mode corresponding to the message target user applicability information, the used point information, and the positive word applicability information corresponding to the message Ms if the period type information indicates the out-of-play period TG2. Also, for example, the message incorporation manner decider 123 may incorporate a message Ms in the form of audio rather than incorporating the message Ms as a message display image GM-m into the game video for display DH if the period type information indicates the in-play period TG1. On the other hand, the message incorporation manner decider 123 may incorporate the message Ms as a message display image GM-m into the game video for display DH if the period type information indicates the out-of-play period TG2.

Modification 5

In the above described embodiment and modifications 1 to 4, the message incorporation manner decider 123 can incorporate a message Ms into the game video for display DH during the in-play period TG1, but the present invention is not limited thereto. For example, the message incorporation manner decider 123 may not be allowed to incorporate a message Ms into the game video for display DH in the in-play period TG1. In addition, for example, the message incorporation manner decider 123 may not be allowed to incorporate a message Ms as a superimposed display image GMx-m in the in-play period TG1, but may be allowed to incorporate a message Ms only as an in-virtual space display image GMy-m.

Modification 6

In the above embodiment and modifications 1 to 5, the message incorporation manner decider 123 decides that a message Ms indicated by message information JMs is incorporated into the game video for display DH in a case in which the message determiner 125 determines that a team specific character string included in the message information JMs indicates a team to which the user U of the game apparatus 10 (or the game apparatus 10A) belongs. Also, the message incorporation manner decider 123 decides that a message Ms indicated by message information JMs is not incorporated into the game video for display DH in a case in which the message determiner 125 determines that a team specific character string included in the message information JMs does not indicate the team to which the user U of the game apparatus 10 (or the game apparatus 10A) belongs. However, the present invention is not limited thereto. For example, the message incorporation manner decider 123 may decide to incorporate a message Ms indicated by message information JMs into the game video for display DH if the message determiner 125 determines that a user specific character string included in the message information JMs indicates the user U of the game apparatus 10 (or the game apparatus 10A), and may decide not to incorporate a message Ms represented by message information JMs into the game video for display DH if the message determiner 125 determines that a user specific character string included in the message information JMs does not indicate the user U of the game apparatus 10 (or the game apparatus 10A). That is, the message determiner 125 may decide for each game apparatus 10 (or game apparatus 10A) whether or not to incorporate a message Ms included in message information JMs into the game video for display DH.

Modification 7

In the above described embodiment and modifications 1 to 6, the message incorporation manner decider 123 may change in accordance with the analysis information Jk an incorporable number, which is the number of messages Ms that can be incorporated into the game video for display DH. For example, in a case in which the message analysis value θm indicated by the analysis information Jk is large, the message incorporation manner decider 123 may increase the incorporable number, compared with a case in which the message analysis value θm is small. It is to be noted that the message incorporation manner decider 123 may expand the area of the limited area ArM in response to an increase in the incorporable number.

Modification 8

In the above described embodiment and modifications 1 to 7, the message incorporation manner decider 123 may change the average value of display durations of message display images GM-m in the game video for display DH in accordance with the analysis information Jk. For example, the message incorporation manner decider 123 may shorten the average value of the display durations of the message displays images GM-m in the game video for display DH in a case in which the message analysis value θm indicated by the analysis information Jk is large, compared with a case in which the message analysis value θm is small. In addition, the message incorporation manner decider 123 may lengthen the display duration of a message display image GM-m corresponding to message information JMs when the priority Φ indicated by message priority information corresponding to the message information JMs is high, compared with a case in which the priority Φ is low.

Modification 9

In the above described embodiment and modifications 1 to 8, the message incorporation manner decider 123 may change the size, color, movement, etc., of spectator characters CK in accordance with the analysis information Jk. For example, the message incorporation manner decider 123 may determine the size, color, movement, etc., of each spectator character CK such that, in a case in which the message analysis value θm indicated by the analysis information Jk is large, the probability of each spectator character CK being recognized is higher, compared with a case in which the message analysis value θm is small.

Modification 10

In the above described embodiment and modifications 1 to 9, the message analyzer 126 may generate analysis information Jk based on content of a message Ms included in the game message information. Specifically, the message analyzer 126 may generate the analysis information Jk such that it includes message content information indicating a message positive word value θk determined in accordance with the content of the message Ms included in the game message information.

In the present modification, the message determiner 125 determines, at step S110 of the message acquisition processing, whether or not the message Ms included in the game message information acquired by, for example, the message acquirer 124 at step S102 has a positive meaning, and also determines whether or not the message Ms included in the game message information acquired by the message acquirer 124 at step S102 has a negative meaning.

Also, in the present modification, the message analyzer 126 tallies, at step S122, game message information containing a message Ms with a positive meaning, and game message information containing message Ms with a negative meaning, out of one or more pieces of game message information supplied to the game apparatus 10 (or the message management server 30A) during the analysis period, for example, and generates message content information indicating the message positive word value θk indicating a result of the tally. Specifically, at step S122, for example, if the number of pieces of game message information including a message Ms with a positive meaning is greater than or equal to the number of pieces of game message information including a message Ms with a negative meaning from among the one or more pieces of game message information supplied to the game apparatus 10 (or the message management server 30A) during the analysis period, the message analyzer 126 generates message content information indicating a message positive word value θk that satisfies "θk>0" as in the above embodiment. Conversely, if the number of pieces of game message information including a message Ms with a negative meaning is greater than the number of pieces of game message information including a message Ms with a positive meaning from among the one or more pieces of game message information supplied to the game apparatus 10 (or the message management server 30A) during the analysis period, the message analyzer 126 generates information content information indicating a message positive word value θk that satisfies "θk<0." More specifically, at step S122, for example, if the number of pieces of game message information including messages Ms with a negative meaning is greater than the number of pieces of game message information including messages Ms with a positive meaning among the one or more pieces of game message information supplied to the game apparatus 10 (or the message management server 30A) in the analysis period, the message analyzer 126 may generate message content information such that the message positive word value θk is small when a value obtained by subtracting the number of pieces of game message information including messages Ms with a positive meaning, from the number of pieces of game message information including messages Ms with a negative meaning is large.

Also, in the present modification, the message analyzer 126 generates message analysis information at step S126 in the message analysis processing such that, in a case in which a message positive word value θk indicated by the message content information is large, the message analysis value θm is greater, compared to a case in which the message positive word value θk is small, for example. Specifically, at step S126, the message analyzer 126 generates, for example, message analysis information indicating a message analysis value θm satisfying "θm>0" in a case in which a message positive word value θk indicated by the message content information satisfies "θk>0." On the other hand, the message analyzer 126 generates message analysis information indicating a message analysis value θm satisfying "θm<0" in a case in which the message positive word value θk indicated by the message content information satisfies "θk<0." It is to be noted that in the present modification, the message analyzer 126 may generate message analysis information at step S126 of the message analysis processing such that, in a case in which, for example, the number of pieces of game message information supplied to the game apparatus 10 (or the message management server 30A) during the analysis period is large, the absolute value of the message analysis value θm is greater compared with a case in which the number of pieces of game message information is small.

Furthermore, in the present modification, the message incorporation manner decider 123 performs, in the rendering mode determination processing, one, some, or all of the processing for determining whether or not the message analysis value θm satisfies "θm4≤θm<0," the processing for determining whether or not the message analysis value θm satisfies "θm5≤θm<θm4," and the processing for determining whether or not the message analysis value θm satisfies "θm<θm5," for example, in addition to the processing of steps S200 to S216 described above. Here, the value θm4 is a real number satisfying "θm4<0" and the value θm5 is a real number satisfying "θm5<θm4". In the present modification, the message incorporation manner decider 123 may perform, in the rendering mode determination processing, one, some, or all of the processing for determining whether the message positive word value θk satisfies "θk4≤θk<0," the processing for determining whether the message positive word value θk satisfies "θk5≤θk<θk4," and the processing for determining whether the message positive word value θk satisfies "θk<θk5," for example, in addition to the processing of steps S200 to S216 described above. Here, the value θk4 is a real number satisfying "θk4<0" and the value θk5 is a real number satisfying "θk5<θk4."

Then, in the present modification, in the rendering mode determination processing, the message incorporation manner decider 123 sets the number of spectator characters CK in the virtual space Fd to a reference amount α4, sets the volume of booing by the spectator characters CK in the virtual space Fd to a reference volume β4, and sets the content of booing by the spectator characters CK as a fourth audio content item, in a case in which, for example, the message analysis value θm satisfies "θm4≤θm<0" or in which the message positive word value θk satisfies "θk4≤θk<0." Here, the value α4 is a natural number satisfying "0<α4" and the volume β4 is a real number satisfying "0<β4." The "content of the booing by the spectator characters CK" may be a concept that encompasses one, some, or all of the tone of a sound or voice representing the booing of the spectator characters CK, the content of the words indicated by a voice representing the booing of the spectator characters CK, and the level of the pitch of a sound or voice representing the booing of the spectator characters CK.

Also, in the present modification, in the rendering mode determination processing, the message incorporation manner decider 123 sets the number of spectator characters CK in the virtual space Fd to α5, sets the volume of the booing by the spectator characters CK in the virtual space Fd to the volume β5, and sets the content of the booing by the spectator characters CK as a fifth audio content item in a case in which, for example, the message analysis value θm satisfies "θm5≤θm<θm4" or the message positive word value θk satisfies "θk5≤θk<θk4." Here, the value α5 is a natural number satisfying "α4<α5," and the volume β5 is a real number satisfying "β4<β5." The fifth audio content item may be the content of the booing such that compared with the fourth audio content item, the booing by the spectator characters CK is more likely to be recognized.

Also, in the present modification, in the rendering mode determination processing, the message incorporation manner decider 123 sets the number of spectator characters CK in the virtual space Fd to α6, sets the volume of the booing by the spectator characters CK in the virtual space Fd to the volume β6, and sets the content of the booing by the spectator character CK as a sixth audio content item in a case in which, for example, the message analysis value θm satisfies "θm<θm5" or the message positive word value θk satisfies "θk<θk5." Here, the value α6 is a natural number satisfying "α5<α6" and the volume β6 is a real number satisfying "β5<β6." The sixth audio content item may be the content of the booing such that, compared with the fifth audio content item, the booing by the spectator characters CK is more likely to be perceived.

As described above, according to the present modification, the game apparatus 10 (or the game apparatus 10A) is able to incorporate into the game video for display DH a rendering indicating whether the number of pieces of game message information indicating positive content messages Ms is large or small and a rendering indicating whether the number of pieces of game message information indicating negative content messages Ms is large or small. Therefore, according to the present modification, the user U of the game apparatus 10 (or the game apparatus 10A) and the user of the terminal apparatus 70 can easily identify the level of excitement in a soccer video game and whether the excitement in the soccer video game is positive excitement or negative excitement.

Modification 11

In the above described embodiment and modifications 1 to 10, a "soccer video game" is illustrated as an example of a "video game," but the present invention is not limited thereto. Any video game may be employed as the "video game" in the present invention.

C. APPENDICES

From the above description, the present invention is understood as follows, for example. In order to facilitate the understanding of each aspect, reference signs of the drawings are added in parentheses for convenience, but this does not mean the present invention is limited to the illustrated aspect.

Appendix 1

A computer readable recording medium according to one aspect of the present invention is a computer readable recording medium (e.g., storage device 1003) having recorded therein a program (e.g., control program PGg), the program causing a processor (e.g., processor 1001) of a game apparatus (e.g., game apparatus 10) to function as: a game controller (e.g., game controller 111) configured to execute a video game (e.g., a soccer video game) and to generate video information indicative of a video of the video game (e.g., game-video-for-display information JDH); and an acquirer configured to acquire message information (message information JMs) that is output from a terminal apparatus (e.g., terminal apparatus 70) configured to display a distributed video that is based on the video information (e.g., game video for distribution DD), the message information including a message (e.g., message Ms) related to at least one of the distributed video or the video game. The game controller is configured to incorporate the message included in the message information into the video of the video game, based on progress status information indicative of a progress status of the video game.

In this aspect, the game controller incorporates the message included in the message information into the video of the video game being executed in the game apparatus. Thus, according to this aspect, compared with a form in which messages are not incorporated into a video of a video game, a user who plays the video game in a game apparatus and a user who watches a distributed video on a terminal apparatus can easily grasp the degree of excitement in the video game.

Also in this aspect, the game controller incorporates the message included in message information into the video of the video game being executed in the game apparatus based on the progress status information indicative of the progress status of the video game. Therefore, according to the present aspect, compared with, for example, a form in which messages are incorporated into a video of a video game without considering the progress status information, it is possible to reduce the probability that a user who plays a video game in a game apparatus will be hindered from operating the game apparatus, when such operation is required depending on the progress status of the video game. In addition, according to the present aspect, in a case in which, for example, demand for watching the distributed video by a user who watches the distributed video on the terminal apparatus increases depending on the progress status of the video game, it is possible to reduce the probability of a user of the terminal apparatus being hindered from watching the distributed video, as compared with a form in which messages are incorporated into a video of a video game without considering the progress status information. Thus, according to the present aspect, it is possible to reduce disadvantages to the user of a game apparatus and the user of a terminal apparatus that would arise from incorporating messages into a video of a video game, compared with a form in which messages are incorporated into a video of a video game without considering the progress status information, for example.

In the above aspect, the "video information" may be, for example, information indicative of a game image updated for each unit period in real time, information indicative of a set of multiple game images corresponding one-to-one with multiple unit periods, or information to which information indicative of audio has been added. Here, the "unit period" may be, for example, a period with a predetermined time length or a period with a variable time length. The "game image" may be, for example, a still image representing a virtual space of a video game or a still image representing a screen for a user of a game apparatus to perform operations of a video game. In addition, the "information indicative of audio" may be, for example, information indicative of audio generated in the virtual space of the video game, or information indicative of audio produced by the game apparatus in response to an operation of the video game by the user of the game apparatus.

In the above mode, the "distributed video" may be, for example, the same video as a video indicated by the video information; a video, a resolution of which has been changed from that of a video indicated by the video information; or a video in which a different video image or still image from the video indicated by the video information has been is added to the video indicated by the video information.

In the above aspect, the "message information" may be, for example, information of a message posted on a specific website (e.g., an SNS site, etc.), information of a message transmitted to a game apparatus, or information of a message transmitted to a game system including the game apparatus.

In the above aspect, the "progress status information" may be, for example, information including probability information indicating, at respective points in time during a period in which the video game is in progress, the probability that a final outcome of the video game at the end of the video game will change.

Here, in a case in which a game progression period from the start to the end of the video game is divided into multiple game periods, the "probability information" may be, for example, information including period type information indicating a type of a game period in which a video game is being progressed. Alternatively, in a case in which the video game is progressable in multiple types of progression modes, the "probability information" may be, for example, information including mode type information indicating a type of a progression mode in which a video game is being progressed. As another alternative, the "probability information" may be, for example, information including both the period type information and the mode type information.

In this aspect, the "multiple game periods" may include, for example, one or more in-play periods and one or more out-of-play periods. The "in-play period" may be a period during which the state of a character or object of the video game can be changed in a virtual space of the video game based on, for example, the operation of the user of a game apparatus. In addition, the "out-of-play period" may be a period in which the state of the character or object of the video game cannot be changed in the virtual space of the video game based on, for example, the operation of the user of the game apparatus. In addition, the "out-of-play period" may be, for example, a period in which the final outcome of the video game at the end of the video game is less likely to change than during the "in-play period." Here, the "state of a character or object of a video game" may be a position, a posture, a movement speed, or a direction of the character or object of the video game in the virtual space of the video game, the probability of existence of the character or object of the video game in the video game, or one, some, or all of them.

In this aspect, the "multiple types of progression modes" may include, for example, an in-play progression mode and an out-of-play progression mode. The "in-play progression mode" may be a progression mode in which the state of the character or object of the video game in the virtual space of the video game can be changed based on, for example, the operation of the user of the game apparatus. In addition, the "out-of-play progression mode" may be a progression mode in which the state of the character or object of the video game cannot be changed in the virtual space of the video game based on the operation of the user of the game apparatus, for example. In addition, the "out-of-play progression mode" may be, for example, a progression mode in which the final outcome of the video game at the end of the video game is less likely to change than in the "in-play progression mode."

In the above aspect, "incorporating a message into a video of a video game" may mean, for example, causing a superimposed image indicating the message to be displayed in the video of the video game, incorporating an image indicative of the message into a virtual space of the video game represented by the video of the video game, displaying the message in an object existing in the virtual space, of the video game, represented by the video of the video game, or incorporating the message into the video of the video game in the form of audio.

Appendix 2

A recording medium according to another aspect of the present invention is the recording medium according to Appendix 1, in which the game controller is configured to decide, based on the progress status information, whether or not to incorporate the message included in the message information into the video of the video game, and, in response to a decision to incorporate the message, incorporate the message included in the message information into the video of the video game, based on the progress status information.

In this aspect, based on the progress status information indicative of the progress status of the video game, the game controller decides whether or not to incorporate a message included in the message information into the video of the video game being executed in the game apparatus. Thus, according to the present aspect, it is possible to reduce disadvantages to the user of a game apparatus and the user of a terminal apparatus that would arise from incorporating messages into a video of the video game, compared with a form in which messages are incorporated into a video of the video game without considering the progress status information, for example.

Appendix 3

A recording medium according to another aspect of the present invention is the recording medium according to Appendix 1 or 2, and the game controller is configured to incorporate the message included in the message information into the video of the video game, in a manner corresponding to the progress status indicated by the progress status information.

In this aspect, the game controller incorporates the message included in the message information into the video of the video game being executed in the game apparatus in a manner corresponding to the progress status indicated by the progress status information. Therefore, according to this aspect, it is possible to reduce disadvantages to the user of a game apparatus and the user of a terminal apparatus that would arise from incorporating messages into the video of the video game, compared with, for example, incorporating messages into the video of the video game without considering the progress status information.

Appendix 4

A recording medium according to another aspect of the present invention is the recording medium according to Appendices 1 to 3, in which the progress status information includes probability information related to a probability that a final outcome of the video game at an end of the video game changes in accordance with the progress of the video game, and the game controller is configured to incorporate the message included in the message information into the video of the video game based on the probability information.

In this aspect, the game controller incorporates the message included in the message information into the video of the video game being executed in the game apparatus based on the probability information related to the probability that the final outcome of the video game at the end of the video game may change. Thus, according to the present aspect, compared with, for example, a form in which messages are incorporated into a video of a video game without considering the probability information, it is possible to reduce the probability that a user playing the video game in the game apparatus will be hindered from operating the game apparatus, when such operation is required depending on the likelihood of a change in the final outcome of the video game. In addition, according to the present aspect, in a case in which, for example, a demand for watching the distributed video by a user who watches the distributed video on the terminal apparatus increases depending on the likelihood of a change in the final outcome of the video game, it is possible to reduce the probability of a user of the terminal apparatus being hindered from watching the distributed video, compared with a form in which messages are incorporated into the video of the video game without considering the probability information. Thus, according to the present aspect, it is possible to reduce disadvantages to the user of a game apparatus and the user of a terminal apparatus that would arise from incorporating messages into a video of a video game, compared with a form in which messages are incorporated into a video of the video game without considering the probability information, for example.

A recording medium according to another aspect of the present invention may be the recording medium according to Appendices 1 to 3, in which a progression period (e.g., video game progress period TG) in which the video game is in progress includes a first progression period (e.g., in-play period TG1) and a second progression period (e.g., out-of-play period TG2) in which the probability that the final outcome of the video game at the end of the video game may change is lower than that in the first progression period, and the progress status information includes period type information indicating whether or not the video game is progressing in the first progression period. In this case, the game controller is configured to incorporate the message included in the message information into the video of the video game based on the period type information.

A recording medium according to another aspect of the present invention may be the recording medium described in Appendices 1 to 3, in which the progress status information includes mode type information indicating a type of the progression mode in which the game controller is progressing the video game among a plurality of progression modes including a first progression mode (e.g., in-play progression mode) and a second progression mode (e.g., out-of-play progression mode) in which the probability that the final outcome of the video game at the end of the video game changes is lower than that in the first progression mode. In this case, the game controller may incorporate a message included in the message information into the video of the video game based on the mode type information.

Appendix 5

A recording medium according to another aspect of the present invention is the recording medium according to Appendix 4, and the game controller is configured to, in response to the probability information indicating that there exists a possibility that the final outcome of the video game changes, limit an area in which the message included in the message information is displayed, in the video of the video game.

In this aspect, the game controller limits the area in which the message is displayed in the video of the video game, when the game is in a situation in which there exists a possibility that the final outcome of the video game may change. Thus, according to the present aspect, it is possible to reduce a probability that a user playing a video game in a game apparatus will be hindered from operating the game apparatus, when such operation is required in response to arising of a possibility that the final outcome of the video game may change, as compared with, for example, a form that does not limit the area in which the message is displayed even in a situation in which there exists a possibility that the final outcome of the video game may change. In addition, according to this aspect, in a case in which, for example, a demand for watching the distributed video by a user who watches the distributed video on the terminal apparatus increases in response to arising of a possibility that the final outcome of the video game may change, it is possible to reduce the probability of a user of the terminal apparatus being hindered from watching the distributed video, compared with a form that does not limit the area where the message is displayed even in a situation in which there is a possibility that the final outcome of the video game may change.

Appendix 6

A recording medium according to another aspect of the present invention is the recording medium according to Appendix 4 or 5, and the game controller includes a progressor (e.g., game progressor 121) configured to progress the video game, to generate, based on the progress of the video game, virtual space information related to a state of a virtual space of the video game; and a generator (e.g., video information generator 122) configured to generate the video information based on the virtual space information, and the progressor is configured to, in response to the probability information indicating that there exists a possibility that the final outcome of the video game changes, incorporate the message included in the message information, into the virtual space indicated by the virtual space information.

In this aspect, the game controller incorporates the message into the virtual space of the video game, when the game is in a situation in which there exists a possibility that the final outcome of the video game may change. Therefore, according to the present aspect, even in a situation in which, for example, the final outcome of a video game may change, it is possible to reduce a probability that a user playing a video game in a game apparatus will be hindered from operating the game apparatus, when such operation is required in response to arising of a possibility that the final outcome of the video game may change, as compared with a form in which the image of the message is superimposed on the image of a virtual space. In addition, according to this aspect, even in a situation in which the final outcome of a video game may change, for example, it is possible to reduce a probability of a user of the terminal apparatus being prevented from watching the distributed video, compared with a form in which an image indicative of the message is superimposed on an image indicative of the virtual space.

In the above aspect, the "virtual space information" may be, for example, information indicating the position, posture, moving speed or moving direction of a character or object of a video game in the virtual space of the video game, or information indicating the survivability of the character or object of the video game in the video game, or information indicating one, some, or all of these.

Appendix 7

A recording medium according to another aspect of the present invention is the recording medium described in Appendix 6, and the progressor is configured to cause, in response to the probability information indicating that there exists a possibility that the final outcome of the video game changes, the message included in the message information to be displayed in an object existing in the virtual space indicated by the virtual space information.

In this aspect, the game controller causes a message to be displayed in an object existing in the virtual space of the video game, when the game is in a situation in which there exists a possibility that the final outcome of the video game may change. Therefore, according to the present aspect, even in a situation in which, for example, the final outcome of a video game may change, it is possible to reduce a probability that a user playing a video game in a game apparatus will be hindered from operating the game apparatus, when such operation is required in response to arising of a possibility that the final outcome of the video game may change, as compared with a form in which the image of a message is superimposed on the image of the virtual space. In addition, according to this aspect, even in a situation in which the final outcome of a video game may change, for example, it is possible to reduce a probability of a user of the terminal apparatus being hindered from watching the distributed video, compared with a form in which an image indicating the message is superimposed on an image indicating the virtual space.

Appendix 8

A recording medium according to another aspect of the present invention is the recording medium according to Appendices 4 to 7, and the game controller is configured to, in response to the probability information indicating that there exists a possibility that the final outcome of the video game changes, incorporate the message included in the message information into the video of the video game in the form of audio.

In this aspect, the game controller incorporates the message in the form of audio into the video of the video game, when the game is in a situation in which there is a possibility that the final outcome of the video game may change. Therefore, according to the present aspect, even in a situation in which, for example, the final outcome of a video game may change, it is possible to reduce a probability that a user playing a video game in a game apparatus will be hindered from operating the game apparatus, when such operation is required in response to arising of a possibility that the final outcome of the video game may change, as compared with a form in which the image of a message is superimposed on the image of the virtual space. In addition, according to this aspect, even in a situation in which the final outcome of a video game may change, for example, it is possible to reduce a probability of a user of the terminal apparatus being hindered from watching the distributed video, compared with a form in which an image indicating the message is superimposed on an image indicating the virtual space.

Appendix 9

A recording medium according to another aspect of the present invention is a computer readable recording medium having recorded therein a program, the program causing a processor of a game apparatus to function as: a game controller configured to execute a video game and generate video information indicative of a video of the video game; and an acquirer configured to acquire message information that is output from a terminal apparatus configured to display a distributed video that is based on the video information, the message information including a message related to at least one of the distributed video or the video game, and the game controller is configured to decide, based on progress status information indicative of a progress status of the video game, whether or not to incorporate the message included in the message information into a video of the video game.

In this aspect, the game controller can decide to incorporate the message included in the message information into the video of the video game performed in the game apparatus. Therefore, according to the present aspect, compared with a form in which messages are not incorporated into the video of the video game, a user who plays a video game in a game apparatus and a user who watches the distributed video in the terminal apparatus can easily grasp the degree of the excitement of the video game.

In this aspect, based on the progress status information indicative of the progress status of the video game, the game controller is configured to decide whether or not to incorporate the message included in the message information into the video of the video game being executed in the game apparatus. Therefore, according to the present aspect, compared with, for example, a form in which messages are incorporated into a video of a video game without considering the progress status information, it is possible to reduce a probability that a user who plays a video game in the game apparatus will be hindered from operating the game apparatus, when such operation is required depending on the progress status of the video game. In addition, according to the present aspect, in a case in which, for example, a demand for watching the distributed video by a user who watches the distributed video on the terminal apparatus increases depending on the progress status of the video game, it is possible to reduce a probability of a user of the terminal apparatus being hindered from watching the distributed video, compared with a form in which messages are incorporated into the video of the video game without considering the progress status information. Thus, according to the present aspect, it is possible to reduce disadvantages to the user of a game apparatus and the user of a terminal apparatus that would arise from incorporating messages into a video of a video game, compared with a form in which messages are incorporated into a video of the video game without considering the progress status information, for example.

Appendix 10

A recording medium according to another aspect of the present invention is the recording medium according to Appendix 9, and the progress status information includes probability information related to a probability that a final outcome the video game at the end of the video game changes. In this case, the game controller decides, based on the probability information, whether or not to incorporate the message included in the message information into the video of the video game.

According to this aspect, it is possible to reduce a probability that a user playing a video game in the game apparatus will be hindered from operating the game apparatus, when such operation is required depending on the likelihood of a change in the final outcome of the video game, as compared to, for example, incorporating the message without considering the probability information for a video of the video game. In addition, according to the present aspect, in a case in which, for example, a demand for watching the distributed video by a user who watches the distributed video on the terminal apparatus increases depending on the likelihood of a change in the final outcome of the video game, it is possible to reduce a probability of a user of the terminal apparatus being hindered from watching the distributed video, compared with a form in which messages are incorporated into the video of the video game without considering the probability information.

Appendix 11

A game apparatus according to an aspect of the present invention includes: a game controller configured to execute a video game and generate video information indicative of a video of the video game; an acquirer configured to acquire message information that is output from a terminal apparatus configured to display a distributed video based on the video information, the message information including a message related to at least one of the distributed video or the video game, and the game controller is configured to, based on progress status information indicative of a progress status of the video game, incorporate the message included in the message information into the video of the video game.

According to this aspect, a user who plays the video game in the game apparatus and a user who watches the distributed video in the terminal apparatus can easily grasp the degree of excitement of the video game compared with a form in which messages are not incorporated into the video of the video game. In addition, according to the present aspect, compared with, for example, a form in which messages are incorporated into a video of a video game without considering the progress status information, it is possible to reduce a probability that a user who plays the video game in the game apparatus will be hindered from operating the game apparatus, when such operation is required depending on the progress status of the video game. In addition, according to the present aspect, in a case in which, for example, a demand for watching the distributed video by a user who watches the distributed video on the terminal apparatus increases depending on the progress status of the video game, it is possible to reduce a probability of a user of the terminal apparatus being hindered from watching the distributed video, compared with a form in which messages are incorporated into the video of the video game without considering the progress status information.

Appendix 12

A game apparatus according to another aspect of the present invention includes: a game controller configured to execute a video game and generate video information indicative of a video of the video game; and an acquirer configured to acquire message information that is output from a terminal apparatus configured to display a distributed video that is based on the video information, the message information including a message related to at least one of the distributed video or the video game, and the game controller is configured to decide, based on progress status information indicative of a progress status of the video game, whether or not to incorporate the message included in the message information into the video of the video game.

According to this aspect, a user who plays the video game in the game apparatus and a user who watches the distributed video in the terminal apparatus can easily grasp the degree of the excitement of the video game compared with a form in which messages are not incorporated into the video of the video game. In addition, according to the present aspect, compared with, for example, a form in which messages are incorporated into a video of a video game without considering the progress status information, it is possible to reduce a probability that a user who plays the video game in the game apparatus will be hindered from operating the game apparatus, when such operation is required depending on the progress status of the video game. In addition, according to the present aspect, in a case in which, for example, a demand for watching the distributed video by a user who watches the distributed video on the terminal apparatus increases depending on the progress status of the video game, it is possible to reduce a probability of a user of the terminal apparatus being hindered from watching the distributed video, compared with a form in which messages are incorporated into the video of the video game without considering the progress status information.

Appendix 13

A method for controlling a game apparatus according to one aspect of the present invention includes: causing a processor of the game apparatus to function as: a game controller that executes a video game and generates video information indicating a video of the video game; an acquirer that acquires message information that is output from a terminal apparatus configured to display a distributed video that is based on the video information, the message information including a message related to at least one of the distributed video or the video game, and the game controller incorporates the message included in the message information into the video of the video game based on progress status information indicative of a progress status of the video game.

According to this aspect, a user who plays the video game in the game apparatus and a user who watches the distributed video in the terminal apparatus can easily grasp the degree of the excitement of the video game compared with a form in which messages are not incorporated into the video of the video game. In addition, according to the present aspect, compared with, for example, a form in which messages are incorporated into a video of a video game without considering the progress status information, it is possible to reduce a probability that a user who plays the video game in the game apparatus will be hindered from operating the game apparatus, when such operation is required depending on the progress status of the video game. In addition, according to the present aspect, in a case in which, for example, a demand for watching the distributed video by a user who watches the distributed video on the terminal apparatus increases depending on the progress status of the video game, it is possible to reduce a probability of a user of the terminal apparatus being hindered from watching the distributed video, compared with a form in which messages are incorporated into the video of the video game without considering the progress status information.

Appendix 14

A method for controlling a game apparatus according to another aspect of the present invention includes: causing a processor of the game apparatus to function as: a game controller that executes a video game and generates video information indicative of a video of the video game; and an acquirer that acquires message information that is output from a terminal apparatus configured to display a distributed video that is based on the video information, the message information including a message related to at least one of the distributed video or the video game, and the game controller, based on progress status information indicative of a progress status of the video game, decides whether or not to incorporate the message included in the message information into a video of the video game.

According to this aspect, a user who plays the video game in the game apparatus and a user who watches the distributed video in the terminal apparatus can easily grasp the degree of excitement of the video game compared with a form in which messages are not incorporated into the video of the video game. In addition, according to the present aspect, compared with, for example, a form in which messages are incorporated into a video of a video game without considering the progress status information, it is possible to reduce a probability that a user who plays the video game in the game apparatus will be hindered from operating the game apparatus, when such operation is required depending on the progress status of the video game. In addition, according to the present aspect, in a case in which, for example, a demand for watching the distributed video by a user who watches the distributed video on the terminal apparatus increases depending on the progress status of the video game, it is possible to reduce a probability of a user of the terminal apparatus being hindered from watching the distributed video, compared with a form in which messages are incorporated into the video of the video game without considering the progress status information.

Appendix 15

A game system according to one aspect of the present invention is a game system with a game apparatus that executes a video game and generates video information indicative of a video of the video game, and the game system includes: an acquirer configured to acquire message information that is output from a terminal apparatus configured to display a distributed video that is based on the video information, the message information including a message related to at least one of the distributed video or the video game; and a game controller configured to, based on progress status information indicative of a progress status of the video game, incorporate the message included in the message information into the video of the video game.

According to this aspect, a user who plays the video game in the game apparatus and a user who watches the distributed video in the terminal apparatus can easily grasp the degree of excitement of the video game compared with a form in which messages are not incorporated into the video of the video game. In addition, according to the present aspect, compared with, for example, a form in which a message is incorporated into a video of a video game without considering the progress status information, it is possible to reduce a probability that a user who plays the video game in the game apparatus will be hindered from operating the game apparatus, when such operation is required depending on the progress status of the video game. In addition, according to the present aspect, in a case in which, for example, a demand for watching the distributed video by a user who watches the distributed video on the terminal apparatus increases depending on the progress status of the video game, it is possible to reduce a probability of a user of the terminal apparatus being hindered from watching the distributed video, compared with a form in which messages are incorporated into the video of the video game without considering the progress status information.

Appendix 16

A game system according to another aspect of the present invention is a game system with a game apparatus that executes a video game and generates video information indicative of a video of the video game, and the game system includes: an acquirer configured to acquire message information that is output from a terminal apparatus configured to display a distributed video that is based on the video information, the message information including a message related to at least one of the distributed video or the video game; and a game controller configured to decide, based on progress status information indicative of a progress status of the video game, whether or not to incorporate the message included in the message information into the video of the video game.

According to this aspect, a user who plays the video game in the game apparatus and a user who watches the distributed video in the terminal apparatus can easily grasp the degree of excitement of the video game compared with a form in which messages are not incorporated into the video of the video game. In addition, according to the present aspect, compared with, for example, a form in which message is incorporated into a video of a video game without considering the progress status information, it is possible to reduce a probability that a user who plays the video game in the game apparatus will be hindered from operating the game apparatus, when such operation is required depending on the progress status of the video game. In addition, according to the present aspect, in a case in which, for example, a demand for watching the distributed video by a user who watches the distributed video on the terminal apparatus increases depending on the likelihood of a change in the final outcome of the video game, it is possible to reduce a probability of a user of the terminal apparatus being hindered from watching the distributed video, compared with a form in which messages are incorporated into the video of the video game without considering the progress status information.

DESCRIPTION OF REFERENCE SIGNS

10 . . . game apparatus, 11 . . . controller, 13 . . . storage unit, 14 . . . input unit, 15 . . . communicator, 20 . . . display apparatus, 30 . . . message management server, 31 . . . controller, 33 . . . storage unit, 35 . . . communicator, 40 . . . video editing apparatus, 50 . . . video distribution server, 60 . . . SNS server, 70 . . . terminal apparatus, 111 . . . game controller, 120 . . . message incorporator, 121 . . . game progressor, 122 . . . video information generator, 123 . . . message incorporation manner decider, 124 . . . message acquirer, 125 . . . message determiner, 126 . . . message analyzer, 311 . . . message acquirer, 312 . . . message distributer, 1001 . . . processor, 1003 . . . storage device, 1004 . . . input device, 1005 . . . communication device, 3001 . . . processor, 3003 . . . storage device, 3005 . . . communication device, Sys . . . video distribution system, SysG . . . game system.

What is claimed is:

1. A non-transitory computer readable storage medium having recorded therein a program, the program causing a processor of a game apparatus to function as:

a game controller configured to execute a video game and generate video information indicative of a video of the video game; and an acquirer configured to acquire message information that is output from a terminal apparatus configured to display a distributed video that is based on the video information, the message information including a message related to at least one of the distributed video or the video game, wherein the game controller is configured to, based on progress status information indicative of a progress status of the video game, incorporate the message included in the message information into the video of the video game.

2. The computer readable storage medium according to claim 1, wherein the game controller is configured to:
   decide, based on the progress status information, whether or not to incorporate the message included in the message information into the video of the video game, and in response to a decision to incorporate the message, incorporate based on the progress status information the message included in the message information into the video of the video game.

3. The computer readable storage medium according to claim 1, wherein the game controller is configured to incorporate the message included in the message information into the video of the video game, in a manner corresponding to the progress status indicated by the progress status information.

4. The computer readable storage medium according to claim 1, wherein:
   the progress status information includes probability information related to a probability that a final outcome of the video game at an end of the video game changes in accordance with a progress of the video game, and
   the game controller is configured to incorporate the message included in the message information into the video of the video game based on the probability information.

5. The computer readable storage medium according to claim 4, wherein the game controller is configured to, in response to the probability information indicating that there exists a possibility that the final outcome of the video game changes, limit an area in which the message included in the message information is displayed, in the video of the video game.

6. The computer readable storage medium according to claim 4, wherein:
   the game controller includes:
   a progressor configured to progress the video game, to generate, based on the progress of the video game, virtual space information related to a state of a virtual space of the video game; and
   a generator configured to generate the video information based on the virtual space information, and the progressor is configured to, in response to the probability information indicating that there exists a possibility that the final outcome of the video game changes, incorporate the message included in the message information, into the virtual space indicated by the virtual space information.

7. The computer readable storage medium according to claim 6, wherein the progressor is configured to, in response to the probability information indicating that there exists a possibility that the final outcome of the video game changes, cause the message included in the message information to be displayed in an object existing in the virtual space indicated by the virtual space information.

8. The computer readable storage medium according to claim 4, wherein the game controller is configured to, in response to the probability information indicating that there exists a possibility that the final outcome of the video game changes, incorporate the message included in the message information into the video of the video game, in a form of audio.

9. A non-transitory computer readable storage medium having recorded therein a program, the program causing a processor of a game apparatus to function as:
   a game controller configured to execute a video game and generate video information indicative of a video of the video game; and
   an acquirer configured to acquire message information that is output from a terminal apparatus configured to display a distributed video that is based on the video information, the message information including a message related to at least one of the distributed video or the video game, wherein the game controller is configured to decide, based on progress status information indicative of a progress status of the video game, whether or not to incorporate the message included in the message information into a video of the video game.

10. The computer readable storage medium according to claim 9, wherein:
    the progress status information includes probability information related to a probability that a final outcome of the video game at an end of the video game changes, and
    the game controller is configured to decide, based on the probability information, whether or not to incorporate the message included in the message information into the video of the video game.

11. A method for controlling a game apparatus, the method being implemented by a processor of the game apparatus and comprising:
    executing a video game and generating video information indicative of a video of the video game; and
    acquiring message information that is output from a terminal apparatus configured to display a distributed video that is based on the video information, the message information including a message related to at least one of the distributed video or the video game,
    wherein the generation of the video information includes incorporating the message included in the message information into the video of the video game based on progress status information indicative of a progress status of the video game.

12. A method for controlling a game apparatus, the method being implemented by a processor of the game apparatus and comprising:
    executing a video game and generating video information indicative of a video of the video game;
    acquiring message information that is output from a terminal apparatus configured to display a distributed video that is based on the video information, the message information including a message related to at least one of the distributed video or the video game; and
    deciding whether or not to incorporate the message included in the message information into a video of the video game based on progress status information indicative of a progress status of the video game.

13. A game system with a game apparatus that executes a video game and generates video information indicative of a video of the video game, the game system comprising:
    one or more memories for storing instructions; and
    one or more processors communicatively connected to the one or more memories and that execute the instructions to:
    acquire message information that is output from a terminal apparatus configured to display a distributed video that is based on the video information, the message information including a message related to at least one of the distributed video or the video game; and based on progress status information indicative of a progress status of the video game, incorporate the message included in the message information into the video of the video game.

14. A game system with a game apparatus that executes a video game and generates video information indicative of a video of the video game, the game system comprising:

one or more memories for storing instructions; and one or more processors communicatively connected to the one or more memories and that execute the instructions to:

acquire message information that is output from a terminal apparatus configured to display a distributed video that is based on the video information, the message information including a message related to at least one of the distributed video or the video game; and decide, based on progress status information indicative of a progress status of the video game, whether or not to incorporate the message included in the message information into the video of the video game.

* * * * *